(12) United States Patent
Irie

(10) Patent No.: US 8,612,896 B2
(45) Date of Patent: Dec. 17, 2013

(54) MOBILE TERMINAL, DATA CONTROL PROGRAM, AND DATA CONTROL METHOD

(75) Inventor: Kakeru Irie, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/056,058

(22) PCT Filed: Jul. 27, 2009

(86) PCT No.: PCT/JP2009/003520
§ 371 (c)(1),
(2), (4) Date: Apr. 19, 2011

(87) PCT Pub. No.: WO2010/013434
PCT Pub. Date: Feb. 4, 2010

(65) Prior Publication Data
US 2011/0187665 A1   Aug. 4, 2011

(30) Foreign Application Priority Data

Jul. 30, 2008   (JP) .................................. 2008-196757

(51) Int. Cl.
*G06F 3/14*   (2006.01)
(52) U.S. Cl.
USPC ........... 715/864; 715/800; 715/273; 345/173; 345/666
(58) Field of Classification Search
USPC .................. 345/173, 666; 715/273, 800, 864
See application file for complete search history.

(56) References Cited

U.S. PATENT DOCUMENTS

| | | | |
|---|---|---|---|
| 5,408,599 A * | 4/1995 | Nomura et al. ............. | 715/273 |
| 5,542,039 A * | 7/1996 | Brinson et al. ............. | 715/800 |
| 5,737,507 A * | 4/1998 | Smith ........................... | 345/666 |
| 7,434,170 B2 * | 10/2008 | Novak et al. ................. | 715/764 |
| 7,555,727 B2 * | 6/2009 | Hawkins et al. ............. | 715/816 |

(Continued)

FOREIGN PATENT DOCUMENTS

| | | | |
|---|---|---|---|
| JP | 2001-142827 A | 5/2001 |
| JP | 2001-268206 A | 9/2001 |
| JP | 2007-280153 A | 10/2007 |
| JP | 2008-084119 A | 4/2008 |

OTHER PUBLICATIONS

International Search Report dated Sep. 15, 2009 issued by the Japanese Patent Office for International Application No. PCT/JP2009/003520.

(Continued)

*Primary Examiner* — Steven Sax
*Assistant Examiner* — David Choi
(74) *Attorney, Agent, or Firm* — Procopio, Cory, Hargreaves & Savitch LLP

(57) ABSTRACT

A mobile terminal 10 is equipped with an LCD monitor 32 and a touch panel input device 24 mounted on an upper surface of the LCD monitor 32. The LCD monitor 32 displays character input keys and a received mail, so that character strings in a body text of the received mail are arbitrarily selected by operations on the touch panel input device 24. Further, related information of a selected character string is temporarily stored so as to be correlated with an arbitrary character input key. Then, when a touch-and-slide operation is performed from the character input key utilized in the temporary storage to a body text of a transfer mail, the temporarily stored related information can be inserted into the body text of the transfer mail.

15 Claims, 34 Drawing Sheets

(56) References Cited

U.S. PATENT DOCUMENTS

| | | | |
|---|---|---|---|
| D636,780 S * | 4/2011 | Musleh | D14/486 |
| 8,028,029 B2 * | 9/2011 | MacLellan et al. | 709/206 |
| 8,094,938 B2 * | 1/2012 | Wang et al. | 382/185 |
| 2005/0010589 A1 * | 1/2005 | Novak et al. | 707/102 |
| 2006/0015819 A1 * | 1/2006 | Hawkins et al. | 715/780 |
| 2006/0089152 A1 * | 4/2006 | Mahonen | 455/456.1 |
| 2008/0002888 A1 * | 1/2008 | Yuan | 382/187 |
| 2008/0270894 A1 * | 10/2008 | Whittle et al. | 715/256 |
| 2009/0228842 A1 * | 9/2009 | Westerman et al. | 715/863 |
| 2009/0288044 A1 * | 11/2009 | Matthews et al. | 715/863 |
| 2011/0187665 A1 * | 8/2011 | Irie | 345/173 |

OTHER PUBLICATIONS

AU by KDDI, CDMA 1X WIN, "W21SA Basic Manual", p. 252, Aug. 2004.

* cited by examiner

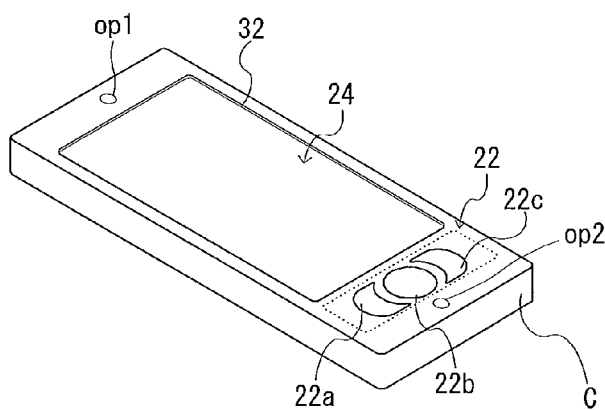
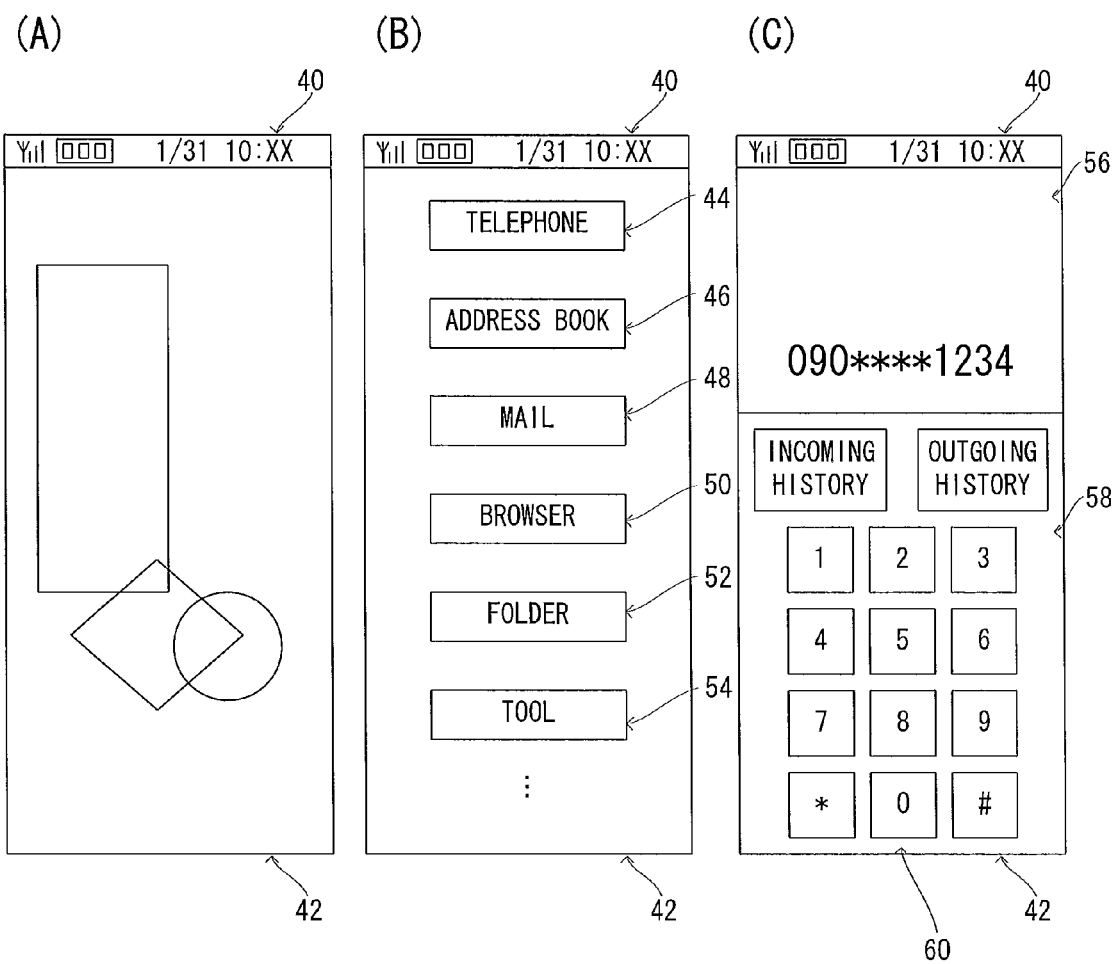

FIG. 6
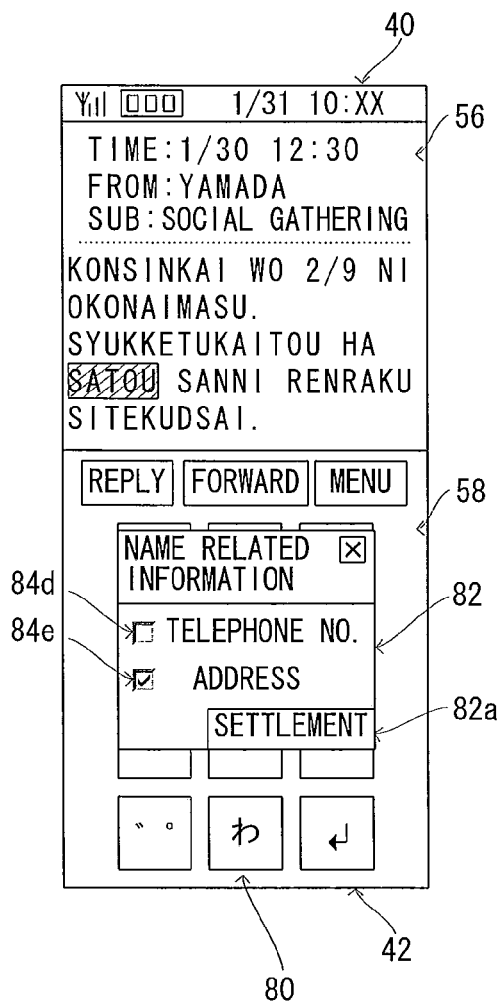
(A)
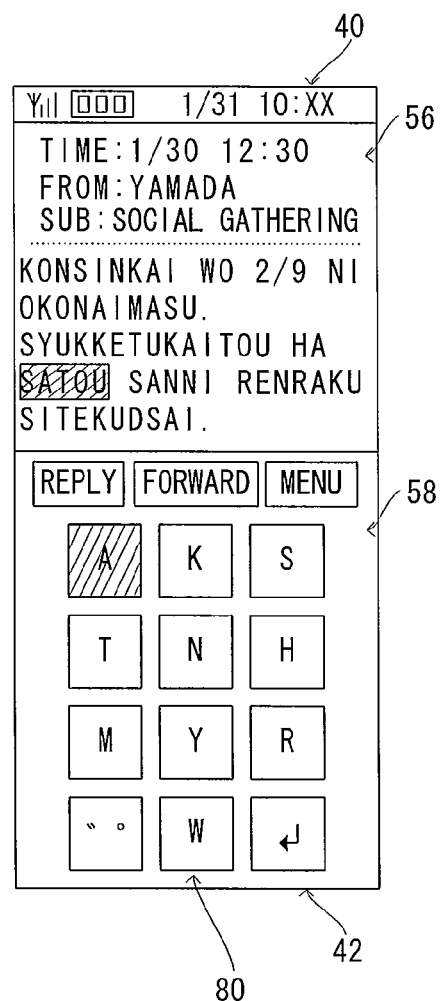
(B)

FIG. 7
(A)
| SA | TOU | SA | N | NI | ... |
|---|---|---|---|---|---|
| ⋮ | ⋮ | ⋮ | ⋮ | ⋮ | ⋮ |
(B) 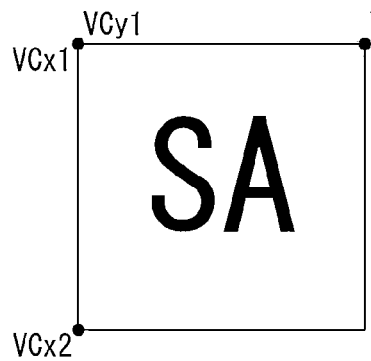
(C) 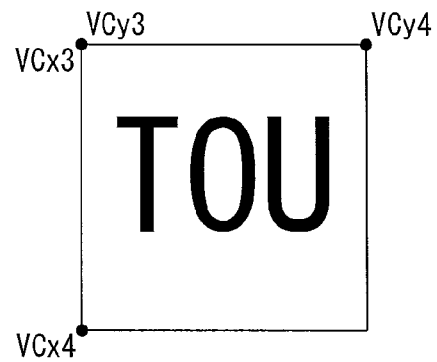
(D)
| •SA→ | •TOU | SA | N | NI | ... |
|---|---|---|---|---|---|
| a | b | | | | |
| ⋮ | ⋮ | ⋮ | ⋮ | ⋮ | ⋮ |
(E)
| SA | TOU | SA | N | NI | ... |
|---|---|---|---|---|---|
| ⋮ | ⋮ | ⋮ | ⋮ | ⋮ | ⋮ |

FIG. 10
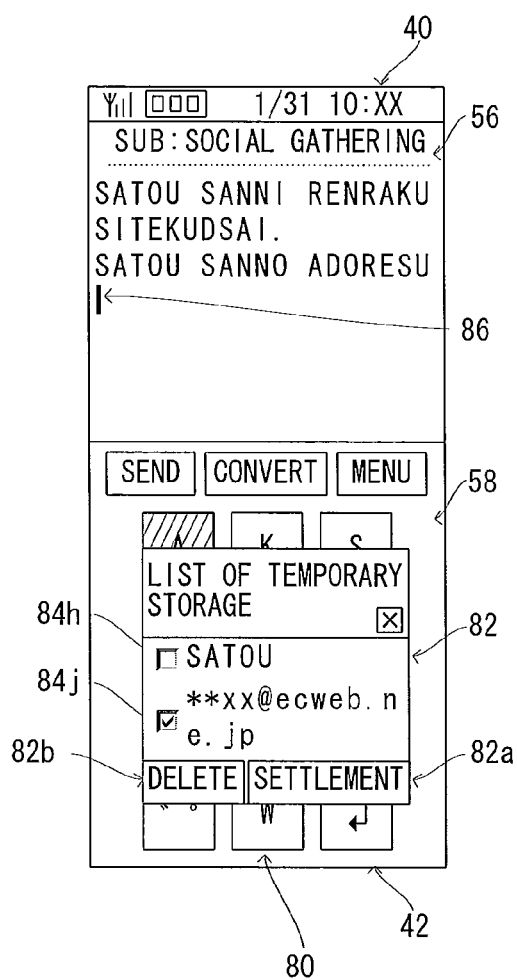
(A)
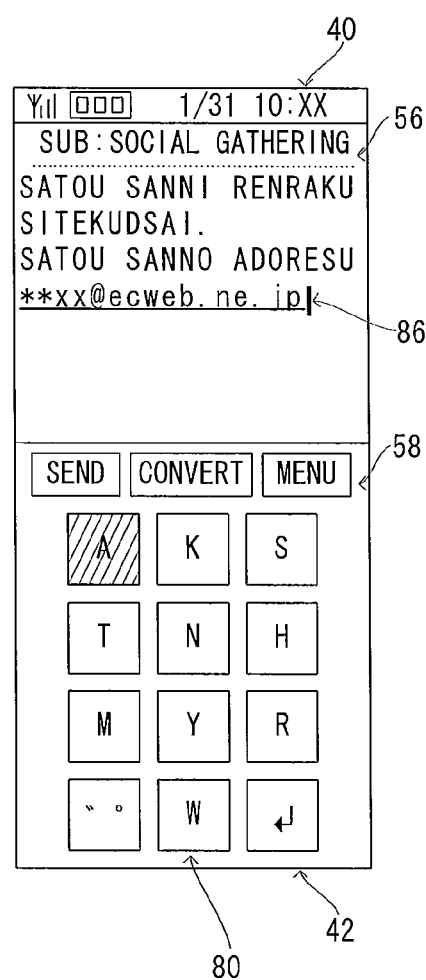
(B)

FIG. 11
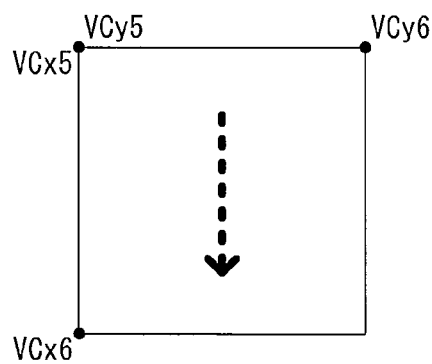
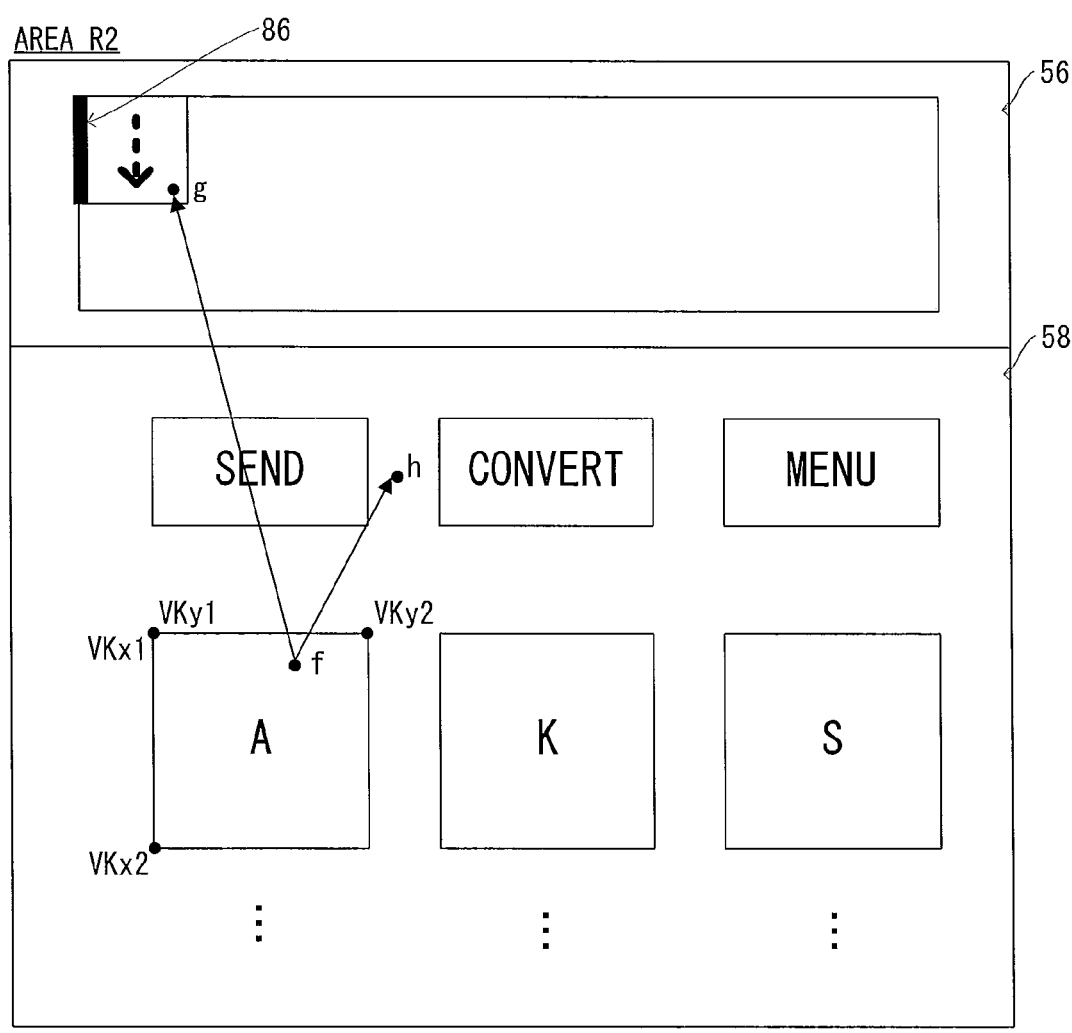

FIG. 16

SEARCH TABLE

| CLASS | SEARCH DESTINATION | MEMORY ADDRESS/ IP ADDRESS |
|---|---|---|
| NAME | ADDRESS BOOK DATA/ AUTHOR'S NAME SERVER | 0X4000000-0X4FFFFFF / IP:210.146.180.*** |
| PLACE NAME | MAP SERVER | IP:210.146.181.*** |
| SONG TITLE | MUSIC DATA/ MUSIC SERVER | 0X6000000-0X6FFFFFF / IP:210.146.182.*** |
| IMAGE | SAVED IMAGE DATA | 0X5000000-0X5FFFFFF |

FIG. 17

ADDRESS BOOK

| NAME | TELEPHONE NO. | MAIL ADDRESS | GROUP | RESIDENCE | BIRTHDAY | GENDER | BLOOD TYPE | URL |
|---|---|---|---|---|---|---|---|---|
| ... | ... | ... | ... | ... | ... | ... | ... | ... |
| KOUDA | 090-xxxx-xxxx | **@ecweb.ne.jp | FRIEND | KYOTO PREFECTURE ... | 1980/11/1 | FEMALE | B | http://www.AA.kouda..jp/index |
| SATOU | 090-xxxx-yyyy | **xx@ecweb.ne.jp | COMPANY | NULL | NULL | NULL | NULL | NULL |
| SIMIZU | 090-yyyy-yyyy | *xx*@ecweb.ne.jp | OTHER | NULL | NULL | NULL | NULL | NULL |
| ... | ... | ... | ... | ... | ... | ... | ... | ... |

FIG. 18
(A)
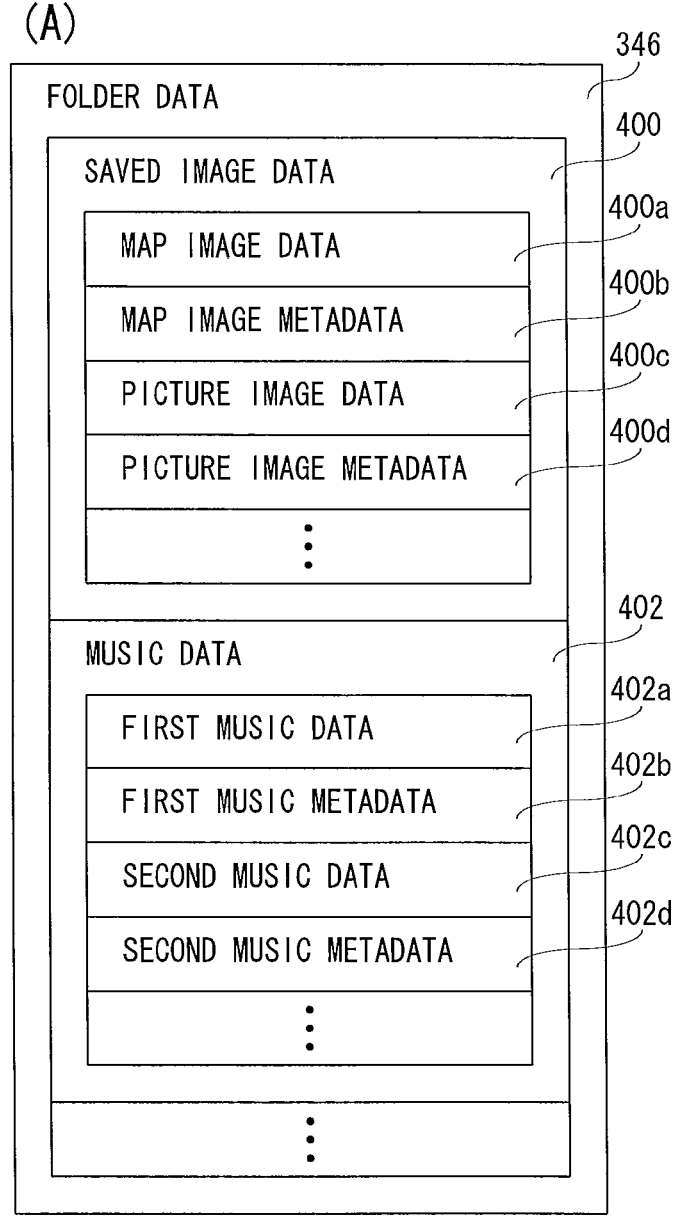
(B)
MEMORY ADDRESSES OF TEMPORARY STORAGE DATA
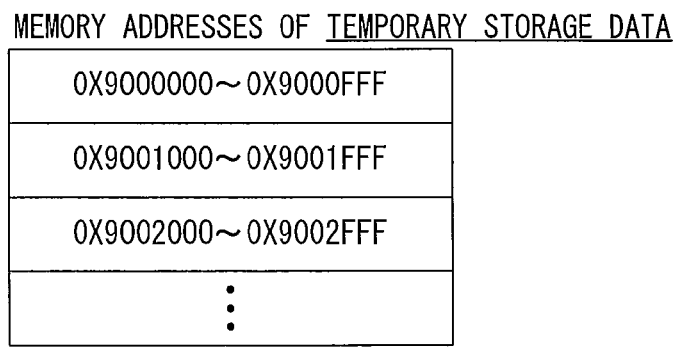

FIG. 19

DATABASE IN MAP SERVER

| PREFECTURE | CITY/WARD | TOWN NAME | CHOUME | BLOCK NUMBER | GOU | GPS/MEMORY ADDRESS |
|---|---|---|---|---|---|---|
| ... | ... | ... | ... | ... | ... | ... |
| KYOTO PREFECTURE | SAKYOU-KU, KYOTO CITY | ... | ... | ... | ... | ... |
| KYOTO PREFECTURE | NAKAGYOU-KU, KYOTO CITY | %%-CHO | 521 | — | — | 35° 00' 37.XX" N 135° 45' 05.YY" E /0XD0000001 |
| KYOTO PREFECTURE | NAKAGYOU-KU, KYOTO CITY | ##-CHO | 1 | 10 | — | 35° 00' 59.XY" N 135° 45' 27.YX" E /0XD0000001 |
| ... | ... | ... | ... | ... | ... | ... |

FIG. 20

DATABASE IN MUSIC SERVER

| SONG TITLE | SINGER NAME | SONGWRITER/ COMPOSER | LYRICS | MEMORY ADDRESS |
|---|---|---|---|---|
| ⋮ | ⋮ | - | ⋮ | ⋮ |
| @@ | KOUDA AA | NAKAI BB /NAKAI BB | XXX········ | 0XA0000001 |
| ** | KOUDA AA | NAKAI BB /NAKAI BB | YYY········ | 0XA0030001 |
| ⋮ | ⋮ | ⋮ | ⋮ | ⋮ |

FIG. 21

DATABASE IN AUTHOR'S NAME SERVER

| NAME | BIRTHPLACE | BIRTHDAY | GENDER | BLOOD TYPE | URL |
|---|---|---|---|---|---|
| ⋮ | ⋮ | ⋮ | ⋮ | ⋮ | ⋮ |
| NAKAI BB | KANAGAWA | 1972/ 8/1 | MALE | B | http://www.BB. nakai.**.jp/index |
| ⋮ | ⋮ | ⋮ | ⋮ | ⋮ | ⋮ |

(A)

```
TO       : SEGAWA
SUB      : INVITATION
ATTACHMENT:   NONE
..................................
A MINI-LIVE CONCERT
BY KOUDA AA STARTS AT
16:00 TOMORROW.
DON'T YOU COME WITH
US? THE PLACE IS
SINTENKAN IN
NAKAGYOU-KU,
KYOTO CITY.

MAP
• T1
```
56
86

(B)

```
TO       : SEGAWA
SUB      : INVITATION
ATTACHMENT:   a.jpg,
              b.jpg
..................................
A MINI-LIVE CONCERT
BY KOUDA AA STARTS AT
16:00 TOMORROW.
DON'T YOU COME WITH
US? THE PLACE IS
SINTENKAN IN
NAKAGYOU-KU,
KYOTO CITY.

MAP
```
56

Map

```
TO   :SHIMIZU
SUB  :NOTIFICATION
ATTACHMENT:  NONE
........................................
A MINI-LIVE CONCERT BY
MY FRIEND KOUDA AA IS
HELD IN SINTENKAN IN
NAKAGYO-KU, KYOTO-
CITY, KYOTO.
THE MINI-LIVE CONCERT
STARTS AT 16:00
TOMORROW.  TUNES TO BE
PERFORMED ARE
OO"  " AND  "XX" .
IF YOU HAVE TIME,
INVITE OTHER FRIENDS
OF YOURS AND COME TO
THE LIVE!
 "OO"  AND   "XX"  ARE
WRITTEN AND COMPOSED
BY NAKAI BB.

NAKAI BB OFFICIAL HP
 • T2
```
/56
86

(B)

```
TO   :SHIMIZU
SUB  :NOTIFICATION
ATTACHMENT:  NONE
........................................
A MINI-LIVE CONCERT BY
MY FRIEND KOUDA AA IS
HELD IN SINTENKAN IN
NAKAGYO-KU, KYOTO-
CITY, KYOTO.
THE MINI-LIVE CONCERT
STARTS AT 16:00
TOMORROW.  TUNES TO BE
PERFORMED ARE
OO"  " AND  "XX" .
IF YOU HAVE TIME,
INVITE OTHER FRIENDS
OF YOURS AND COME TO
THE LIVE!
 "OO"  AND   "XX"  ARE
WRITTEN AND COMPOSED
BY 中井  BB.

NAKAI BB OFFICIAL HP
http://www.BB.
 nakai.**.jp/index
```
/56
86

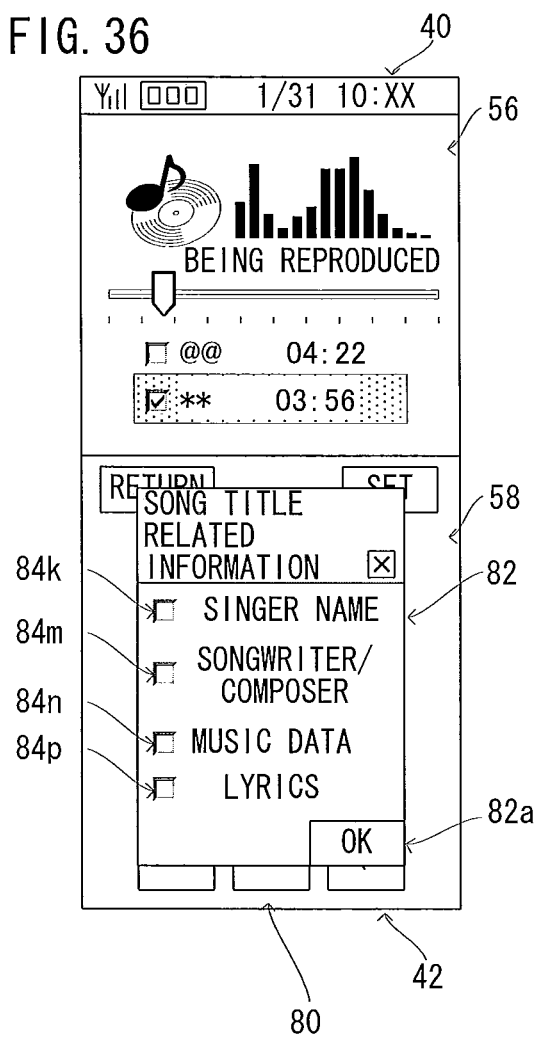

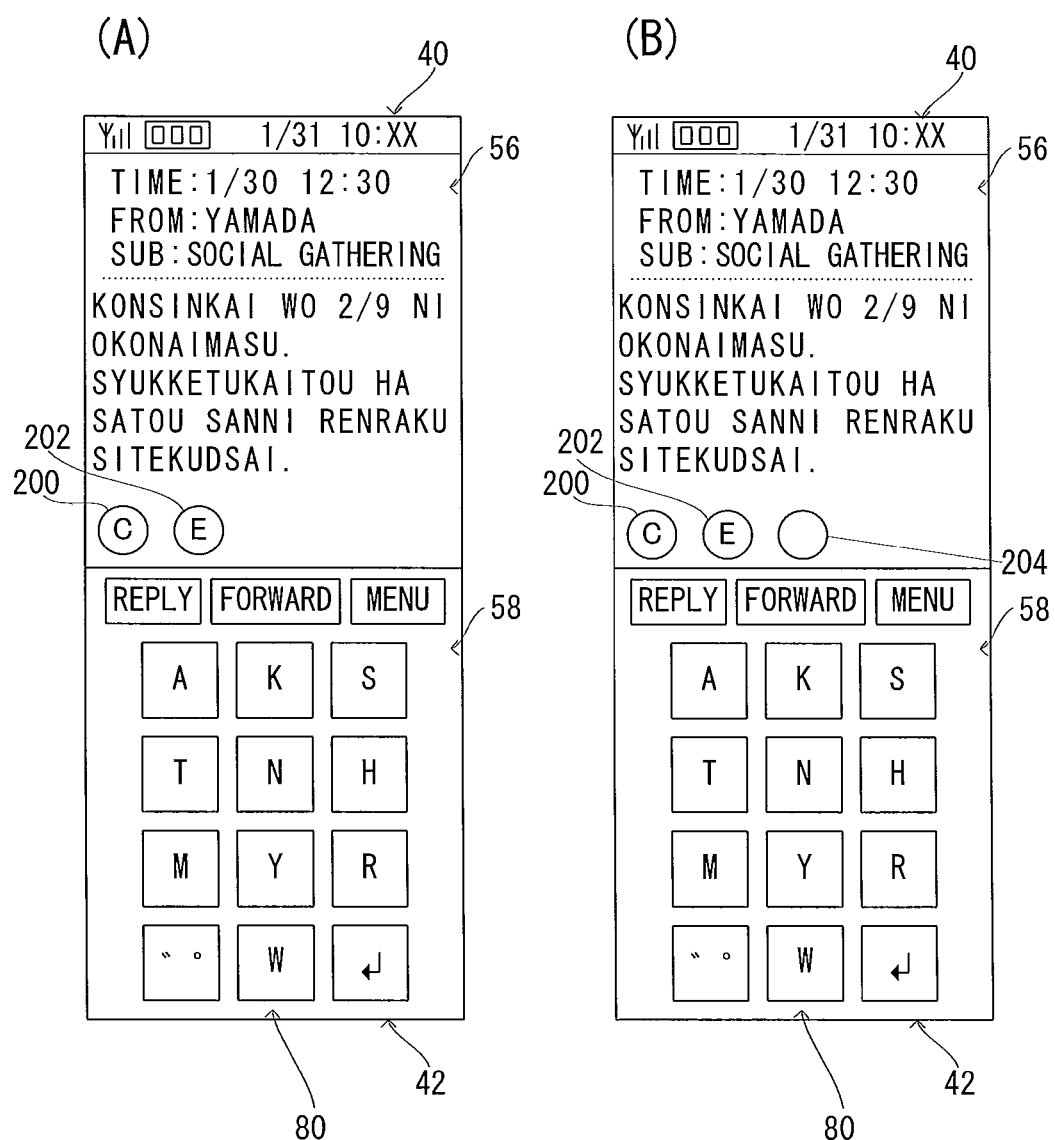

US 8,612,896 B2

MOBILE TERMINAL, DATA CONTROL PROGRAM, AND DATA CONTROL METHOD

TECHNICAL FIELD

The present invention relates to a mobile terminal and, more specifically to a mobile terminal that is operated using, for example, a touch panel.

DESCRIPTION OF THE RELATED ARTS

One example of the technique related to such a type of the device is disclosed in Patent Document 1. This technique is related to a mobile terminal device in which characters are entered by operating character entry keys displayed on a touch panel. In this mobile terminal device, an entry character display area and an entry character selection area are displayed on the touch panel that functions as an display unit. First, upon character entry, there are initially displayed in the entry character selection area plural characters allocation keys to each of which a plurality of characters are allocated, and when an arbitrary plural characters allocation key is operated, there is further displayed an area for entering the characters allocated to the plural characters allocation key. Then, when an operation is performed on the re-displayed character entry area, a character appears in the entry character display area.

Further, according to the related technique disclosed in Non-Patent Document 1, an entered character string can be moved by copying the same. Specifically, a cursor is moved by operating a cursor key to specify a first character in a character string to be moved and then a range specification key is operated to give a state where the character string to be selected can be specified. Next, the cursor key is operated to specify a range of the character string to be selected and then an end point key is operated to select the character string and display a screen on which functions to copy etc. are selected. Then, when the copy function is selected, this character string is copied. Subsequently, the cursor is moved with the cursor key to specify a desired position to which the copied character string is moved. Next, a menu key is operated to display a list of "data to be pasted". Then, when the copied character string is selected, this copied character string is inserted.

DOCUMENT OF THE RELATED ARTS

Patent Literature Document

Patent Literature Document 1: Japanese Unexamined Patent Publication No. 2007-280153 [G06F 3/041, G06F 3/023, H03M11/04]

Non-Patent Literature Document 1: W21SA by SANYO Handling Manual (p. 252)

SUMMARY OF THE INVENTION

Problems to be Solved by the Invention

However, in the related technique of Patent Document 1, although characters can be entered using the touch panel, an entered character string cannot be selected.

Moreover, in the related technique of Non-Patent Document 1, a plurality of operations need to be performed to select an entered character string, so that user operations are complicated. Accordingly, the user cannot easily move the copied character string. Furthermore, related information on the copied character string cannot be acquired, and there is no description about storage of the related information on the copied character string.

In view of the above, it is a main object of the present invention to provide a novel mobile terminal, a data control program, and a data control method.

It is another object of the present invention to provide a mobile terminal, a data control program, and a data control method that allow related information on arbitrary data to be easily stored and to utilize the stored related information thus stored.

Means for Solving the Problems

To solve the problems described above, the present invention has employed the following configurations. It is to be noted that parenthesized reference symbols, supplementary description, etc. only indicate their correlations with described embodiments for easier understanding of the present invention and are not to be taken by way of limitation.

A first invention provides a mobile terminal having a display device that has a touch panel and displays arbitrarily selectable first data in a first display range and a design in a second display range and a touch position detection device that detects a touch start position and a touch end position on the touch panel, the mobile terminal including a selection unit that selects part or all of the first data based on a first touch start position and a first touch end position detected by the touch position detection device; a first display unit that displays first related information of the selected first data when a second touch start position is contained in the first display range and a second touch end position is contained in the second display range; a storage unit that, when the first related information displayed by the first display unit is selected by operating the touch panel, stores the selected first related information so as to be correlated with the design; a second display unit that, when a third touch start position is contained in the second display range and a third touch end position is contained in the first display range in a state where the first related information is stored by the storage unit, displays the first related information stored by the storage unit as second related information; and an addition unit that, when the second related information displayed by the second display unit is selected by operating the touch panel, adds the selected second related information to second data to be displayed in the first display range.

In the first invention, the mobile terminal (10) has the display device (32) that has the touch panel (24) and displays arbitrarily selectable first data (body text of a received mail) in the first display range (function display area 56) and a design (group of character input keys) in the second display range (key input range 58) and the touch position detection device (20) that detects a touch start position (starting point coordinates) and a touch end position (ending point coordinates) on the touch panel. The selection unit (20, S29: S59, S65) selects part or all of the first data based on a first touch start position and a first touch end position detected by the touch position detection device. The first display unit (20, S95, S113, S141, S169) displays first related information of the selected first data when a second touch start position is contained in the first display range and a second touch end position is contained in the second display range. The storage unit (20, S99, S119, S123, S125, S147, S151, S153, S173), when the first related information displayed by the first display unit is selected by operating the touch panel, stores the selected first related information so as to be correlated with the design. When a third touch start position is contained in the second display range and a third touch end position is contained in the first display range in a state where the first related information is stored by the storage unit, the second display unit (20, S227, S233), displays the first related information stored by the storage unit as second related information. When the second related information displayed by the second display unit is selected by operating the touch panel, the addition unit (20, S243, S249) adds the selected second related information to second data (body text of a transfer mail) to be displayed in the first display range.

For example, the first data is character string data in the body text of the received mail and the second data is character string data in the body text of a transfer mail to transfer the received mail. The selection unit selects a character string in the body text of the received mail. When a second touch start position is contained in the first display range in which the first data is displayed and a second touch end position is contained in the second display range in which a design is displayed in a state where a character string is selected, the first related information of the selected character string is displayed. The storage unit stores the selected first related information so as to be correlated with the design. Then, when a third touch start position is contained in the second display range in which a design is displayed and a third touch end position is contained in the first display range in which displayed is the character string data of the body text of a transfer mail, which is the second data, in a state where the first related information is stored so as to be correlated with the design, the second display unit displays the first related information as second related information. Then, when the second related information is selected, the selected second related information is added, that is, inserted or added as a postscript into the body text of the transfer mail.

According to the first invention, data selected by operating the touch panel has its related information stored, which stored related information is added to an arbitrary position. That is, the user can utilize the touch panel to easily store the related information of selected data and simply utilize the stored related information.

A second invention is dependent on the first invention, in which, when the second touch start position is contained in a display area ("佐" (Japanese Kanji (SA)) character display area, "藤" (Japanese Kanji (TOU)) character display area, etc.) of the first data selected by the selection unit and the second touch end position is contained in the second display area, the first related information of the selected first data is displayed.

According to the second invention, the user can operate the touch panel while clearly recognizing the selected data.

A third invention is dependent on the first or second invention, in which, when the third touch start position is contained in the second display range and the third touch end position is contained in a display area ("↓" area coordinates etc.) of the second data, the second display unit displays the first related information stored by the storage unit as the second related information.

According to the third invention, the user can operate the touch panel while clearly recognizing a position to add the stored related information.

A fourth invention is dependent on any one of the first through third inventions, in which there are a plurality of designs each configured identically with the design, when the second touch start position is contained in the first display range and the second touch end position is contained in a display area of one of the designs, the first display unit displays the first related information of the selected first data, and the storage unit stores the selected first related information so as to be correlated with the one design.

According to the fourth invention, the user can operate the touch panel while clearly recognizing a design which is utilized in storage.

A fifth invention is dependent on the fourth invention, in which, when the third touch start position is contained in the display area of the one design corresponding to the first related information stored by the storage unit and the third touch end position is contained in the first display range, the second display unit displays the first related information stored so as to be correlated with the one design as the second related information.

According to the fifth invention, the user can operate the touch panel after recognizing a design utilized in storage when adding the related information.

A sixth invention is dependent on any one of the first through fifth inventions, in which the first display unit includes a related information acquisition unit that acquires the first related information of the selected first data, and the first display unit displays the first related information acquired by the related information acquisition unit.

In the sixth invention, the related information acquisition unit (20, S89, S93, S105, S129, S133, S163, S167) acquires the first related information of selected first data. Then, the first display unit displays the first related information acquired by the related information acquisition unit.

For example, the related information acquisition unit acquires from a database stored in a storage device or a database stored in a server.

According to the sixth invention, the related information of the selected data, even in a case of being stored in various places, can be utilized.

A seventh invention is dependent on the sixth invention, further includes a candidate display unit that, when there are a plurality of candidates for the first related information, which is acquired by the related information acquisition unit, of the selected first data, selectably displays the plurality of candidates, and, when any one of the plurality of candidates displayed by the candidate display unit is selected by operating the touch panel, the first display unit displays the first related information of the selected candidate.

In the seventh invention, when there are a plurality of candidates for the first related information, which is acquired by the related information acquisition unit, of the selected first data, the candidate display unit (20, S109, S137) selectably displays the plurality of candidates. Then, when any one of the plurality of candidates displayed by the candidate display unit is selected by operating the touch panel, the first display unit displays the first related information of the selected candidate.

For example, when the first data is the character string of a place name such as "Fuchu City", the candidate display unit displays two candidates of "Fuchu City, Tokyo" and "Fuchu City, Hiroshima Prefecture". Then, when "Fuchu City, Hiroshima Prefecture" is selected, the first display unit displays the first related information of "Fuchu City, Hiroshima Prefecture".

According to the seventh invention, when the selected data pieces are homonyms, the user can narrow them down to an intended meaning.

An eighth invention is dependent on the sixth or seventh invention, further includes a storage device that stores the first related information of the selected first data, and the related information acquisition unit includes a first related information acquisition unit that acquires the first related information of the selected first data from the storage device.

The eighth invention further includes the storage device (28) that stores the first related information of selected first data. The first related information acquisition unit (20, S89, S133, S167) acquires the first related information of the selected first data from the storage device.

According to the eighth invention, it is possible to store the related information of selected data in the storage device of the mobile terminal Then, the user can select arbitrary data, thereby utilizing the related information of the selected data.

A ninth invention is dependent on any one of the sixth through eighth inventions, further includes a communication unit that performs data communication with a server that stores the first related information of the selected first data, and the related information acquisition unit further includes a second related information acquisition unit that acquires the first related information of the selected first data from the server.

In the ninth invention, the communication unit (14, 20) performs data communication with the server (110, 120, 130) that stores the first related information of selected first data. The second related information acquisition unit (12, 14, 20, S93, S105, S129, S161) acquires the first related information of the selected first data from the server.

According to the ninth invention, it is possible to store the related information of selected data in the server that performs data communication with the mobile terminal. Then, the user can select arbitrary data, thereby utilizing the related information of the selected data by utilizing the server.

A tenth invention is dependent on the ninth invention, in which the server stores third data, when a memory address of the third data is acquired by the second related information acquisition unit, the storage unit stores an IP address of the server and the memory address of the third data as the first related information, a data acquisition unit is further included, the data acquisition unit acquiring the third data from the server based on the IP address of the server and the memory address of the third data when the IP address of the server and the memory address of the third data are stored by the storage unit as the first related information, and the addition unit adds the third data acquired by the data acquisition unit to the second data.

In the tenth invention, the server stores the third data (map image, music data). When a memory address of the third data is acquired by the second related information acquisition unit, the storage unit stores an IP address of the server and the memory address of the third data as the first related information. When the IP address of the server and the memory address of the third data are stored by the storage unit as the first related information, the data acquisition unit (20, S247) acquires the third data from the server based on the IP address of the server and the memory address of the third data. Then, the addition unit adds the third data acquired by the data acquisition unit to the second data. For example, when the third data is map image data, the map image data is inserted into the body text of a transfer mail.

According to the tenth invention, since only a character string containing the IP address and the memory address is stored as the related information, it is possible to reduce the percentage of the storage data with respect to the data capacity of the storage device of the mobile terminal.

An eleventh invention is dependent on any one of the sixth through tenth inventions, in which the first data contains metadata, and the related information acquisition unit further includes a third related information acquisition unit that acquires the related information of the selected first data from the metadata contained in the selected first data.

In the eleventh invention, the first data contains metadata (400b, 400d, 402b, 402d). The third related information acquisition unit (20, S167) acquires the related information of selected first data from the metadata contained in the selected first data.

According to the eleventh invention, the user can utilize the metadata contained in selected data as the related information.

A twelfth invention is dependent on the eleventh invention, in which the first data contains image data, and the selection unit includes an image data selection unit that selects the image data when the arbitrarily selectable data is the image data.

In the twelfth invention, the first data contains the image data (400, 400a, 400c). When the arbitrarily selectable data is image data, the image data selection unit (20, S65) selects the image data.

According to the twelfth invention, even when the arbitrary data is image data, the user can select it.

A thirteenth invention is dependent on the eleventh invention, in which the metadata contains a title of the first data, and the related information acquisition unit further includes a title acquisition unit that acquires the title of the selected first data from the metadata contained in the selected first data and a fourth related information acquisition unit that acquires the first related information of the selected first data based on the title acquired by the title acquisition unit.

In the thirteenth invention, the metadata contains a title of the first data. The title acquisition unit (20, S161) acquires the title of the selected first data from the metadata contained in the selected first data. The fourth related information acquisition unit (20, S163) acquires the first related information of the selected first data based on the title acquired by the title acquisition unit.

According to the thirteenth invention, when the selected data is not character string data, a title of the selected data can be acquired and utilized to search for the database containing the related information etc.

A fourteenth invention is dependent on the first through thirteenth inventions, in which the second display unit includes a partial readout unit that reads part of the first related information stored by the storage unit and a simple display unit that simply displays the part of the first related information read by the partial readout unit as the second related information.

In the fourteenth invention, the partial readout unit (20, S223) reads part of the first related information stored by the storage unit. The simple display unit (20, S227) simply displays the part of the first related information read by the partial readout unit, as the second related information. For example, the simple display unit simply displays the second related information before a touch ending point position is denoted.

According to the fourteenth invention, the user can determine a position to add related information after recognizing the related information simply displayed.

A fifteenth invention is dependent on any one of the first through fourteenth inventions, in which the design is used as character input keys, and a display state alteration unit is further included, the display state alteration unit changing a display state of the design when the related information is stored so as to be correlated with the design.

In the fifteenth invention, a design is used as the character input keys. The display state alteration unit (20, S35) changes a display state of the design when the related information is stored so as to be correlated with the design.

According to the fifteenth invention, the user can recognize that a function to read the stored related information and another function are set to the design.

A sixteenth invention provides a data control program that causes a processor (20) in a mobile terminal having a display device (32) that has a touch panel (24) and displays arbitrarily selectable first data (character string, image) in a first display range and a design (group of character input keys) in a second display range and a touch position detection device (20) that detects a touch start position (starting point coordinates) and a touch end position (ending point coordinates) on the touch panel, to function as a selection unit (S29: S59, S65) that selects part or all of the first data based on a first touch start position and a first touch end position detected by the touch position detection device; a first display unit (S95, S113, S141, S169) that displays first related information of the selected first data when a second touch start position is contained in the first display range and a second touch end position is contained in the second display range; a storage unit (S99, S119, S123, S125, S147, S151, S153, S173) that, when the first related information displayed by the first display unit is selected by operating the touch panel, stores the selected first related information so as to be correlated with the design; a second display unit (S227, S233) that, when a third touch start position is contained in the second display range and a third touch end position is contained in the first display range in a state where the first related information is stored by the storage unit, displays the first related information stored by the storage unit as second related information; and an addition unit (S243, S249) that, when the second related information displayed by the second display unit is selected by operating the touch panel, adds the selected second related information to second data to be displayed in the first display range.

In the sixteenth invention also, similarly to the first invention, the user can utilize the touch panel to easily store the related information of selected data and simply utilize the stored related information.

A seventeenth invention provides a data control method in a mobile terminal having a display device (32) that has a touch panel (24) and displays arbitrarily selectable first data (character string, image) in a first display range and a design (group of character input keys) in a second display range and a touch position detection device (20) that detects a touch start position (starting point coordinates) and a touch end position (ending point coordinates) on the touch panel, the method including a selection step (S29: S59, S65) of selecting part or all of the first data based on a first touch start position and a first touch end position detected by the touch position detection device; a first display step (S95, S113, S141, S169) of displaying first related information of the selected first data when a second touch start position is contained in the first display range and a second touch end position is contained in the second display range; a storage step (S99, S119, S123, S125, S147, S151, S153, S173) of, when the first related information displayed in the first display step is selected by operating the touch panel, storing the selected first related information so as to be correlated with the design; a second display step (S227, S233) of, when a third touch start position is contained in the second display range and a third touch end position is contained in the first display range in a state where the first related information is stored in the storage step, displaying the first related information stored in the storage step as second related information; and an addition step (S243, S249) of, when the second related information displayed in the second display step is selected by operating the touch panel, adding the selected second related information to second data to be displayed in the first display range.

In the seventeenth invention also, similarly to the first invention, the user can utilize the touch panel to easily store the related information of selected data and simply utilize the stored related information.

The above described objects and other objects, features, and advantages of the present invention will become more apparent from the following detailed description of the embodiments when taken in conjunction with the accompanying drawings.

BRIEF DESCRIPTION OF THE DRAWINGS

FIG. 2 is an illustrative view showing an outer appearance of the mobile terminal shown in FIG. 1.

FIGS. 3A-3C illustrate example user interfaces on an LCD monitor of the mobile terminal shown in FIG. 1.

FIGS. 6A and 6B illustrate another part of the example of the procedure for temporary storage of the related information in the received mail shown in FIG. 4.

FIGS. 7A-7E illustrate, in detail, an example of a procedure for selecting a character string shown in FIG. 5.

FIGS. 10A and 10B illustrate another part of an example of the insertion procedure in the transfer mail shown in FIG. 9.

FIGS. 11A and 11B illustrate, in detail, an example of the insertion procedure in the transfer mail shown in FIG. 9.

FIG. 16 is an illustrative view showing details of search table data stored in the RAM shown in FIG. 14.

FIG. 17 is an illustrative view showing details of address book data stored in the RAM shown in FIG. 14.

FIGS. 18A and 18B illustrate example details of folder data and memory addresses of temporary storage data stored in the RAM shown in FIG. 14.

FIG. 19 is an illustrative view showing details of a database stored in an HDD of a map server shown in FIG. 1.

FIG. 20 is an illustrative view showing details of a database stored in an HDD of a music server shown in FIG. 1.

FIG. 21 is an illustrative view showing details of a database stored in an HDD of an author's name server shown in FIG. 1.

FIGS. 34A and 34B illustrate an example of a related information temporary storage procedure by use of the author's name server shown in FIG. 1.

FIG. 36 is an illustrative view showing a music data's related information temporary storage procedure.

FIGS. 37A and 37B illustrate an example of a procedure for producing dedicated keys used in temporary storage.

FORMS FOR EMBODYING THE INVENTION

Figure 1:
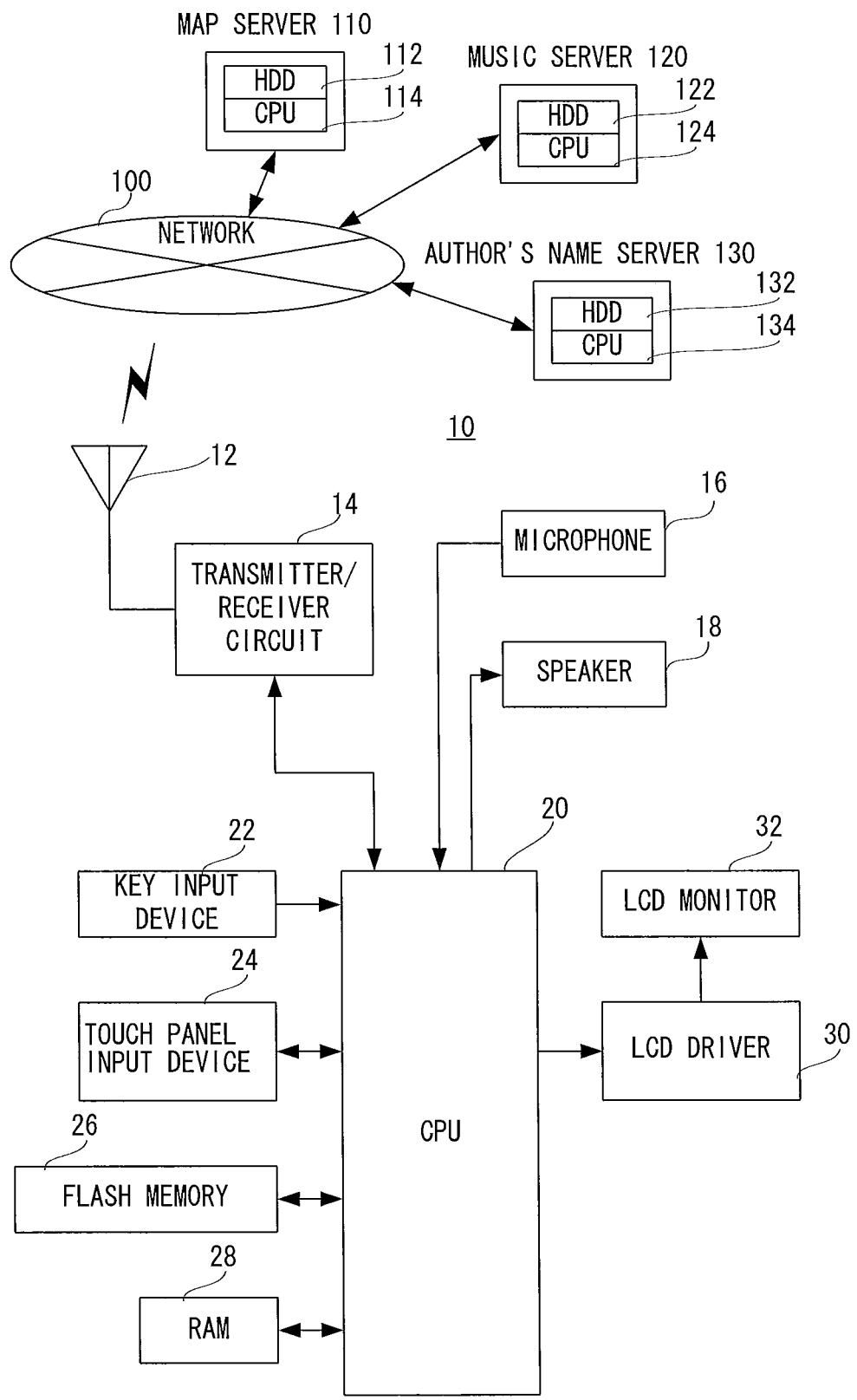
FIG. 1 is a block diagram showing an electrical configuration of a mobile terminal in one embodiment of the present invention.

With reference to FIG. 1, a mobile terminal 10 includes a key input device 22 and a touch panel input device 24. If calling is performed by the key input device 22 or the touch panel input device 24, a CPU 20 (also referred to as processor or computer) outputs a call signal by controlling a transmitter/receiver circuit 14 in accordance with the CDMA system. The output call signal is sent from an antenna 12 and transmitted to a mobile communication network including a base station. Then, if a call partner responds to the signal, a call-enabled state is established.

If an operation is performed to end the call by the key input device 22 after the call-enabled state is established, the CPU 20 controls the transmitter/receiver circuit 14 to transmit a call end signal to the mobile communication network including the base station. After transmitting the call end signal, the CPU 20 ends the call processing. Further, also in a case of having received the call end signal first from the call partner, the CPU 20 ends the call processing. Moreover, no matter who the call partner is, also in a case of having received the call end signal from the mobile communication network, the CPU 20 ends the call processing.

If the call signal from a call partner is captured by the antenna 12 in a state where a power supply for the mobile terminal 10 is ON, the transmitter/receiver circuit 14 notifies the CPU 20 of its arrival. The CPU 20 causes source information described in the arrival notification to be displayed on an LCD monitor 32 controlled by an LCD driver 30, and outputs a ringtone from an arrival notification speaker which is not shown. If an operation is performed to respond to it by using the key input device 22, the call-enabled state is established.

In the call-enabled state, the following operation will be performed. A modulated speech signal (high-frequency signal) transmitted from a call partner is received by the antenna 12. The received modulated speech signal is demodulated and decoded by the transmitter/receiver circuit 14. The thus received speech signal is output from a speaker 18. Further, a transmitted speech signal taken in by a microphone 16 is encoded and modulated by the transmitter/receiver circuit 14. A modulated speech signal obtained in such a manner is transmitted utilizing the antenna 12 in much the same way as the above.

Further, the touch panel input device 24 is constituted of a touch panel and its control circuit, to detect touch by using an electrostatic capacitance system configured to detect a change in electrostatic capacitance between electrodes caused by approximation of the finger to the surface of the touch panel input device 24. It is to be noted that the present touch panel input device 24 has employed a projection type electrostatic capacitance system configured to detect a change in electrostatic capacitance between the electrodes caused by approximation of the finger by forming an electrode pattern on a transparent film etc. Further, as the method for detection, a surface type electrostatic capacitance system may be employed as well as a resistor film system, a ultrasonic wave system, an infrared system, or an electromagnetic system.

It is to be noted that hereinafter the user's operation of touching the front surface of the touch panel input device 24 with his or her finger will be referred to as an operation to "touch". On the other hand, his or her operation to release his or her finger from the touch panel input device 24 will be referred to as an operation to "release". Further, coordinates of an operation start position denoted by touching will be referred to as "starting point coordinates" and the coordinates of an operation end position denoted by releasing will be referred to as "end point coordinates". Furthermore, the user's operation to touch the front surface of the touch panel input device 24 with the finger and then release it from the surface will be referred to as a "touch operation". It is to be noted that besides the finger, a tapered stick like a pen may be used in operations onto the touch panel input device 24. Further, a touch pen etc. dedicated for the operations may be provided.

Further, a position at which the finger etc. may touch will be the gravity center of an area of the finger in contact with the touch panel input device 24. However, if the touch position is assumed to be the gravity center of the area of the finger in contact with the touch panel input device 24, the contact area of the finger may be changed even if the user would not intend to do so. Accordingly, even if the user recognizes that he or she is not moving the touch position, the CPU 20 may detect that the touch position is moving. To prevent it, the CPU 20 determines that the touch position is not changing if the touch position moves only slightly (for example, a distance of 10 dots or less on the LCD monitor 32).

If data is communicated via a network 100 by the key input device 22 or the touch panel input device 24, the CPU 20 controls the transmitter/receiver circuit 14, to communicate the data with a map server 110, a music server 120, or an author's name server 130.

The map server 110 is equipped with an HDD 112 and a CPU 114, and the HDD 112 stores a database including place names all over Japan and global positioning system (GPS)

information corresponding to those place names. Further, the HDD 112 stores a map image corresponding to the GPS information also. It is to be noted that instead of the domestic place names and map information of Japan, the worldwide place names and map information may be stored in the HDD 112.

The music server 120 is equipped with an HDD 122 and a CPU 124, and the HDD 122 stores a database containing music data of a variety of tunes and the corresponding song titles, singers, and lyrics.

The author's name server 130 is equipped with an HDD 132 and a CPU 134, and the HDD 132 stores a database containing the names, birthplaces, birthdays, and blood types of those singers and the songwriters and music composers. It is to be noted that the database of the author's name server may contain the profiles of actors/actresses, politicians, and historical figures.

With this, the user of the mobile terminal 10 can communicate data with each of the servers by using the mobile terminal 10, thereby obtaining information such as a map image corresponding to the present position, the lyrics of an interesting tune, or the profile of an interesting author's name.

FIG. 2 is an external view showing the outer appearances of the mobile terminal 10. As shown in FIG. 2, the mobile terminal 10 has a case C formed like a plate. The microphone 16 and the speaker 18, not shown in FIG. 2, are built in the case C. An opening op2 leading to the built-in microphone 16 is formed in one of the length-directional main surfaces of the case C, while an opening op1 leading to the built-in speaker 18 is formed in the other length-directional main surface of the case C. That is, the user hears sounds output from the speaker 18 through the opening op1 and inputs speeches to the microphone 16 through the opening op2.

The key input device 22 includes a call key 22a, a menu key 22b, and a call end key 22c, which keys are mounted on the main surface of the case C. The LCD monitor 32 is mounted in such a manner that its monitor screen may be exposed to the main surface of the case C, and further, on the front surface of the LCD monitor 32, the touch panel input device 24 is fitted.

The user responds to a call by pressing the call key 22a and ends the call by pressing the call end key 22c. Further, the user presses the menu key 22b, to display a menu screen shown in FIG. 3(B) on the LCD monitor 32. Then, by pressing the call end key continuously, he or she can turn ON/OFF the power supply for the mobile terminal 10.

Further, the touch panel input device 24 is a pointing device with which the user specifies an arbitrary position on the screen of the LCD monitor 32. If operated through pressing, sliding, or touching on its front surface with the finger, the touch panel input device 24 outputs the data of coordinates of the operated position. That is, the user can press, slide on, or touch the front surface of the touch panel input device 24 by his or her finger, thereby inputting an operation direction and a graphic to the mobile terminal 10.

FIGS. 3(A) to 3(C) are illustrative views showing a display example of the LCD monitor 32. FIG. 3(A) is a display example of a standby state of the mobile terminal 10. As shown in FIG. 3(A), the LCD monitor 32 displays a state display range 40 and an image display range 42. The state display range 40 displays a sensitivity of the antenna 12, a remaining battery capacity, and a present time. The image display range 42 displays image data denoting the standby state if, for example, the mobile terminal 10 is in the standby state. Further, corresponding to performed functions, various images are displayed in the image display range 42. It is to be noted that detailed description of the state display range 40 and the image display range 42 will be omitted in the cases of the other display examples for ease of description because they are almost the same in those examples.

FIG. 3(B) is a display example showing the menu screen. The menu screen appears if the menu key 22b is pressed. As shown in FIG. 3(B), the image display range 42 displays a telephone function key 44, an address book function key 46, a mail function key 48, a browser function key 50, a data folder function key 52, a tool function key 54, etc. The user would touch an arbitrary one of the function keys, to perform the function corresponding to this arbitrary function key. For example, if the telephone function key 44 is pressed, an image (see FIG. 3(C)) denoting the performing of the telephone function appears on the LCD monitor 32.

The following will simply describe behaviors in a case where those function keys are touched. If the telephone function key 44 is touched, the mobile terminal 10 performs telephone functions as described above. If the address book function key 46 is touched, the mobile terminal 10 displays a registered address book. If the mail function key 48 is touched, the mobile terminal 10 performs mail functions shown in FIGS. 4(A) to 4(C). If the browser function key 50 is touched, the mobile terminal 10 connects the network 100 so that the LCD monitor 32 may display character strings and images obtained through data communication with the map server 110, the music server 120, or the author's name server 130.

If the data folder function key 52 is touched, the mobile terminal 10 displays on the LCD monitor 32 the contents of a data folder storing image data, music data, etc. stored in a RAM 28. If the tool function key 54 is touched, the mobile terminal 10 displays on the LCD monitor 32 a screen to change its own settings (present time, contrast of the LCD monitor 32).

It is to be noted that if the mobile terminal 10 is equipped with functions such as camera functions or TV tuner functions, the menu screen displays further more function keys.

FIG. 3(C) is a display example in a case where the aforesaid telephone function key 44 is touched. As shown in FIG. 3(C), the image display range 42 contains a function display range 56 and a key input range 58. The function display range 56 displays the results of touching on the keys contained in the key input range 58. The key input range 58 displays a telephone function input key group 60 including number string input keys (0 to 9) for inputting numbers and keys for displaying a incoming history and a outgoing history.

For example, if the numerical input key is touched, the function display range 56 displays a number string (telephone number) corresponding to the touched numerical input key. Further, if the call key 22a is pressed, the mobile terminal 10 transmits the call signal to establish a communication state with a telephone that corresponds to the input telephone number.

It is to be noted that detailed description of the key input range 58 and the function display range 56 will be omitted in the cases of the other display examples of the telephone functions and the mail functions for ease of description because they are almost the same in those examples.

Figure 4:
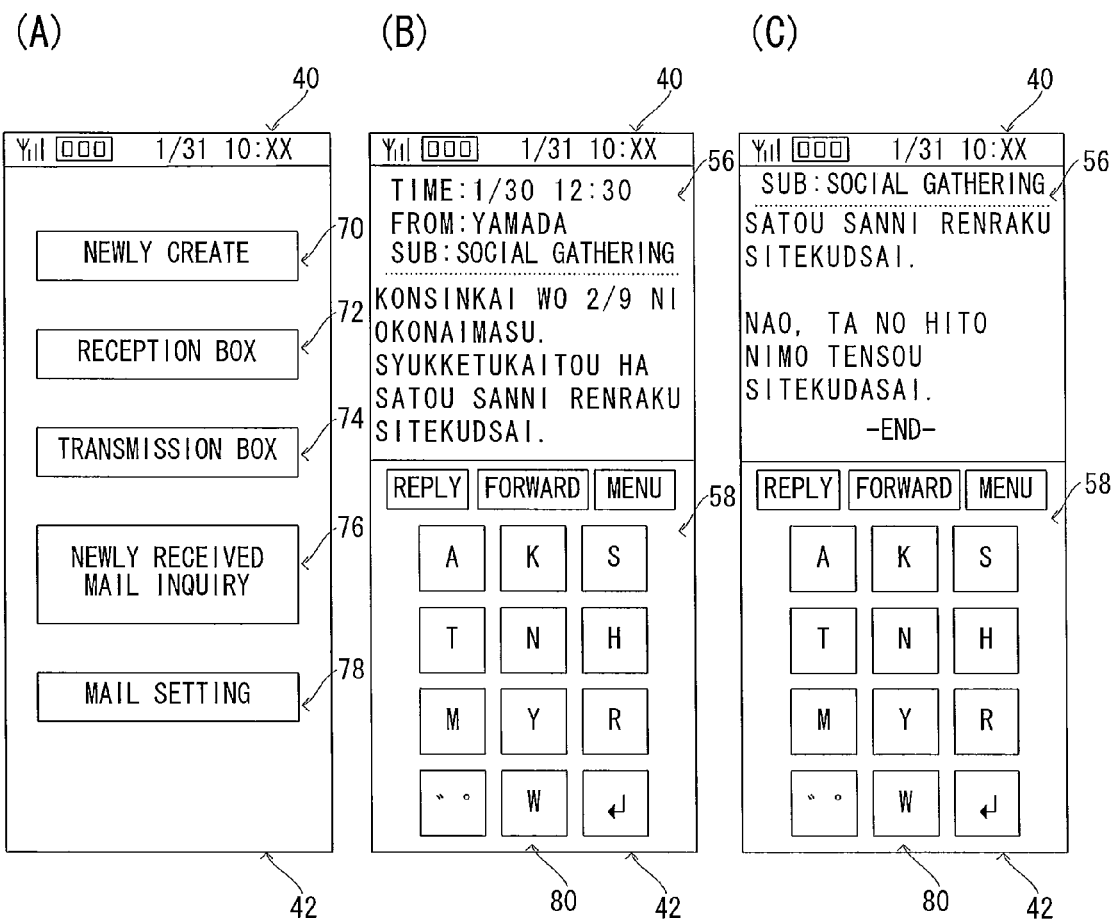
FIGS. 4A-4C illustrate example user interfaces for a mail function of the mobile terminal shown in FIG. 1.

FIGS. 4(A) to 4(C) are illustrative views showing display examples of a mail function. FIG. 4(A) is a screen that appears after the mail function key 48 is touched on the menu screen shown in FIG. 3(B). As shown in FIG. 4(A), the image display range 42 displays a newly creating key 70, a incoming box key 72, a outgoing box key 74, a newly-arrived mail inquiry key 76, and a mail setting key 78. If the newly creating key 70 is touched, the mobile terminal 10 displays on the LCD monitor 32 a screen on which a new mail is created. If the incoming box key 72 is touched, the mobile terminal 10 displays a list of mails received (received mails). If the outgoing box key 74 is touched, the mobile terminal 10 displays a list of mails transmitted (transmitted mails) on the LCD monitor 32. If the newly-arrived mail inquiry key is touched, the mobile terminal 10 performs data communication to query a server, not shown, on whether newly-arrived mails are accumulated. If the mail setting key 78 is touched, the mobile terminal 10 displays a screen on which settings (setting for automatic mail incoming etc.) in the mail function are changed.

FIG. 4(B) is a display example in the case of checking the contents of a received mail. As shown in FIG. 4(B), similarly to the telephone functions, the image display range 42 contains the function display range 56 and the key input range 58. The function display range 56 displays the information (mail incoming time, sender, subject, etc.) in a received mail and its body text.

The key input range 58 displays a mail function input key group 80 including character input keys for inputting characters, a "返信" (Japanese Kanji (HENSHIN)) key, a "転送" (Japanese Kanji (TENSOU)) key, and a "メニュー" (Japanese Katakana (menu))" key. For example, the character input keys include an "あ" (Japanese Hiragana (A)) line character input key. The "あ" (Japanese Hiragana (A)) line character keys are used to input the characters of "あ, い, う, え, お" (Japanese Hiragana (A, I, U, E, O)), so that if they are touched, the respective "あ" (Japanese Hiragana (A)) line characters can be specified and input. For example, if the user touches the key once, he or she can input the characters of "あ" (Japanese Hiragana (A)), and if he or she touches it again, he or she can input the character of "い" (Japanese Hiragana (A)).

If the finger is slid vertically on the function display range 56, contents displayed in the function display range 56 are scrolled vertically. That is, if the indicated coordinates of a starting point and an ending point are different, the displayed contents are scrolled. For example, if the coordinates of the starting point and the ending point are indicated to an upper position and a lower position in the function display range 56 respectively, the contents displayed in the function display range 56 are scrolled downward, to display, as shown in FIG. 4(C), the body text of a received mail which is not shown in FIG. 4(B). Further, if in FIG. 4(C) the coordinates of the starting point and the ending point are indicated to a lower position and an upper position in the function display range 56 respectively, the contents displayed in the function display range 56 are scrolled upward, to make a return to the display state of FIG. 4(B).

Further, if a position where no key is displayed is touched in the key input range 58 such as shown in FIGS. 3(C) and 4(B), the display of the character input keys is hidden, to display only the "返信" (Japanese Kanji (HENSHIN)) key, the "転送" (Japanese Kanji TENSOU)) key, and the "メニュー" (Japanese Katakana (menu)) key. Further, if a position where no key is displayed is touched in a state where the character input keys are hidden, the character input keys appear again.

It is to be noted that the key input range 58, the character input keys may be hidden in response to downward sliding and displayed again in response to upward sliding at a position where no key is displayed.

In this case, the mobile terminal 10 is equipped with a function to store a character string or an image displayed on the LCD monitor 32 and related information of the character string or the image in response to touching on the touch panel input device 24 and easily insert (add) this stored character string to data (character string data) etc. displayed on the LCD monitor 32.

Figure 5:
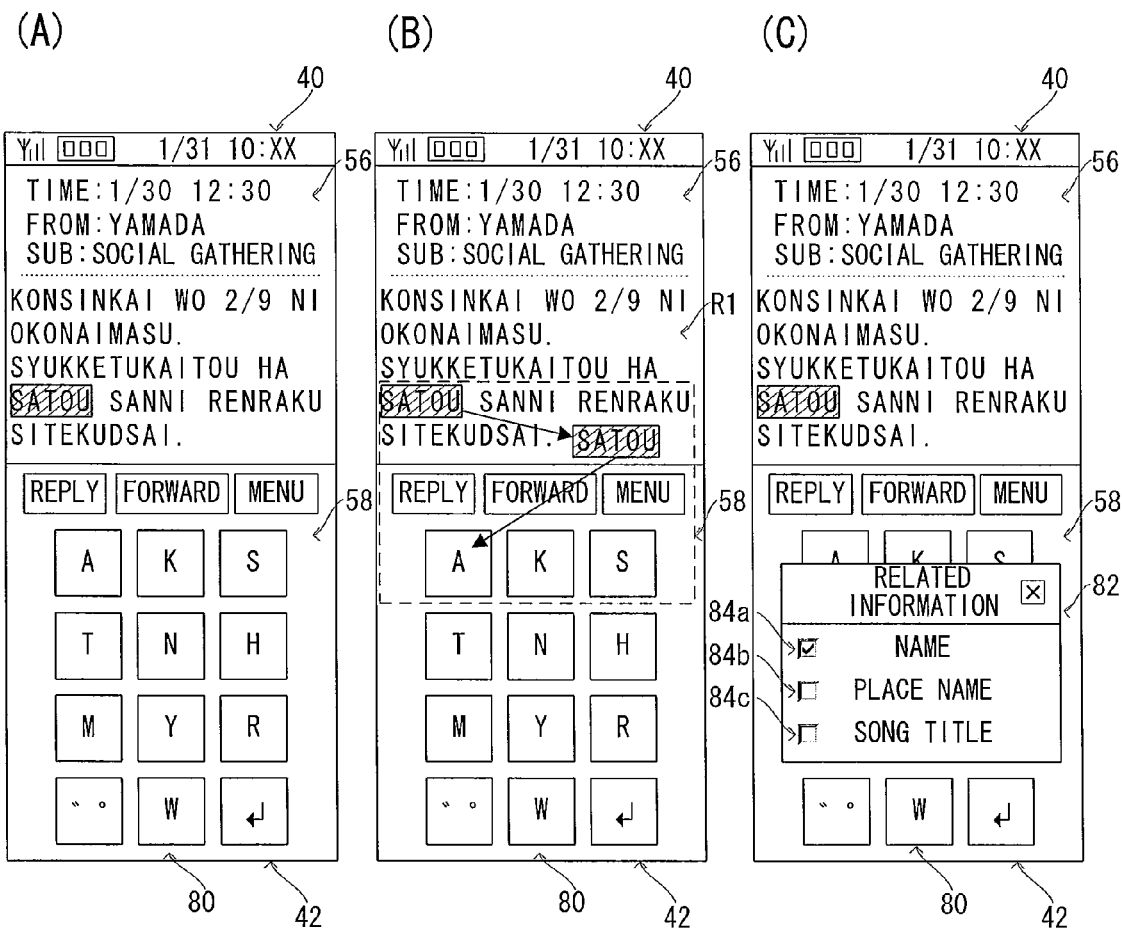
FIGS. 5A-5C illustrate part of an example of a procedure for temporary storage of related information in a received mail shown in FIG. 4.

For example, if a character string in the body text of a received mail is selected on the basis of starting point coordinates given by touching and ending point coordinates given by releasing, the character string of "佐藤" (Japanese Kanji (SATOU)) is selected as shown in FIG. 5(A). Furthermore, if a touch operation is performed in display coordinates (display range) of the selected character string and a release operation is performed in the display coordinates of the "あ" (Japanese Hiragana (A)) line character input key, etc. as shown in FIG. 5(B), a pop-up 82 appears as shown in FIG. 5(C). The pop-up 82 is a GUI (graphical user interface) configured to permit the user to select a class such as a name, a place name, or a song title as the character string of "佐藤" (Japanese Kanji (SATOU)).

As shown in FIG. 5(C), the pop-up 82 contains a check box 84a corresponding to the name, a check box 84b corresponding to the place name, and a check box 84c corresponding to the song title. Hereinafter, the check boxes 84a-84c (all the check boxes described hereinafter) may be generally referred to as a check box 84 in some cases.

Those check boxes 84 are switched by touching between a marked state (valid state) and an unmarked state (invalid state). That is, a flag corresponding to each of the check boxes 84 is given in the RAM 28 and checked to determine whether the check box is marked or unmarked. For example, the flag corresponding to each of the check boxes 84 is constituted of a one-bit register. If the flag is set (turned ON), the register is written with the data value of "1", and if the flag is reset (turned OFF), the register is written with the data value of "0".

For example, if the check box 84a corresponding to the name is marked, the CPU 20 determines that the character string of "佐藤" (Japanese Kanji (SATOU)) is the name of a person.

It is to be noted that detailed description on the check box 84 about the functions other than the telephone functions and the mail functions will be omitted for ease of description because they are almost the same also in the other illustrative views.

Subsequently, if a class of the selected character string is selected, display of the pop-up 82 is updated as shown in FIG. 6(A). The updated pop-up 82 displays in it a list of telephone numbers and addresses selectable as the name related information as well as the corresponding check boxes 84d and 84e and a settlement key 82a. That is, in this case, it is possible to select the related information of "佐藤" (Japanese Kanji (SATOU)) registered in the address book, that is, the telephone numbers and the addresses. It is to be noted that the selectable related information differs with the selected data, so that the different names correspond to the different contents registered in the address book.

If the settlement key 82a is touched, related information corresponding to the marked check box 84 is caused to be temporarily stored in the RAM 28 so as to be correlated with the character input key shown at the ending point coordinates. That is, if the check box 84e corresponding to the address is marked and then the settlement key 82a is touched, the character string of "佐藤" (Japanese Kanji (SATOU)) and the mail address of "佐藤" (Japanese Kanji (SATOU)) registered in the address book are temporarily stored so as to be correlated with the "あ" (Japanese Hiragana (A)) line input key.

It is to be noted that if the settlement key 82a is touched in a state where none of the check boxes 84 is marked, no related information is stored, to temporarily store only the selected character string. Further, to temporarily store only a selected character string, a touch operation may be performed outside the display range of the pop-up 82 shown in FIG. 5(C) in a state where the pop-up 82 is displayed. In this case, the pop-up 82 shown in FIG. 6(A) is not displayed, to provide display shown in FIG. 6(B).

Then, if the aforesaid temporary storage operations end, the pop-up 82 disappears, to change display of the "あ" (Japanese Hiragana (A)) line character input key as shown in FIG. 6(B).

That is, if the finger touches a selected character string and slide and then is released at an arbitrary one of the character input keys, the selected character string and its related information are temporarily stored according to a memory address corresponding to the arbitrary character input key. Hereinafter, an operation of the finger to touch and slide and then to be released is referred to as a touch-and-slide operation.

It is to be noted that the character input key selected by releasing is not limited to the "あ" (Japanese Hiragana (A)) line character input key but may be any other key such as the "か" (Japanese Hiragana (KA)) line character input key or the "さ" (Japanese Hiragana (SA)) line character input key.

Figure 9:
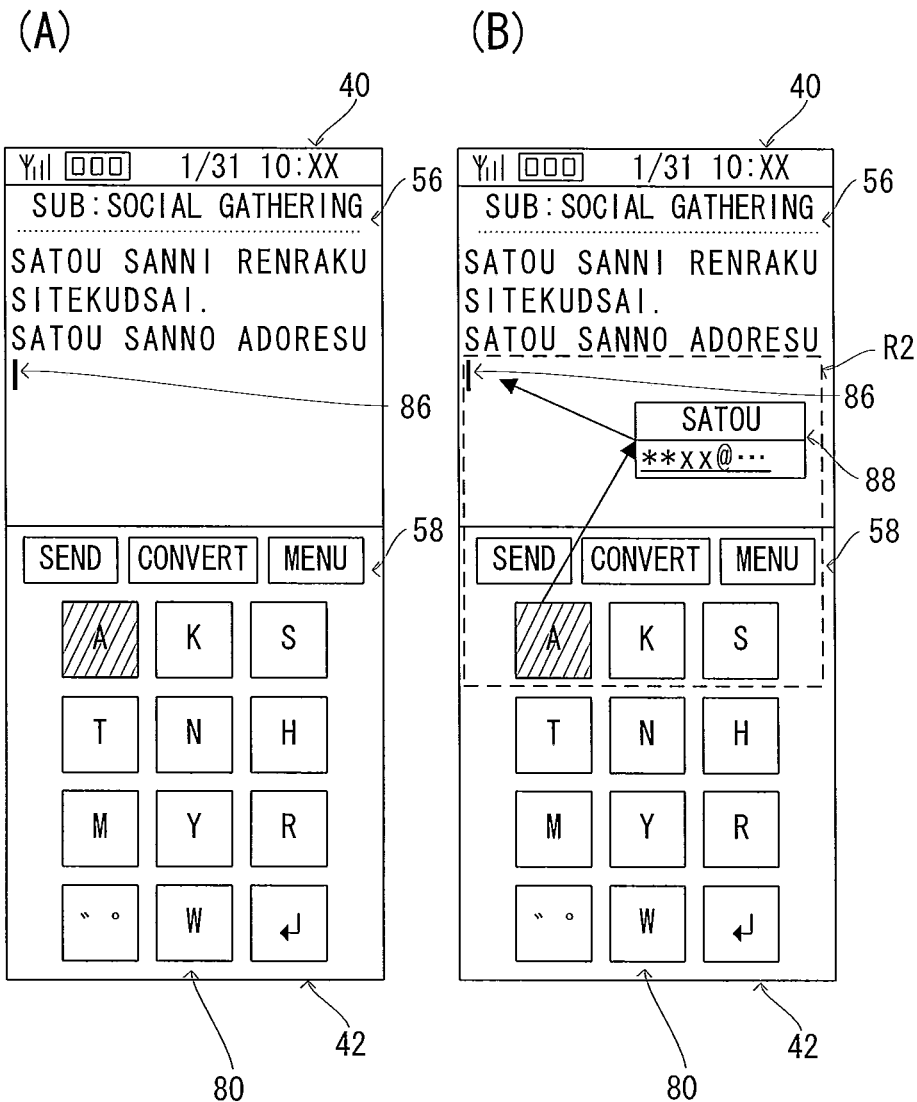
FIGS. 9A and 9B illustrate part of an example of an insertion procedure in a transfer mail of the received mail shown in FIG. 4.

Then, if the present touch position inputs the function display range 56 by touching the character input key corresponding to a memory address denoting a storage range to be temporarily stored, here the inside of the display coordinates of the "あ" (Japanese Hiragana (A)) line character input key, in response to the body text of a mail (transfer mail) to transfer a received mail as shown in FIG. 9(B), a simple pop-up 88 appears. The simple pop-up 88 is a GUI configured to simply display the temporarily stored character string and part of related information. Then, if a release operation is performed at an arbitrary position, the simple pop-up 88 disappears, to insert (add) the temporarily stored character string and related information to the body text of the transfer mail. That is, the user can determine a position where the related information is to be inserted after confirming part of the related information by using the simple pop-up 88.

Further, the temporarily stored character string and related information may not only be inserted but also added to a displayed character string. Hereinafter, an operation to add temporarily stored character string and related information by touching it with the character input key corresponding to a memory address denoting a temporary storage range is referred to as an addition operation.

It is to be noted that it may be arranged so that if one second elapses after the character input key is touched, the simple pop-up 88 would appears. For example, if one second elapses after a touch operation is performed in the display coordinates of the "あ" (Japanese Hiragana (A)) line character input key, the simple pop-up 88 appears. Further, even if a release operation is performed in the display coordinates of the "あ" (Japanese Hiragana (A)) line character input key in a state where the simple pop-up 88 is displayed temporarily, the "あ" (Japanese Hiragana (A)) line characters are not entered.

Subsequently, if a release operation is performed at an arbitrary position in the body text of a transfer mail in a state where the simple pop-up 88 is displayed, contents temporarily stored by the pop-up 82 shown in FIG. 10(A) appear. The pop-up 82 displays the temporarily stored character string of "佐藤" (Japanese Kanji (SATOU)) and mail address as its related information as well as the check boxes respectively corresponding to the temporarily stored data further along the settlement key 82a and a deletion key 82b.

If the settlement key 82a shown in FIG. 10(A) is touched, data corresponding to the marked check box 84 is inserted into character string data displayed in the function display range 56 based on the ending point coordinates as shown in FIG. 10(B). Further, if the deletion key 82b is touched, data corresponding to the marked check box is deleted.

That is, if a touch-and-slide operation is performed from the "あ" (Japanese Hiragana (A)) line character input key to arbitrary coordinates in the body text of a reply mail as shown in FIG. 9(B), the temporarily stored character string and its related information are inserted into character string data in the body text of a transfer mail displayed on the LCD 32 based on ending point coordinates denoted by the release operation.

The following will describe in detail a procedure for temporarily storing a character string. FIGS. 5(A) to 5(C) are illustrative views showing a procedure for temporarily storing a selected character string. As shown in FIG. 5(A), a character string of "佐藤" (Japanese Kanji (SATOU)) is selected in the body text of a received mail displayed in the function display area 56. Further, a procedure for selecting the character string of "佐藤" (Japanese Kanji (SATOU)) in the body text of the received mail will be described in detail with reference to FIGS. 7(A) to 7(E).

FIG. 7(A) is an illustrative view schematically showing display coordinates of part of the characters displayed in the body text of the received mail. The character display area of "佐" (Japanese Kanji (SA)) and that of "藤" (Japanese Kanji (TOU)) shown in FIG. 7(A) are shown in FIG. 7(B) and FIG. 7(C) respectively. FIG. 7(B) is an illustrative view showing the display coordinates of "佐" (Japanese Kanji (SA)). As shown in FIG. 7(B), the display area of "佐" (Japanese Kanji (SA)) is defined by coordinates VCx1 and VCx2 along the vertical axis and coordinates VCy1 and VCy2 along the horizontal axis. Similarly, FIG. 7(C) is an illustrative view showing the display coordinates of "藤" (Japanese Kanji (TOU)). As shown in FIG. 7(C), the display area of "藤" (Japanese Kanji (TOU)) is defined by coordinates VCx3 and VCx4 along the vertical axis and coordinates VCy3 and VCy4 along the horizontal axis. It is to be noted that although not shown here, the character display area differs in size between one-byte and two-byte characters.

It is to be noted that as shown in FIG. 7(D), coordinates denoted by the point of a are contained in the display coordinates of "佐" (Japanese Kanji (SA)) shown in FIG. 7(B), and coordinates denoted by the point of b are contained in the display coordinates of "藤" (Japanese Kanji (TOU)) shown in FIG. 7(C). For example, if the point of a is denoted by touching as starting point coordinates and the point of b is denoted by releasing as ending point coordinates, that is, a slide operation from the point a to the point b is performed, a portion from the character of "佐" (Japanese Kanji (SA)) denoted by the starting point coordinates to the character "藤" (Japanese Kanji (TOU)) denoted by the ending point coordinates forms a selected character string as shown in FIG. 7(E). Further, the selected character string of "佐藤" (Japanese Kanji (SATOU)) is displayed in a changed color. Therefore, the user can arbitrarily select a character string. It is to be noted that if a character is interposed also between "佐" (Japanese Kanji (SA)) and "藤" (Japanese Kanji (TOU)), the interposed character also constitutes the selected character string.

It is to be noted that it may be arranged that by touching an arbitrary character, a character string containing this arbitrary character would be selected. For example, if a Hiragana character is touched, a character string containing its anteroposterior Hiragana characters is selected, and if a Chinese character is touched, a character string containing its anteroposterior Chinese characters is selected.

FIG. 5(B) is an illustrative view showing how to perform a touch-and-slide operation from the selected character string of "佐藤" (Japanese Kanji (SATOU)) to the "あ" (Japanese Hiragana (A)) line character input key. A procedure for temporarily storing the selected character string of "佐藤" (Japanese Kanji (SATOU)) in a storage area denoted by a memory address corresponding to the "あ" (Japanese Hiragana (A)) line character input key will be described in detail with reference to FIG. 8.

Figure 8:
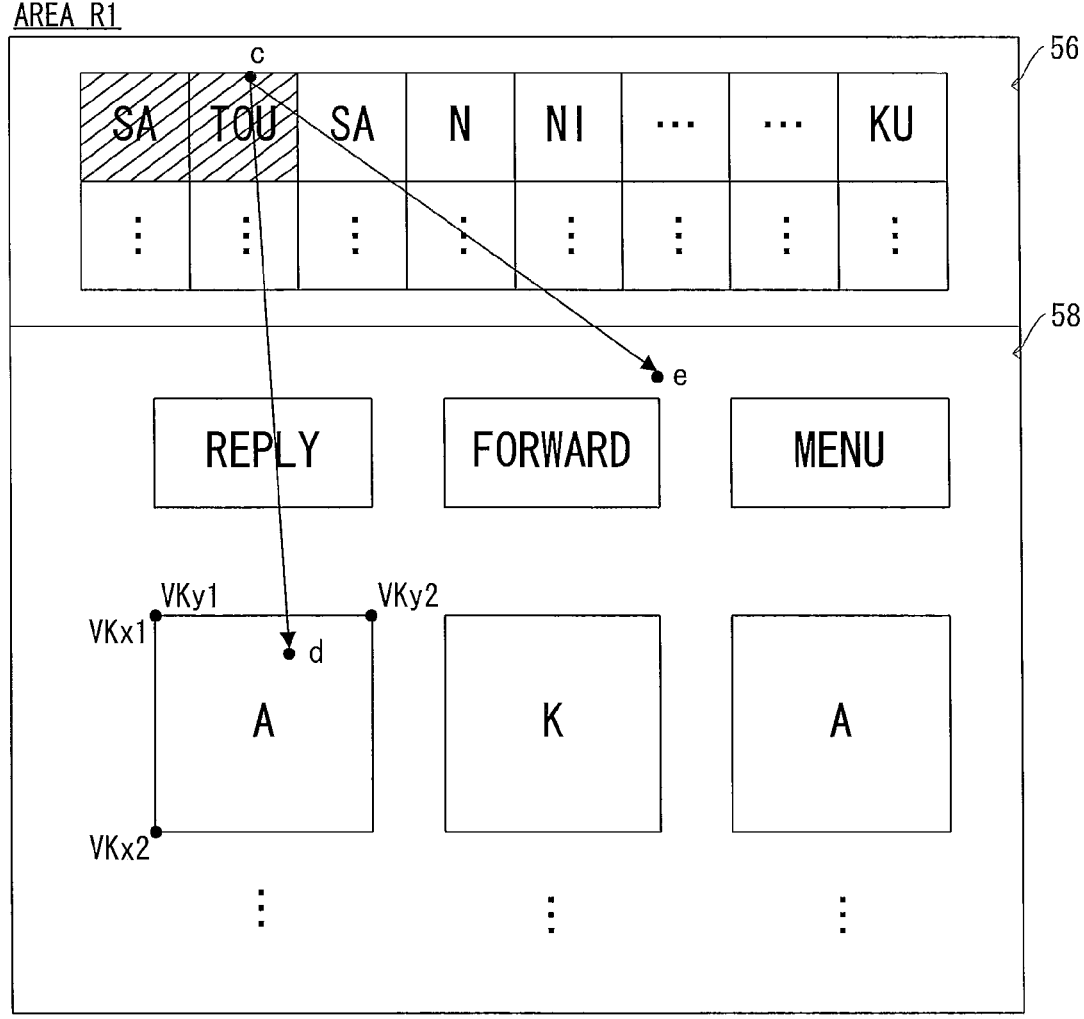
FIG. 8 is an illustrative view showing in detail a procedure for temporarily storing the selected character string shown in FIG. 5.

FIG. 8 is an illustrative view in which an area R1 in FIG. 5(B) is expanded. As shown in FIG. 8, the display area of the "あ" (Japanese Hiragana (A)) line character input key is defined by coordinates VKx1 and VKx2 along the vertical axis and coordinates VKy1 and VKy2 along the horizontal axis. Coordinates denoted by a point of c are contained in the display coordinates of "藤" (Japanese Kanji (TOU)) contained in the selected character string. A point of d is contained in the display coordinates of the "あ" (Japanese Hiragana (A)) line character input key. Further, coordinates denoted by a point of e are not contained in the display coordinates of any one of the keys in the input key group 80 of the mail function.

If the point of c is denoted by touching as starting point coordinates and the point of d is denoted by releasing as ending point coordinates, that is, a slide operation from the point c to the point d is performed, the pop-up 82 appears as shown in FIG. 5(C). It is to be noted that if the point of c is denoted by touching as starting point coordinates and the point of e is denoted by releasing as ending point coordinates, the pop-up 82 does not appear.

That is, by defining the positions of starting point coordinates and ending point coordinates recognized in temporary storage operations, the user can clearly recognize selected data and a character input key utilized in temporary storage, thereby operating the touch panel input device 24.

Further, as shown in FIG. 6(B), the "あ" (Japanese Hiragana (A)) line character input key is displayed in a color different from those for the other character input keys. That is, the user can recognize that the function to read temporarily stored related information and the function to enter characters are set to one key.

Next, a description will be given in detail of a procedure for inserting a temporarily stored character string and related information into the body text of a transfer mail. FIGS. 9(A), 9(B), 10(A), and 10(B) are illustrative views showing the procedure for inserting a temporarily stored character string and related information into the body text of a transfer mail. As shown in FIG. 10(A), the "あ" (Japanese Hiragana (A)) line character input key displayed in the key input range 58 is displayed in a color different from those for the other character input keys. FIG. 10(B) is an illustrative view showing how to perform a touch-and-slide operation from the "あ" (Japanese Hiragana (A)) line character input key to an area in which the body text of a reply mail is displayed. The following will describe a procedure for inserting a temporarily stored character string into a character string in the body text of a reply mail, with reference to FIGS. 11(A) and (B).

FIG. 11(A) is an illustrative view showing area coordinates of data "↓" denoting the final position of character string data. Further, on the left side of the data "↓" denoting the final position of the character string data, a cursor 86 appears. It is to be noted that although "↓" is shown schematically in FIGS. 11(A) and (B), the user cannot recognize it actually. As shown in FIG. 11(A), the "↓" area is defined by coordinates VCx5 and VCx6 along the vertical axis and coordinates VCy5 and VCy26 along the horizontal axis.

FIG. 11(B) is an illustrative view in which an area R2 in FIG. 9(B) is expanded. As shown in FIG. 11(B), coordinates denoted by a point of g are contained in the "↓" area coordinates. Coordinates denoted by a point of f are contained in the display coordinates of the "あ" (Japanese Hiragana (A)) line character input key. Further, coordinates denoted by a point of h give an arbitrary point not contained in the display coordinates at any key in the mail functional input key group 80.

It is to be noted that if the point f is denoted by touching as starting point coordinates and the point g is denoted as an ending point coordinates by releasing, that is, a touch-and-slide operation is performed from the point f to the point g, the pop-up 82 appears as shown in FIG. 10(A). Furthermore, if a character string or related information to be inserted is selected, it is inserted to the front of "↓" the reply mail's the body text, that is, the end of the character string. Then, in a character string denoting the body text of a transfer mail, the data "↓" denoting the end position of the character string data is changed in position where it is to be stored in the storage area of the RAM 28. It is to be noted that if a point of e is denoted as the ending point coordinates by releasing, the pop-up 82 does not appear.

That is, by defining the positions of starting point coordinates and ending point coordinates recognized in addition operations, the user can clearly recognize a character input key utilized in temporary storage operations and a position where the temporarily stored related information is to be inserted, thereby operating the touch panel input device 24.

In such a manner, by selecting through touching a character string temporarily stored in a received mail and performing a touch-and-slide operation from the selected character string to an arbitrary character input key, the user can temporarily store the selected character string and its related information. Furthermore, in the case of creating a transfer mail, by performing a touch-and-slide operation to touch a character input key utilized in temporary storage and release it at an insertion position, the user can insert the temporarily stored character string or its related information.

Further, to enter an "あ" (Japanese Hiragana (A)) line character, the user can touch it in the "あ" (Japanese Hiragana (A)) line character input key display coordinates and, before one second elapses since then, release it. It is to be noted that the threshold value of one second can be changed arbitrarily and may be two seconds or longer or shorter than one second. With this, it is possible to satisfy both of the character input function and the temporary storage function.

It is to be noted that only the related information may be stored temporarily. Further, if the "X" mark displayed at the upper right position of the pop-up 82 is touched, the pop-up 82 disappears. That is, operations to temporarily store a character string and its related information and those to insert the temporarily stored related information are cancelled if the pop-up 82 disappears.

Furthermore, it may be arranged in such a manner that if a touch-and-slide operation is performed from the function display range 56 to the key input range 58 in a state where the character input keys are prioritized and a character string is selected, the related information pieces would be temporarily stored of the character strings selected sequentially from those having higher priorities. For example, in a case where the highest priority is set to the "あ" (Japanese Hiragana (A)) line character input key, if a touch-and-slide operation is performed from the function display range 56 to the key input range 58, the related information is temporarily stored in accordance with a memory address corresponding to the "あ" (Japanese Hiragana (A)) line character input key. Further, it may be arranged in such a manner that also in a case where a touch-and-slide operation is performed from the function display range 56 to the arbitrary character input key or from a selected character string to the key input range 58, the information would be temporarily stored.

Then, it may be arranged in such a manner that if a touch-and-slide operation is performed from the key input range 58 to the function display range 56 in a state where the related information is temporarily stored so as to be correlated with one character input key, the related information temporarily stored so as to be correlated with the one character input key would be added as a postscript to the body text of a transfer mail etc. For example, in a case where the related information is temporarily stored so as to be correlated with the "あ" (Japanese Hiragana (A)) line character input key, if a touch-and-slide operation is performed from the key input range 58 to the function display range 56, the related information temporarily stored so as to be correlated with the "あ" (Japanese Hiragana (A)) line character input key is added as a postscript to the body text of the transfer mail. Further, it may be arranged in such a manner that also in a case where a touch-and-slide operation is performed from the character input key with which the related information temporarily stored is correlated to the function display range 56 or the key input range 58 to the body text of the transfer mail, the information may be added.

Figure 12:
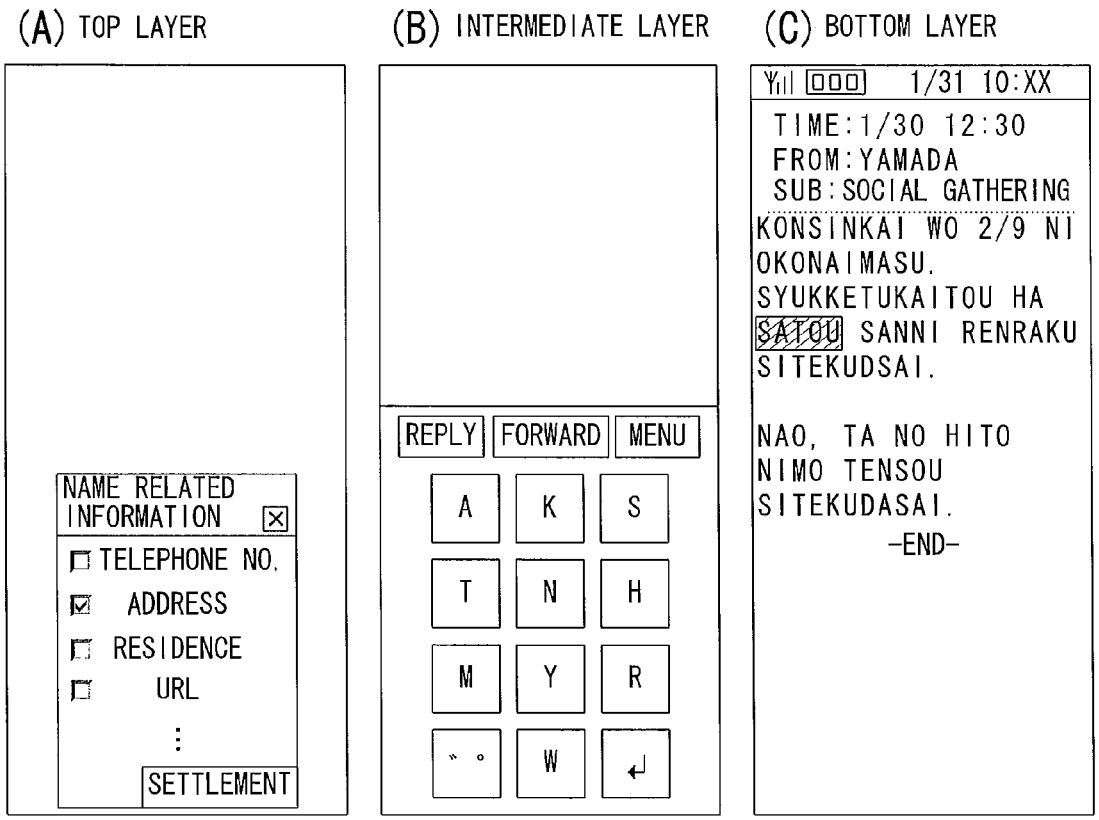
FIGS. 12A-12C illustrate one example of a layer structure for drawing a GUI displayed on the LCD monitor shown in FIG. 1.

The following will describe a plurality of layers that constitute display on the LCD monitor 32. Specifically, as shown in FIGS. 12(A) to 12(C), three layers (top layer, intermediate layer, and bottom layer) are stacked on one another, with the top layer being established on the side of a view point (user) in a virtual space and followed by the intermediate layer and the bottom layer in this order in a direction away from the view point. In the top layer shown in FIG. 12(A), the pop-up 82 and the simple pop-up 88 are drawn. However, in some cases, nothing may be drawn in the top layer. Further, in the intermediate layer shown in FIG. 12(B), keys contained in the key input range 58 are drawn. Further, in the bottom layer shown in FIG. 12(C), such information is drawn as mail body texts displayed in the function display range 56, a sensitivity of the antenna 12 contained in the state display range 40, the remaining battery capacity, and the present time. However, part of the mail body texts may be hidden by the intermediate layer in some cases.

Therefore, if the character input keys are hidden by touching a position where no key is displayed in the key input range 58, the key input range 58 displayed in the intermediate layer is hidden, so that the mail body texts displayed in the bottom layer are all displayed. Furthermore, if a touch-and-slide operation is performed in the case of temporary storage or insertion, the pop-up 82 appears in the top layer.

Figure 13:
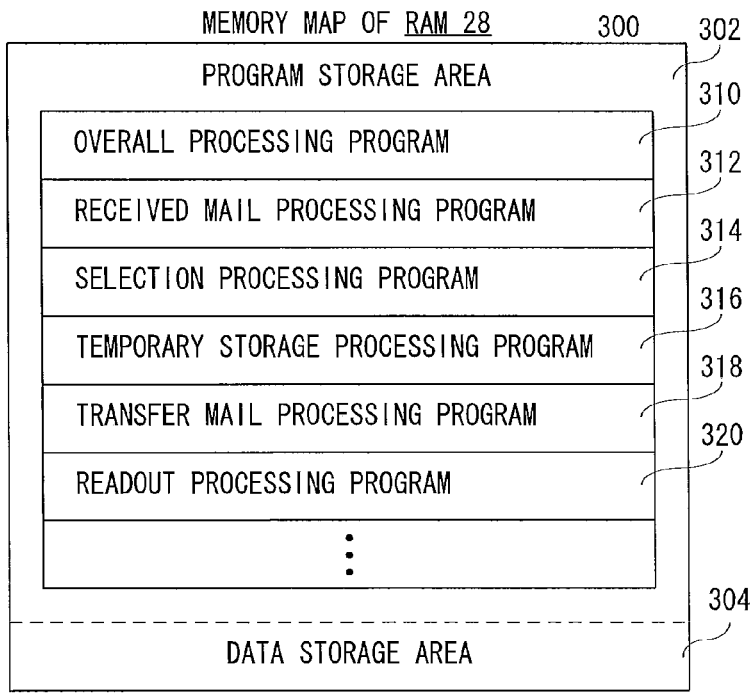
FIG. 13 is an illustrative view showing one example of a memory map of a RAM shown in FIG. 1.

FIG. 13 is an illustrative view showing a memory map of the RAM 28. As shown in FIG. 13, a memory map 300 of the RAM 28 contains a program storage area 302 and a data storage area 304. Part of the programs and the data are sequentially read from a flash memory 26 all at a time or partially as required and stored in the RAM 28, to be processed by the CPU 20 etc.

The program storage area 302 stores the program for operating the mobile terminal 10. The program for operating the mobile terminal 10 is composed of an overall processing program 310, a received mail processing program 312, a selection processing program 314, a temporary storage processing program 316, a transfer mail processing program 318, and a readout processing program 320, etc. The overall processing program 310 is executed to carry out the functions of the mobile terminal 10 such as telephone functions and mail functions.

The received mail processing program 312 is executed to process touch operations performed when a received mail is being displayed, for example, a temporary storage operation on a selected character string. The selection processing program 314 is a subroutine in the received mail processing program 312 and executed if an operation is performed to select a character string etc. in the body text of a received mail. The temporary storage processing program 316 is a subroutine in the received mail processing program 312 and processes temporary storage operations on a selected character string and its related information.

The transfer mail processing program 318 is executed to process operations performed when a transfer mail is being displayed, for example, operations to read a temporarily stored character string or its related information. The readout processing program 320 is a subroutine in the transfer mail processing program 318 and executed to read temporarily stored data and process addition operations. It is to be noted that although not shown, the programs for operating the mobile terminal 10 include a program for communication, a program for transmitting a created transfer mail, a program for communicating data with each server via the network 100, etc.

Figure 14:
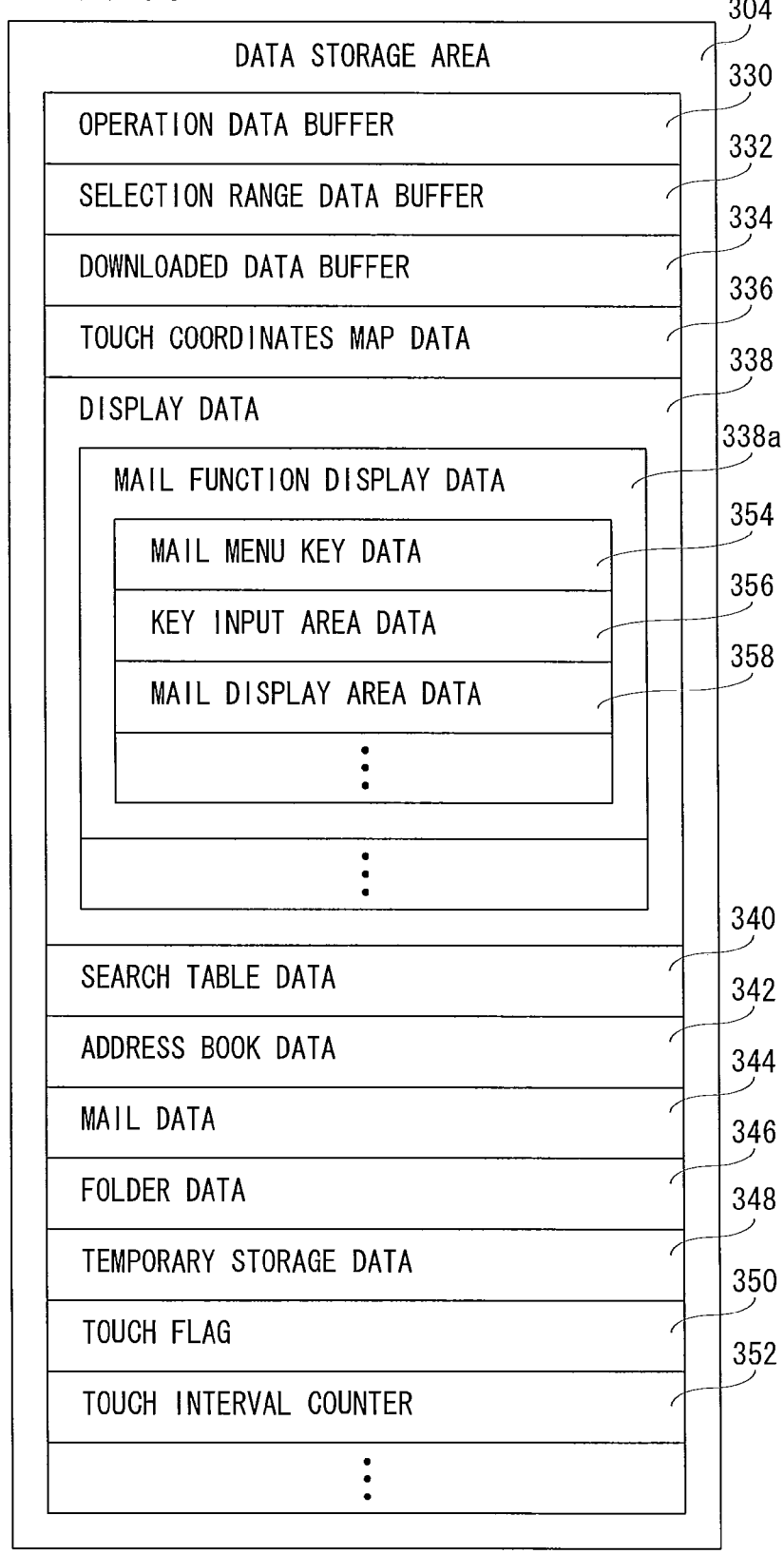
FIG. 14 is an illustrative view showing details of data stored in the RAM shown in FIG. 13.

As shown in FIG. 14, the data storage area 304 contains an operation data buffer 330, a selection range data buffer 332, and a downloaded data buffer 334. Further, the data storage area 304 stores touch coordinates map data 336, display data 338, search table data 340, address book data 342, mail data 344, folder data 346, and temporarily stored data 348 and also contains a touch flag 350 and a touch interval counter 352.

The operation data buffer 330 is used to store the results of operations on the touch panel input device 24, for example, the present touch position, starting point coordinates, and ending point coordinates. The selected range data buffer 332 is used to store display coordinates of a selected character string or an image and memory addresses of the character string data or the image when character string or image selection processing is performed. The downloaded data buffer 334 is used to store a character string and an image obtained through data communication with the servers until they are saved in a data folder.

The touch coordinates map data 336 refers to map data for correlating operations performed on the touch panel input device 24, for example, positions denoted by starting point coordinates with display coordinates on the LCD monitor 32. That is, the CPU 20 can correlate the results of operations performed on the touch panel input device 24 with display on the LCD monitor 32.

The display data 338 refers to data of an image or a character string that is displayed on the LCD monitor 32 for each function of the mobile terminal 10. For example, the display data 338 includes mail function display data 338a. The mail function display data 338a is composed of mail menu key data 354, key input area data 356, mail display area data 358, etc. The mail menu key data 354 refers to data of each of the keys contained in such a mail menu screen as shown in FIG. 4(A). The key input area data 356 refers to data of the mail function input key group 80 of the key input range 58 shown in FIG. 4(B) etc.

Figure 15:
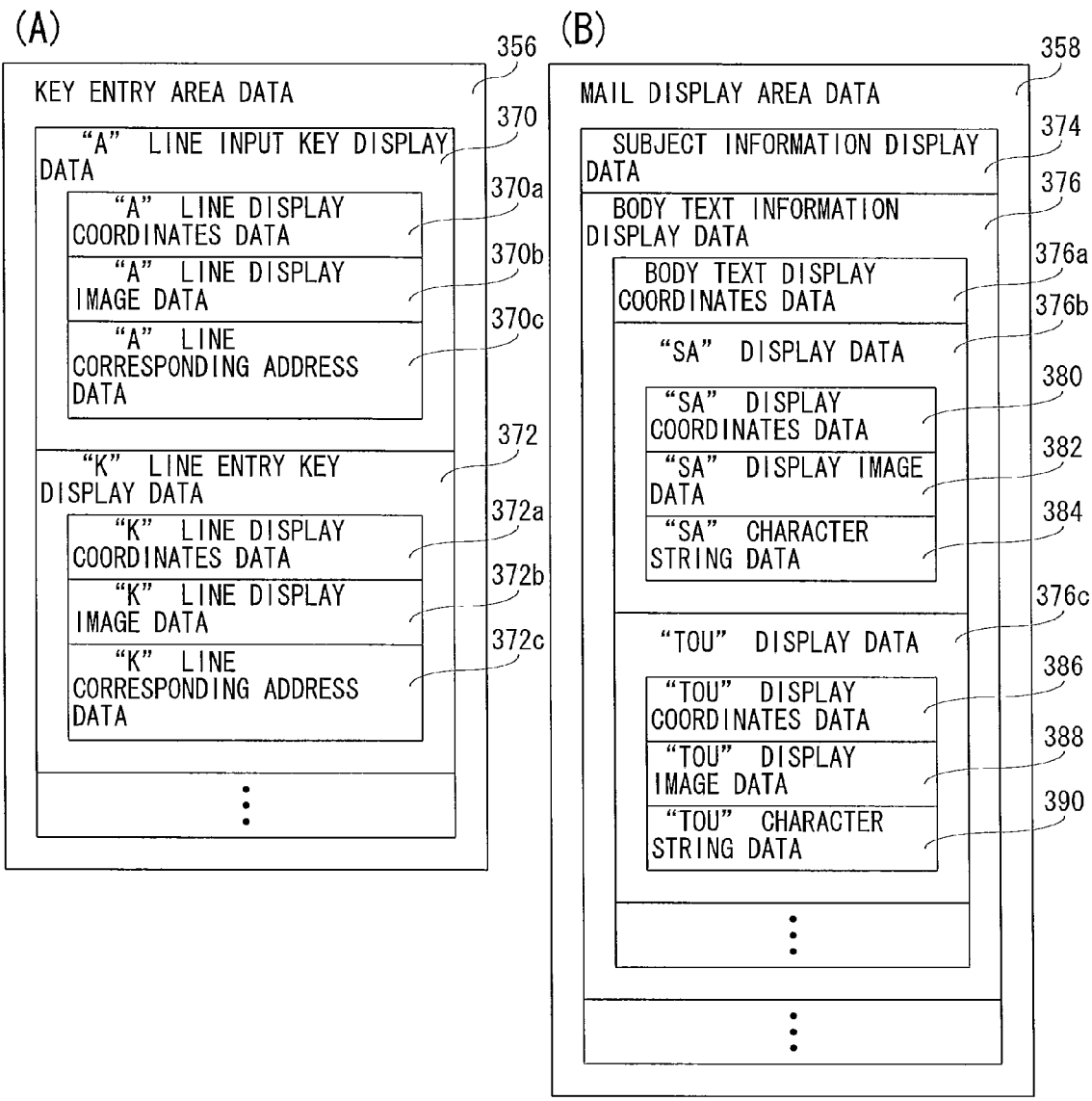
FIGS. 15A and 15B illustrate example details of key input data and mail display area data stored in the RAM shown in FIG. 14.

Specifically, as shown in FIG. 15(A), the key input area data 356 is composed of "あ" (Japanese Hiragana (A)) line character input key display data 370, "か" (Japanese Hiragana (KA)) line character input key display data 372, etc. The "あ" (Japanese Hiragana (A)) line character input key display data 370 refers to display data of the "あ" (Japanese Hiragana (A)) line character input key shown in FIG. 4(B) etc. and further is composed of "あ" (Japanese Hiragana (A)) line display coordinates data 370a, "あ" (Japanese Hiragana (A)) line display image data 370b, and "あ" (Japanese Hiragana (A)) line corresponding memory address data 370c.

The "あ" (Japanese Hiragana (A)) line display coordinates data 370a is the data of display coordinates of those coordinates VKx1, VKx2, VKy1, and VKy2 shown in FIG. 8. The "あ" (Japanese Hiragana (A)) line display image data 370b is the image data necessary for displaying the "あ" (Japanese Hiragana (A)) line character input key, denoting a Hiragana character of "あ" (Japanese Hiragana (A)). The "あ" (Japanese Hiragana (A)) line corresponding memory address data 370c is the data of memory addresses in the temporary storage data 348 shown in FIG. 18(B).

The "か" (Japanese Hiragana (KA)) line character input key display data 372 refers to display data of the "か" (Japanese Hiragana (KA)) line character input key shown in FIG. 4(B) etc. It is to be noted that detailed description of "か" (Japanese Hiragana (KA)) line display coordinates data 372a, "か" (Japanese Hiragana (KA)) line display image data 372b, and "か" (Japanese Hiragana (KA)) line corresponding memory address data 372c that constitute the "か" (Japanese Hiragana (KA)) line character input key display data 372 will be omitted because they are almost the same as the respective data pieces that constitute the "あ" (Japanese Hiragana (A)) line character input key display data 370.

The mail display area data 358 is constituted of data for displaying character strings contained in the body texts of a received mail, a mail to be sent back (reply mail), and a transfer mail, and the like.

Specifically, as shown in FIG. 15(B), the mail display area data 358 is constituted of subject information display data 374, body text information display data 376, etc. The subject information display data 374 refers to data such as character strings or display coordinates necessary for displaying the subject of a mail. The body text coordinates data 376 refers to data such as character strings or display coordinates necessary for displaying the body text of a mail and so may be different in composition with the different mails to be displayed. For example, in a case where a received mail such as shown in FIG. 4(B) is to be displayed on the LCD monitor 32, the body text information display data 376 is composed of body text display coordinates data 376a, "佐" (Japanese Kanji (SA)) display data 376b, "藤" (Japanese Kanji (TOU)) display coordinates data 376c, etc.

The body text display coordinates data 376a is data of display coordinates for displaying the body text of a received mail such as shown in FIG. 4(B). The "佐" (Japanese Kanji (SA)) display data 376b is data for displaying the character of "佐" (Japanese Kanji (SA)) and composed of "佐" (Japanese Kanji (SA)) display coordinates data 380 denoting display coordinates of "佐" (Japanese Kanji (SA)), "佐" (Japanese Kanji (SA)) display image data 382 of an image of "佐" (Japanese Kanji (SA)), and "佐" (Japanese Kanji (SA)) character string data 384 of a character string for "佐" (Japanese Kanji (SA)). Further, the "佐" (Japanese Kanji (SA)) display coordinates data 380 is data of the display coordinates VCx1, VCx2, VCy1, and VCy2 shown in FIG. 7(B).

The "藤" (Japanese Kanji (TOU)) display data 376c is data for displaying the character of "藤" (Japanese Kanji (TOU)) and its detailed description will be omitted because its data composition is almost the same as that of the "佐" (Japanese Kanji (SA)) display data 376b. However, "藤" (Japanese Kanji (TOU)) display coordinates data 386 is data of the display coordinates VCx3, VCx4, VCy3, and VCy4 shown in FIG. 7(C).

It is to be noted that display coordinates of the body text in a mail shown in the body text display coordinates data 376 contain the "佐" (Japanese Kanji (SA)) display coordinates data 380, the "藤" (Japanese Kanji (TOU)) display coordinates data 386, etc.

As shown in FIG. 14 again, the search table data 340 is table data constituted of memory addresses necessary for acquiring the related information of selected data and the IP addresses of the servers. Specifically, as shown in FIG. 16, a search table stores names, place names, song titles, and images in a class column. Further, a search destination column stores the data names of search destinations corresponding to the classes. For example, as the name, the address book data 342 and the author's name server 130 are stored. As the place name, the map server 110 is stored. As the song title, music data 402 (described later with reference to FIG. 18(A)) and the music server 120 are stored. As the image, saved image data 400 (described later with reference to FIG. 18(A)) is stored.

Further, a memory address/IP address column stores the memory addresses or IP addresses of search destinations. That is, corresponding to the names, "0X4000000-0X4FFFFFF" as the memory address of the address book data 342 and "IP:210.146.180.*" as the IP address of the author's name server 130 are stored. Further, corresponding to the place names, "IP:210.146.181.*" is stored as the IP address of the map server. Further, corresponding to the song title, the memory address "0X6000000-0X6FFFFFF" of the music data 402 and the IP address "IP:210.146.182.***" of the music server 120 are stored. Further, corresponding to the images, "0X5000000-0X5FFFFFF" is stored as the memory address of the saved image data 400. It is to be noted that in the present embodiment, the IP address begins with "IP:" and the memory address, with "0X".

As shown in FIG. 14 again, the address book data 342 is composed of the telephone numbers etc. of persons registered by the user. Specifically, as shown in FIG. 17, the address book stores names, telephone numbers, mail addresses, groups, residences, birthdays, genders, blood types, and URLs (uniform resource locators). A name column stores the names of persons registered in the address book data 342. A telephone number column stores telephone numbers corresponding to the name column. A mail address column stores mail addresses corresponding to the name column. A group column stores groups set by the user. In the present embodiment, as the group, "Friend", "Company", and "Other" are set. The groups are utilized when displaying the address book data 342 on the LCD monitor 32. For example, in the case of displaying only the "Friend" group, only such data that "Friend" is stored in the group column is extracted and displayed on the LCD 32.

A residence column stores residences corresponding to the name column. A birthday column stores birthdays corresponding to the name column. A gender column stores genders corresponding to the name column. It is to be noted that in the present embodiment, they are denoted by "Male" or "Female". A blood type column stores blood types corresponding to the name column. A URL column stores the URLs of published homepages etc. corresponding to the name column.

Further, in the present embodiment, the telephone numbers, the mail addresses, the groups, the residences, the birthdays, the genders, the blood types, and the URLs are handled as the related information of the names. It is to be noted that an item in which "NULL" is stored in the address data is not displayed as selectable related information. That is, whether the related information is selectable is determined on the basis of "NULL".

As shown in FIG. 14 again, the mail data 344 is composed of the data of a received mail, the data of a transmission mail, etc. Further, the data of characters constituting the body text display data 376 is read from the mail data 344.

The folder data 346 is constituted of data stored by the data folder functions and read when the data folder function key 52 is touched. As shown in FIG. 18(A), the folder data 346 is composed of saved image data 400, music data 402, etc. The saved image data 400 is composed of images saved after being downloaded by the browser functions etc., image data transmitted or received by the mail functions, etc. Specifically, the downloaded image data may be map image metadata 400b etc. constituted of metadata of map image metadata 400a and its map image data 400a. The metadata constituting the map image metadata 400b may be the title of a map image, the day on which the map image is created, GPS information denoting the position of its typical place name, the data size of the map image, etc. Further, the map image's title is a typical place name denoted by the map image.

Further, the image data transmitted or received may be picture image metadata 400d composed of picture image data 400c and metadata of this picture image data 400c etc. Metadata constituting the picture image metadata 400d may be the title of a picture image, the image's shooting day and data size, etc.

It is to be noted that in the present embodiment, metadata corresponding to each of the image data pieces will be handled as related information of the image. That is, the related information of the image is acquired from the map image metadata 400b or the picture image metadata 400d.

It is to be noted that the mobile terminal 10 may be equipped with camera functions so that the data of pictures captured using the camera functions would provide saved image data.

The music data 402 is constituted of music data saved after being downloaded using the browser functions etc. Specifically, the downloaded music data is composed of first music metadata 402b constituted of first music data 402a and metadata of the first music data 402a, second music metadata 402d constituted of second music data 402c and metadata of the second music data 402c, etc. If the first music data 402a and the second music data 402c are reproduced using music player functions etc., music is output from a speaker not shown. The first music metadata 402b and the second music metadata 402d correspond to the first music data 402a and the second music data 402c respectively and are composed of singer names, songwriters/composers, song titles, lyrics, etc.

It is to be noted that in the present embodiment, as the related information of the song titles, singer names, songwriters/composers, and lyrics can be selected. Furthermore, the related information of the song titles is read from the first music metadata 402b and the second music metadata 402d.

That is, the user can utilize as the related information the metadata that constitutes the map image metadata 400b, the picture image metadata 400d, the first music metadata 402b, and the second music metadata 402d.

It is to be noted that the metadata constituting the first music metadata 402b and the second music metadata 402d may contain data sizes, bit rates, album titles, etc. of the music data. Further, each of the metadata pieces may be contained in the corresponding data.

As shown in FIG. 14 again, the temporarily stored data 348 may be temporarily stored character strings and their related information. Further, memory addresses of the temporarily stored data 348 are denoted as 0X9000000-0X9000FFF, 0X9001000-0X9001FFF, 0X9002000-0X9002FFF, . . . as shown in FIG. 18(B). Those memory addresses are represented in the hexadecimal notational system, so that FFF(16) is equal to 4095(10). That is, 000(16)-FFF(16) are equal to 0(10)-4095(10) respectively. Further, "0X9000000-0X9000FFF" correspond to the "あ" (Japanese Hiragana (A)) line character input key and are stored as "あ" (Japanese Hiragana (A)) line corresponding address data 370c, while "0X9001000-0X9001FFF" correspond to the "か" (Japanese Hiragana (KA)) line character input key and are stored as "か" (Japanese Hiragana (KA)) line corresponding address data 372c. That is, each of the character input keys is assigned 4096 memory addresses.

The following will specifically describe the memory addresses. One memory address can store one data byte. Therefore, one character input key can temporarily store 4096 bytes of related information. In the present embodiment, each character input key can temporarily store 20 pieces of the related information, each piece of the related information having a maximum data size of about 200 bytes.

Further, one byte accommodates each one-byte character and two bytes accommodate each two-byte character. Therefore, if the related information is a character string, one piece of the related information contains up to 200 one-byte characters or 100 two-byte characters. It is to be noted that the number of memory addresses assigned to one character input key and the maximum data size of one piece of the related information may be changed arbitrarily.

As show in FIG. 14 again, the touch flag 350 is used to determine whether the touch panel input device 24 is touched (in touch with the finger etc.). For example, the touch flag 350 is constituted of a one-bit register. If the touch flag 350 is set (turned ON), the register is written with the data value of "1", and if it is reset (turned OFF), the register is written with the data value of "0". The touch interval counter 352 is used to count the lapse of time since a touch operation is performed.

It is to be noted that although not shown, the data storage area 304 stores dictionary data necessary in character conversion and also is equipped with other counters and flags necessary for the operations of the mobile terminal 10.

Subsequently, a description will be given of databases respectively stored in the map server 110, the music server 120, and the author's name server 130. As shown in FIG. 19, the database of the map server 110 stores prefectures, cities/wards, town names, block Nos., "Go" Nos., and GPS/memory addresses. Further, the database of the map server 110 shows residences by using the prefectures, cities/wards, town names, block Nos., and "Go" Nos. stored in the same lines, respectively.

In the column of prefectures, there are stored the prefecture names such as Kyoto Prefecture. The column of cities/wards stores city and ward names corresponding to the prefecture names. For example, in the case of Kyoto Prefecture, "Sakyou-ku, Kyoto City", "Nakagyo-ku, Kyoto City", etc. are stored. The column of town names stores town names corresponding to the city/ward column. For example, in the case of "Nakagyo-ku, Kyoto City", %%-cho, ##-cho, etc are stored. The "Choume" column stores, for example, 512 corresponding to the town name column. The block No. column stores block Nos. (numbers) corresponding to the "Choume" column. The "Go" column stores the "Go" Nos. (numbers) corresponding to the block Nos. However, some towns have no block Nos. or "Go". In this case, "-" is stored in the columns of block Nos. and "Go" Nos. to indicate that they are not present.

The GPS/memory address column stores GPS information corresponding to residences denoted by the prefectures, cities/wards, town names, block Nos., and "Go" Nos. as well as memory addresses in which map image data corresponding to the GPS information is stored. For example, GPS information corresponding to "Kyoto Prefecture-Nakagyo-ku, Kyoto City-%%-cho-512" comes in "35° 00' 37. XX"N135° 45'05.YY"E". "35° 00' 37. XX"N" represents "latitude 35.00 degrees, 37 minutes, XX seconds north", and "135° 45'05.YY"E" represents "longitude 135.45 degrees, 05 minutes, YY seconds east". Further, "N" represents "north latitude" and "E" represents "east longitude". Furthermore, although not contained in the GPS information in Japan, "S" represents "south latitude" and "W" represents "west longitude". With this, the memory address may come in "0XD0000001", etc., denoting a memory address of the HDD 112 in which the map image data is stored.

It is to be noted that in the present embodiment, the place name contains a prefecture name, a city/ward name, and a town name. Further, the related information may be a residence searched for based on a place name and a map image corresponding to this residence.

Further, when searching the database in the map server 110, a selected place name undergoes known morphological analysis processing so that noun words may be extracted. Then, based on the extracted words, the residence is searched for.

For example, if the place name is "Kyoto Prefecture, Kyoto City, Nakagyo-ku", "Kyoto Prefecture", "Kyoto City", and "Nakagyo-ku" are extracted. Further, in the present embodiment, the city and ward are handled as one word, so that "Kyoto City", and "Nakagyo-ku" are combined into "Kyoto City, Nakagyo-ku". Then, the extracted words are searched for in the columns of prefectures, cities/wards, and town names in this order so that the residences may be narrowed down. That is, if the prefecture column is searched for "Kyoto Prefecture", the city/ward column is narrowed down to a range in which "Kyoto Prefecture" is stored as the name of the prefecture. Furthermore, the city/ward column is searched for "Kyoto City, Nakagyo-ku" and, if a plurality of search results are obtained, a residence corresponding to the town name found first is handled as the search result. That is, from a place name of "Kyoto Prefecture, Kyoto City, Nakagyo-ku", a residence of "Kyoto Prefecture, Kyoto City, Nakagyo-ku, %%-cho, 521" is obtained. "Kyoto Prefecture, Kyoto City, Nakagyo-ku, %%-cho, 521" denotes a residence of Ward Hall of Nakagyo-ku, Kyoto City, so that if the place name is constituted of only a city/ward name, the residence of the city hall or the ward hall is obtained as the search result. Further, if the place name is constituted of only a prefecture name, the residence of the prefectural government is obtained. It is to be noted that the prefectural government, the city hall, or the ward hall may be replaced by the residence of the nearest station.

Further, if the place name contains no prefecture name but only a city/ward or town name, there may be a plurality of same city/ward or town names in the different prefectures. In such a case, the prefecture names are added to the city/ward or town names obtained as search results and displayed so that any one of them may be selected. It is to be noted that even if the selected data is a character string that constitutes part of a place name, the place name containing this character string indicating its part may be obtained as the search result.

In such a manner, if selected data indicates place names in different regions, the user can narrow them down to a place name he or she intends. Further, candidates for a name or a song title are displayed as in the case of the place name.

Furthermore, in a case where map images are selected as related information, a residence is searched for based on a place name so that a map image corresponding to GPS information that corresponds to this residence may provide the related information. However, in the case of temporarily storing it as the related information, the map image has a large data size, so that the map server 112's IP address and memory address as well as the GPS information are stored. That is, since the related information temporarily stored is constituted of only a character string containing the IP address and the memory address, it is possible to reduce the percentage of the temporarily stored data 348 with respect to the data capacity of the RAM 28.

Then, when inserting the related information, a map image is downloaded based on the map server 112's IP address and memory address as well as the GPS information and inserted. Further, the map image to be downloaded is to have a contraction scale of 1/3000. It is to be noted that the user may arbitrarily set the contraction scale of this map image.

Next, as shown in FIG. 20, the database of the music server 120 stores song titles, singer names, songwriters/composers, lyrics, and memory addresses. The song title column stores the song titles of music data stored in the music server 120. The singer name column stores the names of singers singing tunes having the song titles. The songwriter/composer column stores the names of songwriters and composers corresponding to the song titles. The lyrics column stores the lyrics of tunes having the song titles. The memory address column stores the memory addresses of the HDD 122 in which the music data corresponding to the song titles is stored. It is to be noted that the music server 120's database may be arranged to store jacket picture images of the tunes.

Further, in the present embodiment, the singer names, songwriters/composers, and lyrics are handled as related information of the song titles. However, in the case of temporarily storing lyrics as related information, character strings of the lyrics are downloaded from the music server 120 and stored in the downloaded data buffer 334. Then, the characters of the lyrics are all displayed so that necessary portions of them may be selected by the user and temporarily stored. Further, the number of characters in the lyrics exceeds 100 in some cases, so that the lyrics character strings are divided into groups each of which includes 100 two-byte characters and temporarily stored as a plurality of related information pieces.

Furthermore, in the case of temporarily storing music data as related information, the music data has a large data size, so that the IP address and the memory address of the music server 120 are stored. Then, when inserting the related information, the music data is downloaded and inserted on the basis of the IP address and the memory address of the music server 120.

Next, as shown in FIG. 21, names, birthplaces, birthdays, genders, blood types, and URLs are stored in the author's name server 130's database. The name column stores the names of authors. The birthplace column stores birthplaces corresponding to the name column. Further, the birthday column, the gender column, the blood type column, and the URL column stores the respective items corresponding to the name column as in the case of the address book (FIG. 17).

Further, like the address book, the birthplaces, birthdays, genders, blood types, and URLs are handled as the related information of author's names. That is, in the present embodiment, if the address book is searched for a name but no name is found as a result, the related information is obtained from the author's name server 130. Further, the residence column in the address book corresponds to the birthplaces in the author's name server 130, so that when selecting a residence as related information, the related information is obtained from the birthplace column in the author's name server 130's database.

In such a manner, even if related information is stored in a variety of locations such as the RAM 28, the map server 110, the music server 120, and the author's name server 130, the related information can be utilized. For example, the related information of a name can be obtained from the address book data stored in the RAM 28 and that of a place name can be obtained by utilizing the database stored in the map server 110.

Figure 22:
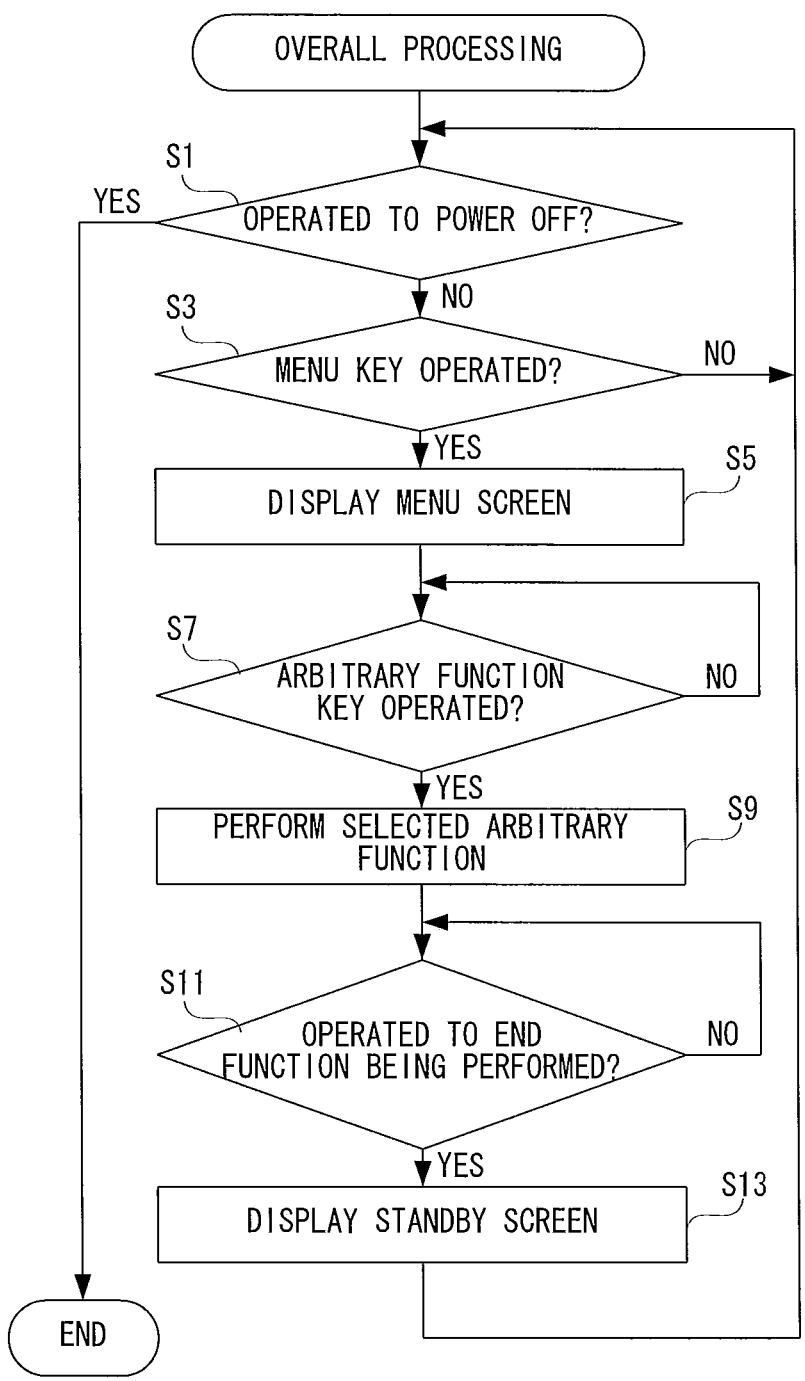
FIG. 22 is an illustrative view showing an overall processing program executed by a CPU in the mobile terminal shown in FIG. 1.
Figure 23:
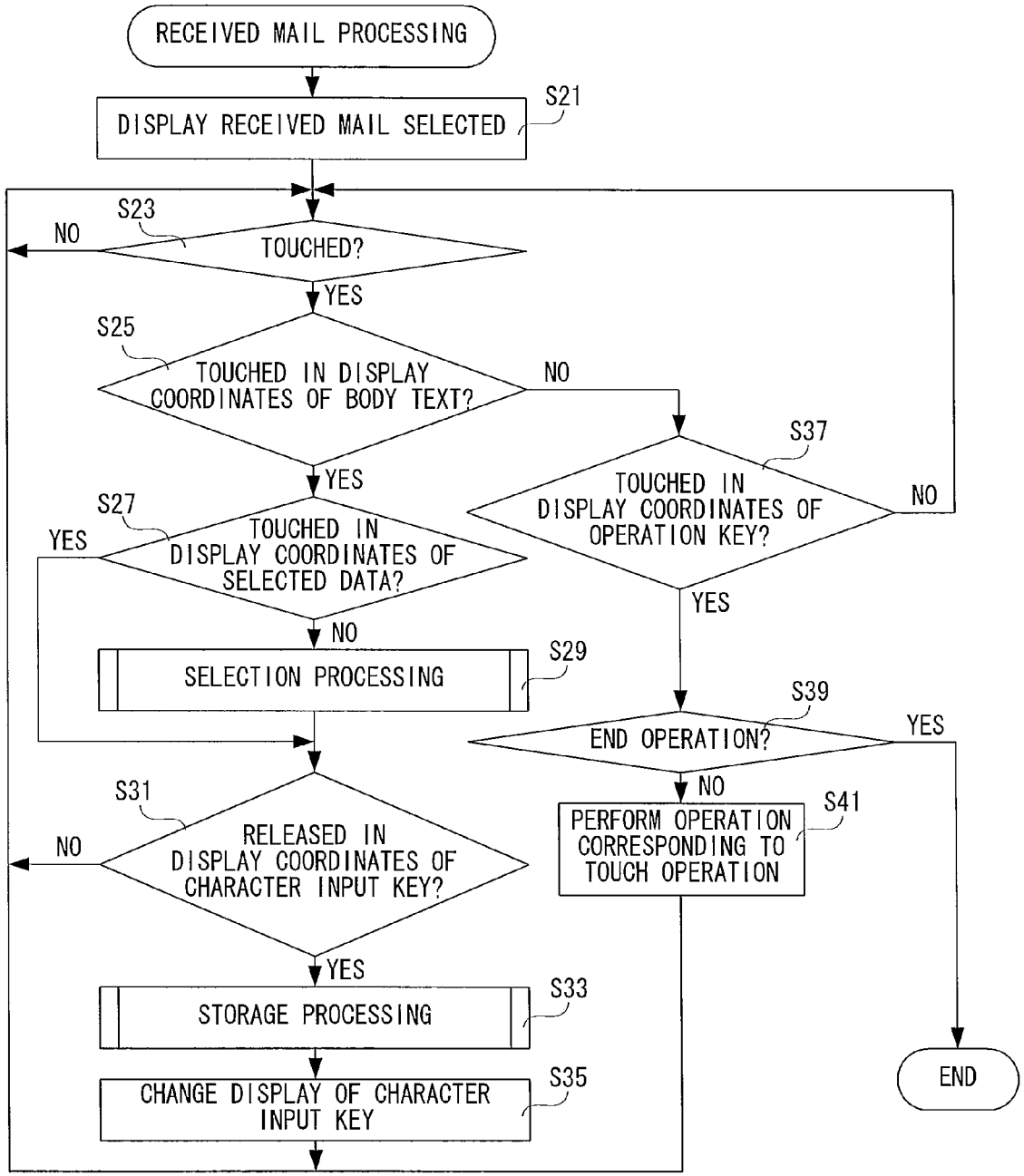
FIG. 23 is a flowchart showing received mail processing by the CPU shown in FIG. 1.
Figure 24:
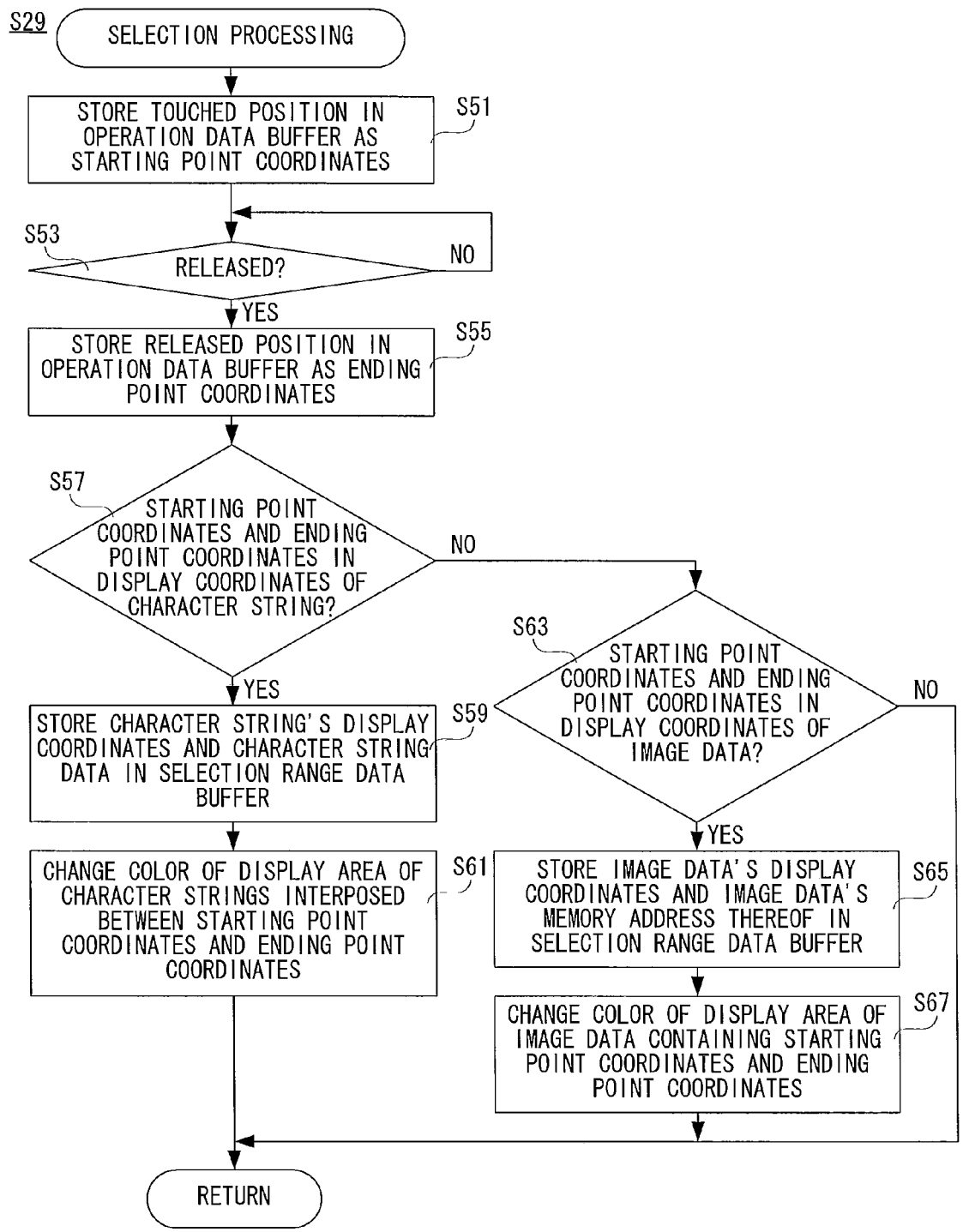
FIG. 24 is a flowchart showing selection processing by the CPU shown in FIG. 1.
Figure 28:
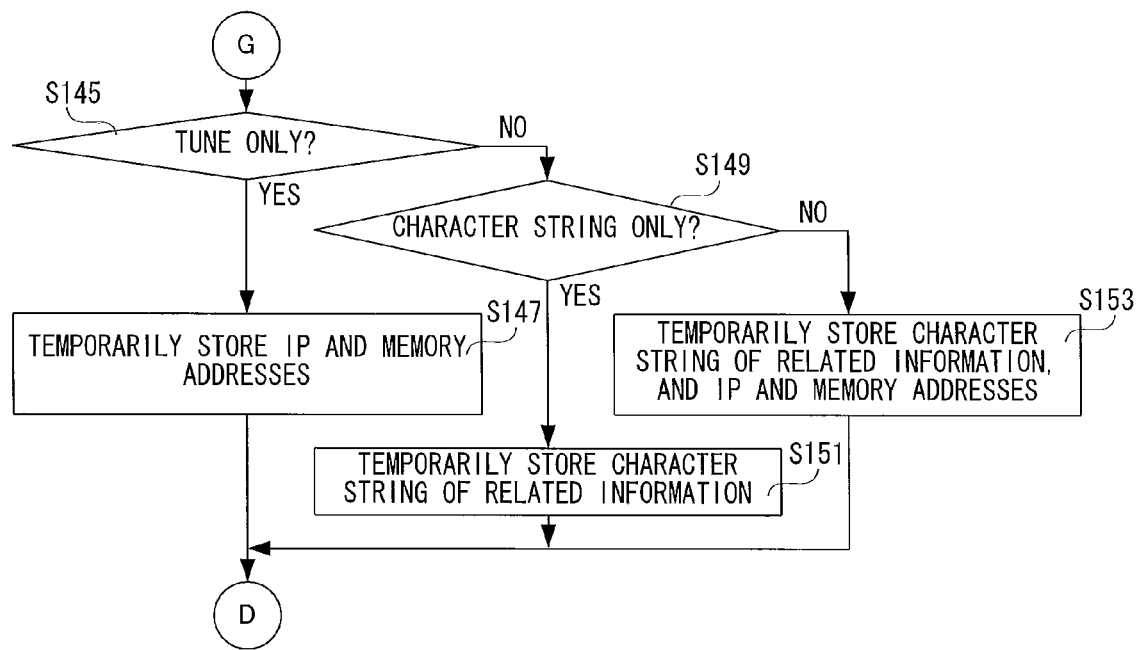
FIG. 28 is a flowchart that follows FIG. 25 and shows still further part of the temporary storage processing by the CPU shown in FIG. 1.
Figure 29:
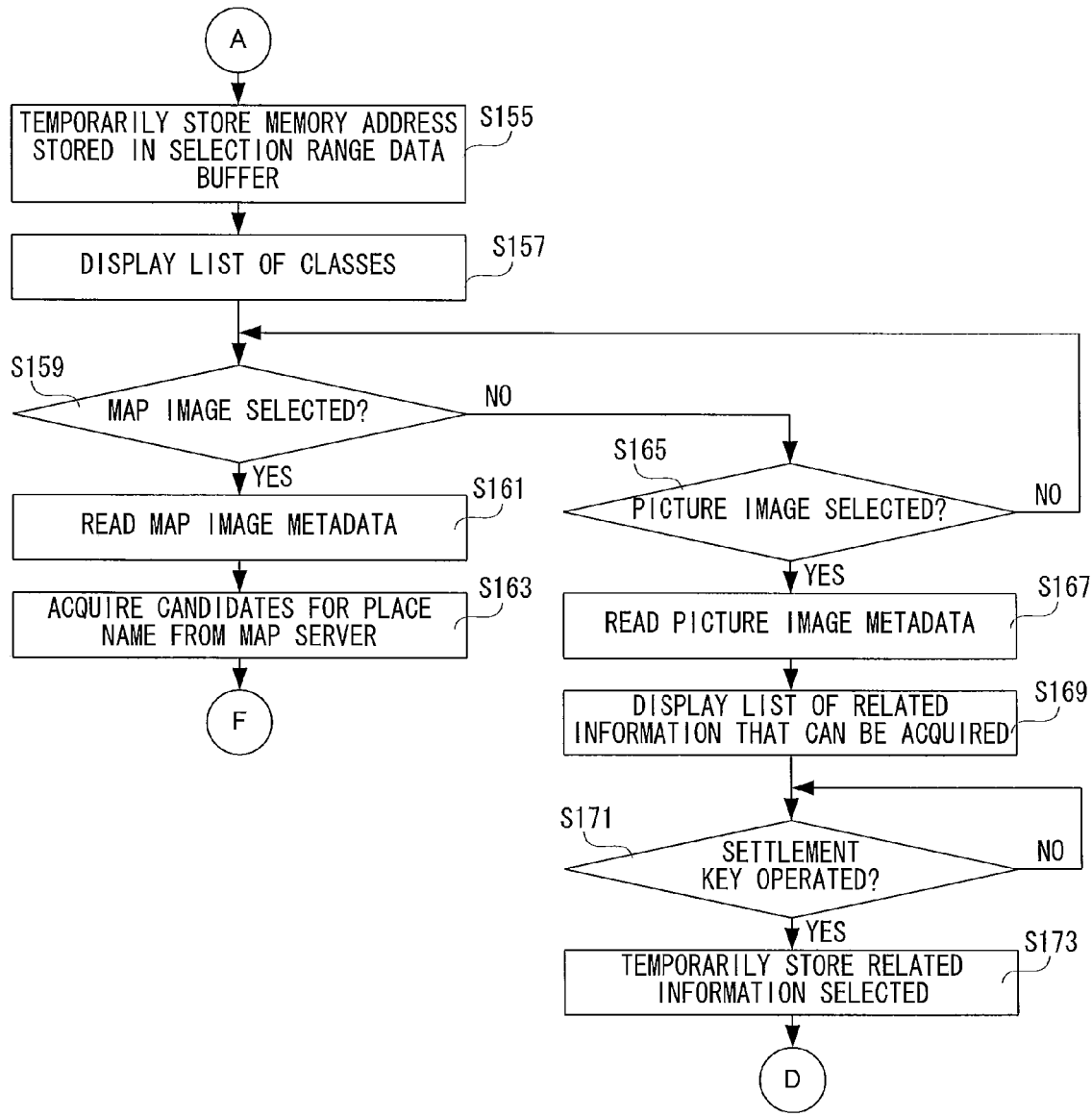
FIG. 29 is a flowchart that follows FIG. 25 and shows another part of the temporary storage processing by the CPU shown in FIG. 1.
Figure 30:
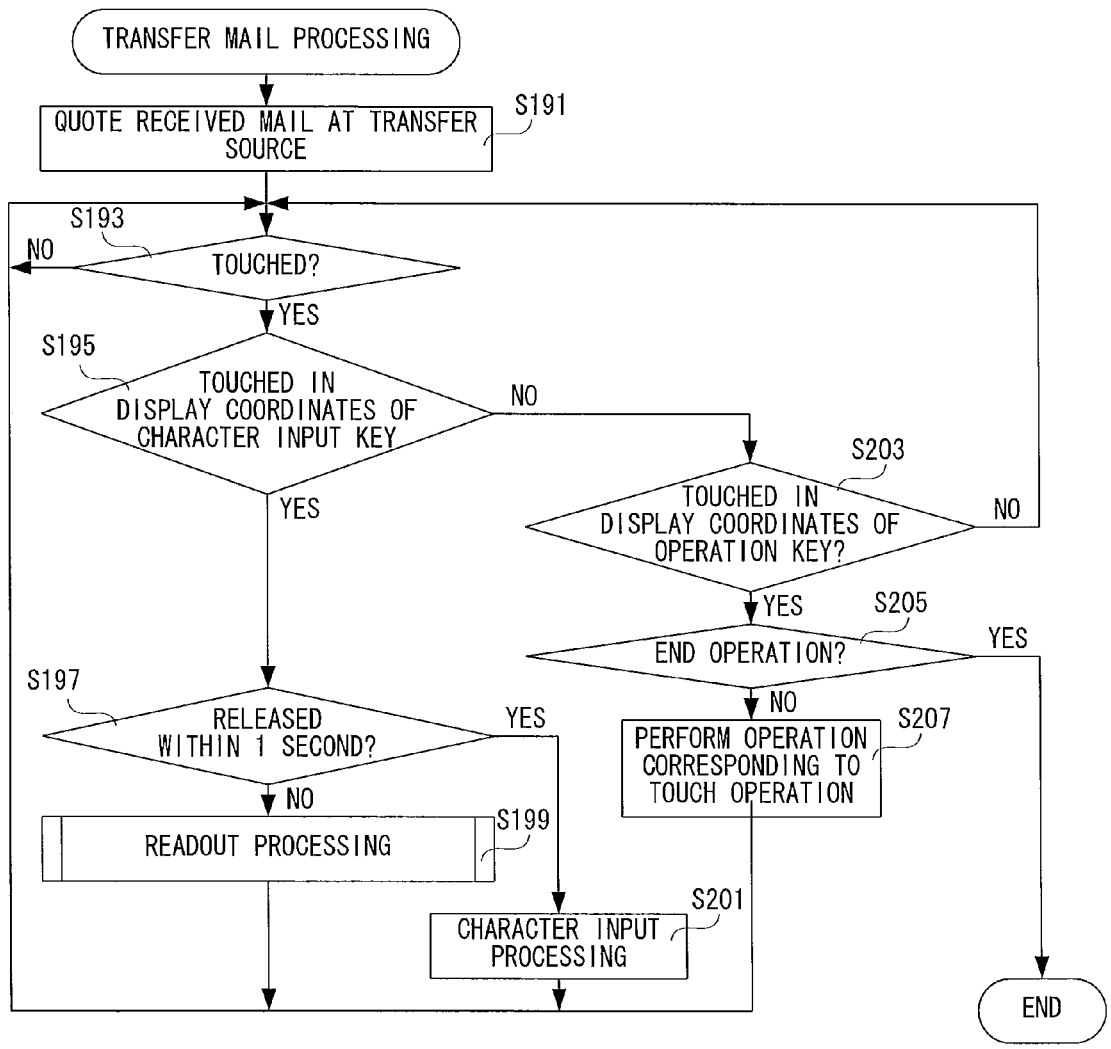
FIG. 30 is a flowchart showing transfer mail processing by the CPU shown in FIG. 1.
Figure 31:
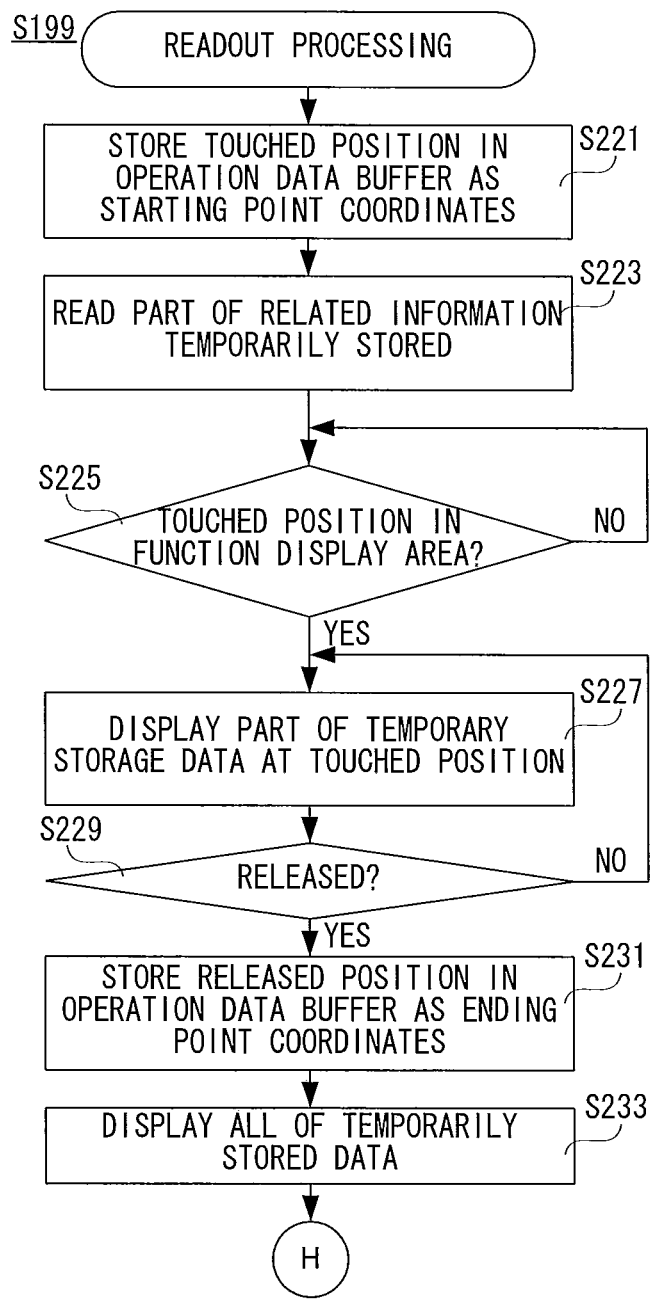
FIG. 31 is a flowchart showing part of readout processing by the CPU shown in FIG. 1.
Figure 32:
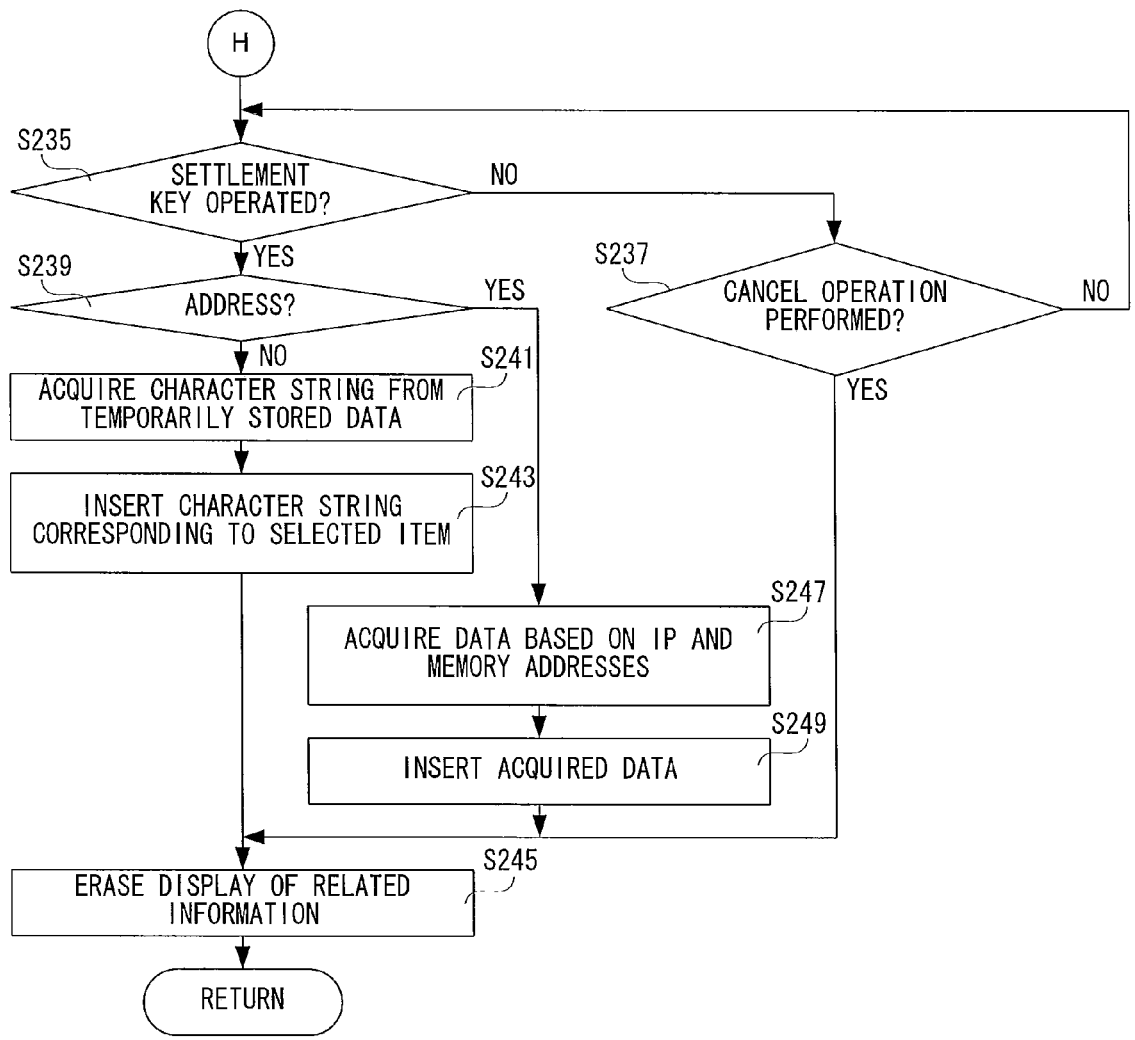
FIG. 32 is a flowchart that follows FIG. 31 and shows another part of readout processing by the CPU shown in FIG. 1.

The CPU 20 concurrently performs tasks including overall processing shown FIG. 22, received mail processing shown in FIG. 23, selection processing shown in FIG. 24, temporary storage processing shown in FIGS. 25 to 29, transfer mail processing shown in FIG. 30, and readout processing shown in FIGS. 31 and 32.

FIG. 22 is a flowchart showing overall processing. As shown in FIG. 22, in a step S1, it is determined whether an operation is performed to turn OFF the power supply. For example, it is determined whether the call end key 22*c* is pressed continuously in a state where the power supply for the mobile terminal 10 is ON. If "YES" in the step S1, that is, the power supply is turned OFF, the overall processing is ended, to turn OFF the power supply for the mobile terminal 10. On the other hand, if "NO" in the step S1, that is, the power supply is not turned OFF, it is determined in a step S3 whether the menu key 22*b* is operated. If "NO" in the step S3, that is, the menu key 22*b* is not operated, a return is made to the step S1. On the other hand, if "YES" in the step S3, that is, the menu key 22*b* is operated, a menu screen is displayed in a step S5. For example, the CPU 20 displays the display example shown in FIG. 3(B) on the LCD monitor 32.

Subsequently, it is determined whether an arbitrary function key is operated in a step S7. That is, it is determined whether any one of the telephone function key 44, the address book function key 46, the mail function key 48, the browser function key 50, the data folder function key 52, and the tool function key 54 displayed on the menu screen is operated. If "NO" in the step S7, that is, no arbitrary key is operated, determination in the step S7 is repeated. On the other hand, if "YES" in the step S7, that is the arbitrary function key is touched, a selected arbitrary function is performed in a step S9. For example, if the mail function key 48 is touched, a mail menu screen shown in FIG. 4(A) is displayed on the LCD monitor 32, to perform the mail functions. Further, if the incoming box key 72 is touched, received mails are displayed on the mail menu screen. Subsequently, in a step S11, it is determined whether an operation is performed to end the function being performed. For example, if the call end key 22*c* is pressed, the function being performed is ended. If "NO" in the step S11, that is, no operation is performed to end the function being performed, a return is made to the step S11. On the other hand, if "YES" in the step S11, that is, if an operation is performed to end the function being performed, a standby screen is displayed in the step S13. That is, such a standby screen as shown in FIG. 3(A) is displayed on the LCD monitor 32. Then, if the processing in the step S13 ends, a return is made to the step S1.

FIG. 23 is a flowchart showing received mail processing. As shown in FIG. 23, in a step S21, a selected received mail is displayed. That is, a received mail selected by the GUI that selects received mails not shown is displayed in the processing in the step S21. In a step S23, it is determined whether a touch operation is performed. That is, whether the touch flag 350 is ON is determined. If "NO" in the step S23, that is, no touch operation is performed, determination in the step S23 is repeated. On the other hand, if "YES" in the step S23, that is, a touch operation is performed, it is determined in a step S25 whether the touch operation is performed in display coordinates of the body text. That is, it is determined whether the starting point coordinates are contained in a range in which the body text of the received mail is displayed.

If "YES" in the step S25, that is, the touch operation is performed in the range in which the body text of the received mail is displayed, it is determined in a step S27 whether the touch operation is performed in the display coordinates of the selected data. That is, it is determined whether the starting point coordinates are contained in the display coordinates of the selected character string (that is, the selected data).

If "YES" in the step S27, that is, a touch operation is performed in the display coordinates of the selected character string, a shift is made to a step S31, and if "NO" in the step S27, that is, no touch operation is performed in the display coordinates of the selected character string, the selection processing (see FIG. 24) is performed in a step S29. Further, the selection processing is not described in detail because it is to be described later.

Subsequently, it is determined in the step S31 whether a release operation is performed in the display coordinates of a character input key. For example, it is determined whether a release operation is performed in the display coordinates of the "あ" (Japanese Hiragana (A)) line character input key. If "NO" in the step S31, that is, no release operation is performed in the display coordinates of an arbitrary character input key, a return is made to the step S23. On the other hand, if "YES" in the step S31, that is, a release operation is performed in the display coordinates of the arbitrary character input key, the temporary storage processing (see FIG. 25) is performed in a step S33. Further, the temporary storage processing is not described in detail because it is to be described later. Subsequently, in a step S35, the display of the character input key is changed. For example, the color in which the "あ" (Japanese Hiragana (A)) line character input key utilized in the temporary storage processing is changed as shown in FIG. 6(B). It is to be noted that if not stored temporarily in the processing in the step S33, the display of the character input key is not changed. Then, if the processing in the step S35 ends, a return is made to the step S23.

It is to be noted that if "NO" in the step S25, that is, no touch is performed in the display coordinates of the body text of the received mail, it is determined in a step S37 whether a touch operation is performed in the display coordinates of the operation key. That is, it is determined whether starting point coordinates and ending point coordinates are shown in the display coordinates of an arbitrary operation key. If "NO" in the step S37, that is, no touch operation is performed in the display coordinates of the operation key, a return is made to the step S23.

Further, if "YES" in the step S37, that is a touch operation is performed in the display coordinates of the operation key, it is determined in a step S39 whether an end operation is performed. For example, it is determined whether the call end key 22*c* etc. is pressed. If "YES" in the step S39, that is, an end operation is performed, the received mail processing is ended. On the other hand, if "NO" in the step S39, that is, no end operation is performed, operations corresponding to the touch operation are performed in a step S41, to make a return to the step S23. For example, if a touch operation is performed in the display coordinates of the menu key etc. for the mail functions, the mail function's menu function screen is displayed.

FIG. 24 is a flowchart showing the selection processing shown in the step S29 (see FIG. 23). As shown in FIG. 24, in a step S51, a touched position is stored as starting point coordinates in the operation data buffer 330. Subsequently, in a step S53, it is determined whether a release operation is performed. That is, it is determined whether the touch flag 350 is turned OFF. If "NO" in the step S53, that is, no release operation is performed, the determination in the step S53 is repeated. On the other hand, if "YES" in the step S53, a position at which a release operation is performed in a step S55 is stored as ending point coordinates in the operation data buffer 330.

Subsequently, in a step S57, it is determined whether the starting point coordinates and the ending point coordinates are in the display coordinates of the character string. For example, it is determined whether the starting point coordinates and the ending point coordinates stored in the operation data buffer 330 are contained in the display coordinates denoted by the "佐:" (Japanese Kanji (SA)) display coordinates data 380 or the "藤" (Japanese Kanji (TOU)) display coordinates data 386. If "YES" in the step S57, that is, the starting point coordinates and the ending point coordinates are in the display coordinates of the character string, in a step S59, the character string display coordinates and the character string data are stored in the selection range data buffer 332. That is, the display coordinates of the character string interposed between the starting point coordinates and the ending point coordinates and the character string data interposed between the starting point coordinates and the ending point coordinates stored in the operation data buffer 330 are stored in the selection range data buffer 332.

Subsequently, in a step S61, the color of the display area of the character strings interposed between the starting point coordinates and the ending point coordinates is changed. That is, the selected character string is displayed as a selected character string "佐藤" (Japanese Kanji (SATOU)) as shown in FIG. 5(A) in order to notify the user of the selected character string. Then, if the processing in the step S61 ends, the selection processing is ended to make a return to the received mail processing (see FIG. 23).

It is to be noted that if "NO" in the step S57, that is, the starting point coordinates and the ending point coordinates are not in the display coordinates of the character string, in a step S63, it is determined whether the starting point coordinates and the ending point coordinates are in the display coordinates of the image data. That is, it is determined whether the starting point coordinates and the ending point coordinates are in the display coordinates of the map image data, the picture image data, etc. For example, it is determined whether the starting pint coordinates and the ending point coordinates stored in the operation data buffer 330 are contained in the display coordinates denoted by image display coordinates not shown.

If "NO" in the step S63, that is, the starting point coordinates and the ending point coordinates are not in the display coordinates of the image data, the selection processing is ended. On the other hand, if "YES" in the step S63, in a step S65, a display image of the image data and a memory address of this image data are stored in the selection range data buffer. That is, the display coordinates of the image data stored in the operation data buffer 330 and the memory address of the image data are stored in the selection range data buffer 332. For example, if the starting point coordinates and the ending point coordinates are contained in the display coordinates of the map image data 400a, the starting point coordinates and the ending point coordinates as well as the memory address of the map image data 400a are stored in the selection range data buffer 332. That is, the user can select the image data also as selection data.

Subsequently, in a step S67, the color of the display area of the image data in which the starting point coordinates and the ending point coordinates are contained is changed. For example, the display color of the image data is changed to a generally blue-tinged color. Then, if the processing in the step S67 ends, the selection processing is ended.

Figure 25:
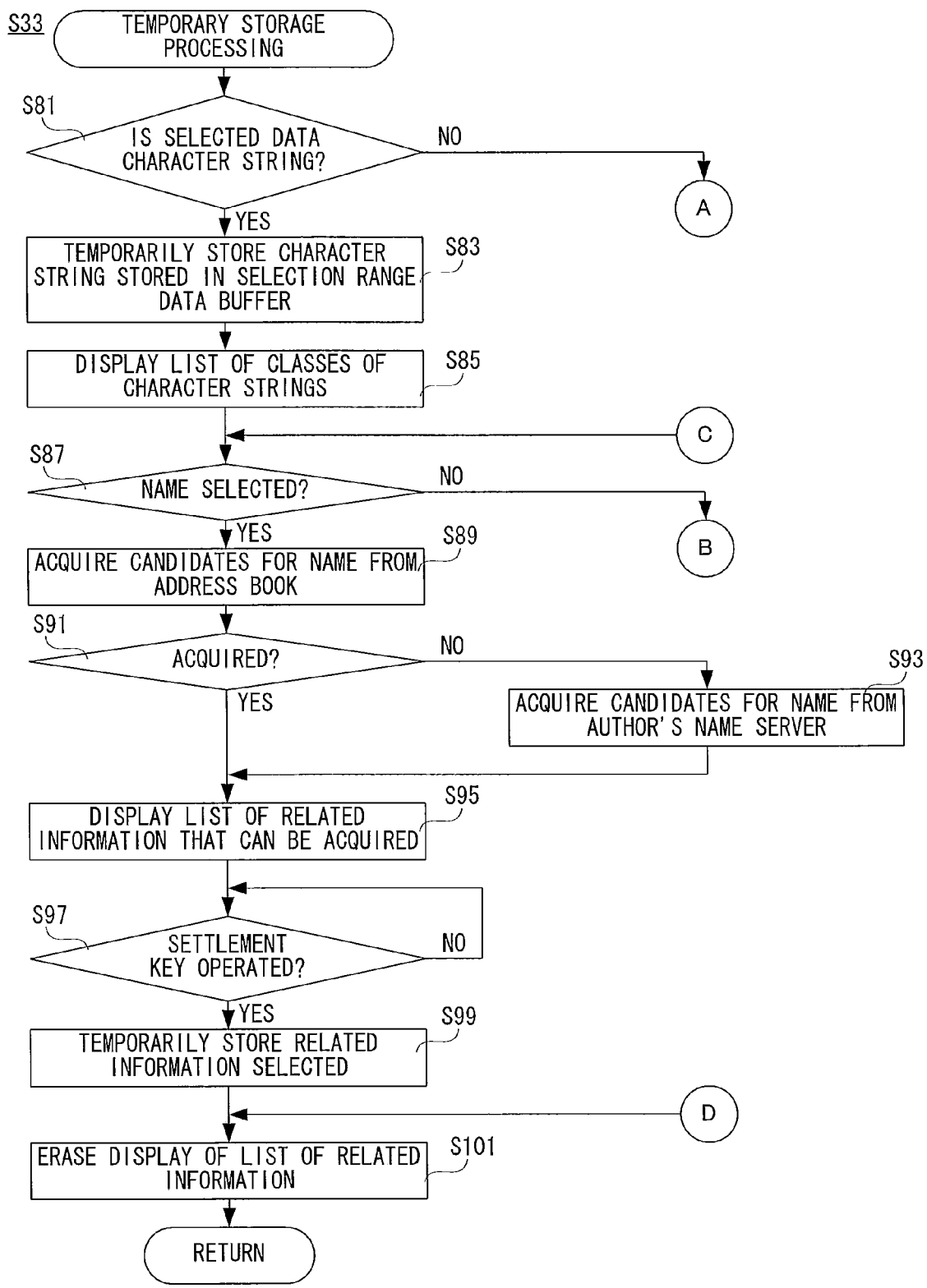
FIG. 25 is a flowchart showing part of temporary storage processing by the CPU shown in FIG. 1.

FIG. 25 is a flowchart showing the temporary storage processing shown in the step S33 (see FIG. 23). As shown in FIG. 25, in a step S81, it is determined whether selected data is a character string. That is, it is determined whether data selected in the selection processing (see FIG. 24) is a character string or an image. Specifically, it is determined by determining which one of a character string and a memory address is stored in the selection range data buffer 332. Specifically, it can be determined by determining whether the stored character string begins with "0X".

If "NO" in the step S81, that is, the selected data is not a character string data but an image data, a shift is made to a step s155 (see FIG. 29). On the other hand, if "YES" in the step S81, the character string stored in the selection range data buffer 332 is stored temporarily. For example, if the "あ" (Japanese Hiragana (A)) line character input key is utilized in a temporary storage operation, the character string, which is the selected data, is temporarily stored in accordance with a memory address denoted by the "あ" (Japanese Hiragana (A)) line corresponding address data 370c, that is, a memory address of in the RAM 28 denoted by "0X9000000-0X9000FFF". Specifically, the character string is the first data to be stored temporarily and, therefore, done so sequentially starting with 0X9000000.

Subsequently, in a step S85, a list of classes of the character strings is displayed. That is, the pop-up 82 shown in FIG. 5(C) displays names, place names, and song titles. Subsequently, in a step S87, it is determined whether a name is selected. That is, it is determined whether the flag corresponding to the check box 84a is turned ON. If "NO" in the step S87, that is, the check box 84a is not marked, a shift is made to a step S103 (see FIG. 26). On the other hand, if "YES" in the step S87, that is, the check box 84a is marked, candidates for the name are acquired from the address book in a step S89. For example, if the selected character string is "佐藤" (Japanese Kanji (SATOU)), a memory address of the address book data 342 is acquired from the search table (see FIG. 16), so that based on the acquired memory address, the name column (see FIG. 17) in the address book data 342 is searched for "佐藤" (Japanese Kanji (SATOU)).

Subsequently, it is determined in a step S91 whether it is acquired. That is, it is determined whether "佐藤" (Japanese Kanji (SATOU)) is acquired as a search result in the name column in the address book data 342. If "YES" in the step S91, that is, it is acquired, a shift is made to a step S95. On the other hand, if "NO" in the step S91, that is, it is not acquired; candidates for the name are acquired from the author's name server 130 in a step S93. Specifically, an IP address of the author's name server 130 is acquired from the search table, so that in accordance with the acquired IP address, data is communicated with the author's name server 130. Then, the database (see FIG. 21) in the author's name server 130 is searched for an item that agrees with a character string selected in the name column. It is to be noted that if a plurality of candidates are output as the search results in the step S89 or S93, a GUI may be displayed that permits the user to select a plurality of candidates.

Subsequently, in a step S95, a list of related information pieces that can be acquired is displayed. For example, if "佐藤" (Japanese Kanji (SATOU)) is searched for in the name column in the address book data 342 along FIG. 17, "NULL" is stored in each of his or her residence, birthday, gender, blood type, and URL columns, so that it is known that the telephone number and the mail address can be acquired. That is, none of the telephone number, the mail address, the residence, the birthday, the gender, the blood type, and the URL is displayed as the related information.

Subsequently, as shown in FIG. 25 again, it is determined in a step S97 whether the settlement key 82*a* is operated. For example, it is determined whether the settlement key 82*a* in the pop-up 82 shown in FIG. 6(A) is touched. If "NO" in the step S97, that is, the settlement key 82*a* is not touched, the processing in the step S97 is repeated. On the other hand, if "YES" in the step S97, that is, the settlement key 82*a* is touched, related information selected in a step S99 is stored temporarily.

For example, as shown in FIG. 6(A), if the check box 84*e* is marked and the settlement key 82*a* is touched, an address corresponding to the check box 84*e*, that is, a mail address stored in the "mail address" column corresponding to "佐藤" (Japanese Kanji (SATOU)) in the address book data 342 is temporarily stored as the related information. Furthermore, if the "あ" (Japanese Hiragana (A)) line character input key is utilized in the temporary storage operation, a character string, which is the selected data, is temporarily stored in accordance with a memory address denoted by the "あ" (Japanese Hiragana (A)) line corresponding address data 370*c*, that is, a memory address in the RAM 28 denoted by "0X9000000-0X9000FFF". Specifically, the mail addresses are the second data or subsequent to be temporarily stored and, therefore, done so sequentially starting with 0X9000008, that is, the 201st byte. Further, if a plurality of pieces of related information are selected, the plurality of related information pieces are stored temporarily so as to correspond to each 200-byte memory address starting from 0X9000008.

As shown in FIG. 25 again, in a step S101, display of the related information list is erased. That is, display of the pop-up 82 is erased. Then, if the processing in the step S101 ends, the temporary storage processing is ended, to make a return to the received mail processing (see FIG. 23).

Figure 26:
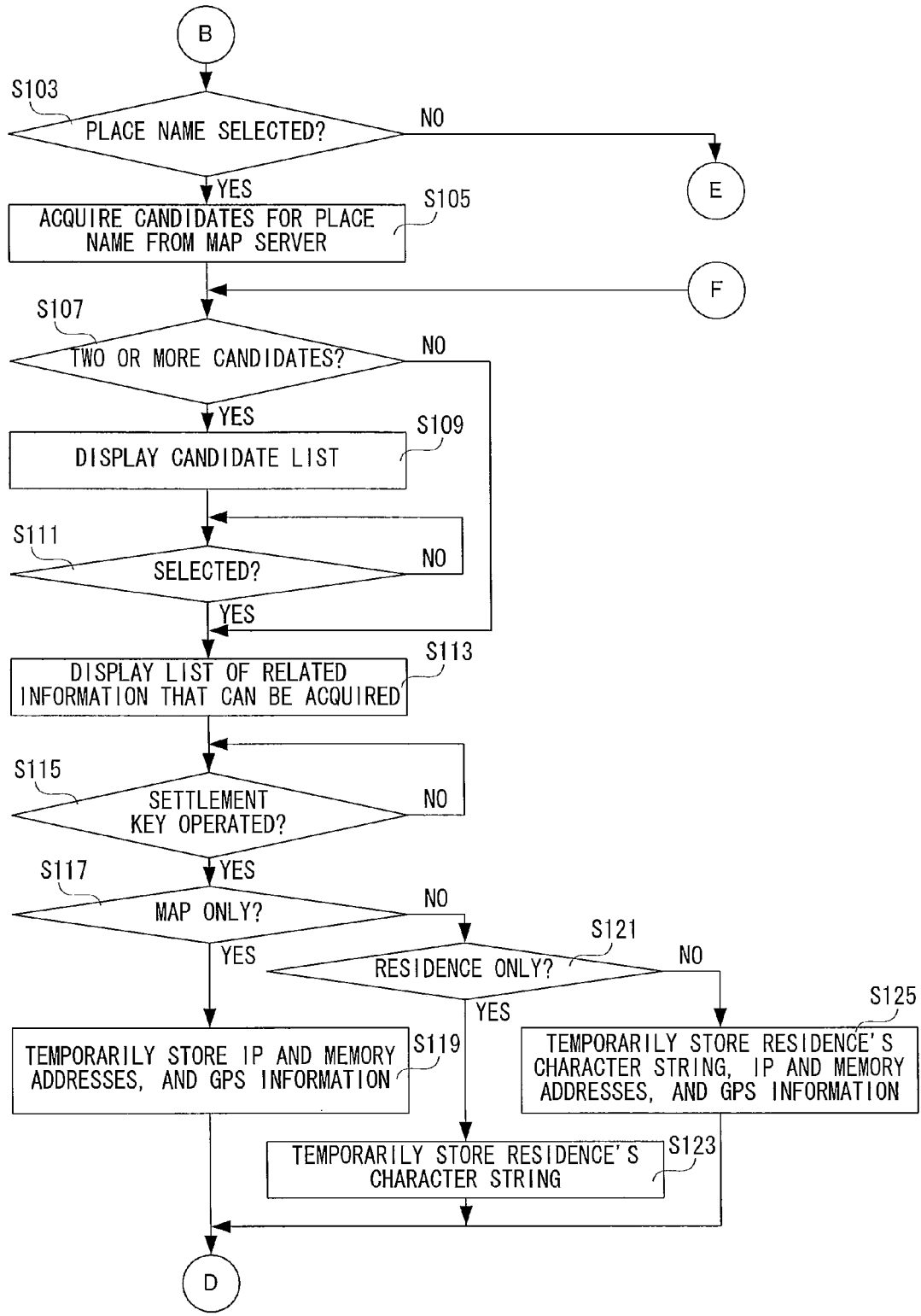
FIG. 26 is a flowchart that follows FIG. 25 and shows another part of the temporary storage processing by the CPU shown in FIG. 1.
Figure 27:
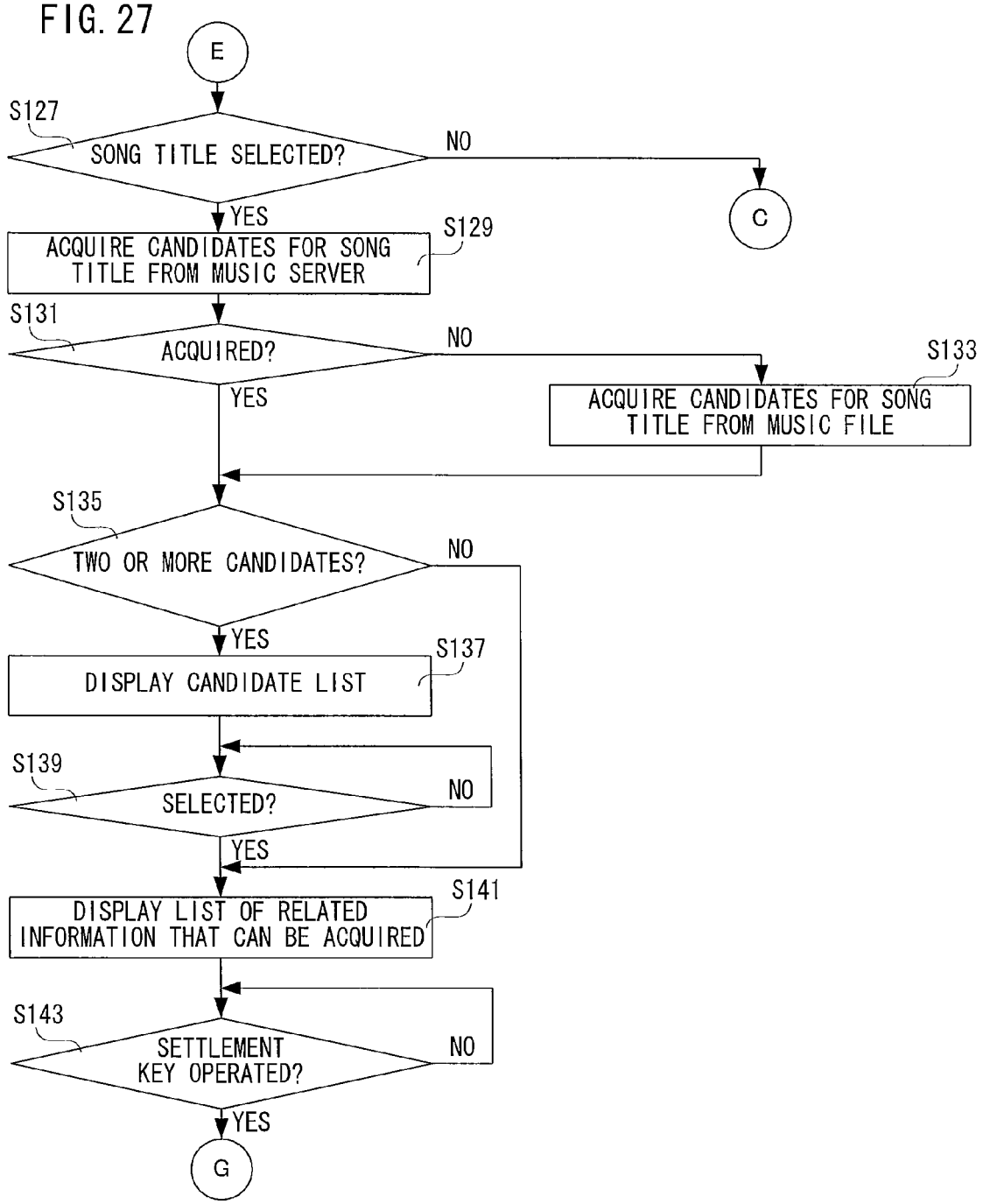
FIG. 27 is a flowchart that follows FIG. 25 and shows still another part of the temporary storage processing by the CPU shown in FIG. 1.

As shown in FIG. 26, in a step S103, it is determined whether a place name is selected. That is, it is determined whether the check box 84*b* in the pop-up 82 shown in FIG. 5(C) is marked. If "NO" in the step S103, that is, no place name is selected, a shift is made to a step S127 (FIG. 27). On the other hand, if "YES" in the step S103, that is a place name is selected, candidates for the place name are acquired from the place name server 110 in a step S105. That is, an IF address of the map server 110 is acquired from the search table (see FIG. 16), so that in accordance with the acquired IF address, data is communicated with the map server 110. Then, if the selected character string is "Nakagyo-ku, Kyoto City", "Nakagyo-ku, Kyoto City" is searched for in the database (see FIG. 20) in the map server 110 in order of the prefecture column, the city/ward column, and the town name column.

Subsequently, in a step S107, it is determined whether a plurality of candidates are acquired. That is, the search in the map server 110's database has resulted in a plurality of candidates. If "NO" in the step S107, that is, one candidate is found as the results of search, a shift is made to a step S113. On the other hand, if "YES" in the step S107, that is, a plurality of candidates are found as the results of search, a list of the candidates is displayed in a step S109. For example, if the place name is "Fuchu City", "Fuchu City, Tokyo" and "Fuchu City, Hiroshima Prefecture" are obtained as the results of search. Then, in the step S109, "Fuchu City, Tokyo" and "Fuchu City, Hiroshima Prefecture" are displayed selectably in the pop-up 82.

Subsequently, it is determined in a step S111 whether the candidate is selected. That is, it is determined whether an arbitrary one of the listed candidates obtained as the results of search is selected and the settlement key 82*a* etc. is touched.

If "NO" in the step S111, that is, none of the listed candidates is selected, the processing in the step S111 is repeated. On the other hand, if "YES" in the step S111, that is, an arbitrary one of the listed candidates is selected, a list of related information pieces that can be acquired is displayed in a step S113. For example, the pop-up 82 selectably displays a residence and mapping information, which are the related information of, for example, "Nakagyo-ku, Kyoto City".

Subsequently, it is determined in a step S115 whether the settlement key 82*a* is operated. For example, it is determined whether the settlement key 82*a* is touched in the pop-up 82. If "NO" in the step S115, that is, the settlement key 82*a* is not operated, the processing in the step S115 is repeated. On the other hand, if "YES" in the step S115, that is, the settlement key 82*a* is operated, it is determined in a step S117 whether only a map is selected. That is, it is determined whether the related information selected is only map image data. If "NO" in the step S117, that is, the selected related information is not only the map image data, a shift is made to a step S121. On the other hand, if "YES" in the step S117, that is, the selected related information is only the map image data, the IP address and the memory address as well as the GPS information are stored temporarily in a step S119, to make a shift to the step S101.

For example, in the case of the place name of "Nakagyo-ku, Kyoto City", if a map is selected as the related information, GPS information of "35° 00' 37. XX"N135° 45'05.YY"E", a HDD 112's memory address of "0XD0000001", and an IP address of the map server 110 are stored temporarily. Further, if the "あ" (Japanese Hiragana (A)) line character input key is utilized in the temporary storage operation, the character string, which is the selected data, is stored temporarily in accordance with a memory address denoted by the "あ" (Japanese Hiragana (A)) line corresponding address data 370*c*, that is, a memory address in the RAM 28 denoted by "0X9000000-0X9000FFF". Specifically, the IP address, the memory address, and the GPS information are the second data and subsequent to be stored temporarily and, therefore, done so sequentially starting from 0X9000008, that is, the 201st byte. Further, the character strings of the temporarily stored IP address, memory address, and the GPS information are delimited by "," etc. in the character strings.

In a step S121, it is determined whether only a residence is selected. That is, it is determined whether the related information selected is only the character string of a residence. If "YES" in the step S121, that is, the selected related information is only the character string of a residence, the residence's character string is stored temporarily in a step S123, to make a shift to the step S101. For example, from the place name of "Nakagyo-ku, Kyoto City", a residence of "Kyoto Prefecture, Kyoto City, Nakagyo-ku, %%-cho, 521" is obtained as the related information. Then, similarly to the processing in the step S119, it is temporarily stored in the specified memory address in the temporary storage data 348.

It is to be noted that if "NO" in the step S121, that is, the selected related information is map image data and a character string of a residence, the residence's character string and the IP address as well as the memory address and the GPS information are stored temporarily, to make a shift to the step S101. For example, the GPS information of "35° 00' 37. XX"N135° 45'05.YY"E" as well as the memory address "0XD0000001" and the IP address of the map server similarly obtained as in the step S119 are the second data to be stored temporarily and, therefore, done so sequentially in order of the IP address, the memory address, and the GPS information starting from 0X9000008, that is, the 201st byte. Then, the residence's character string is the third data to be stored temporarily and, therefore, done so starting from 0X9000190, that is, the 401st byte.

As shown in FIG. 27, in a step S127, it is determined whether a song title is selected. For example, it is determined whether the check box 84c corresponding to a song title in the pop-up 82 shown in FIG. 5(C) is marked. If "NO" in the step S127, that is, the check box 84c in the pop-up 82 shown in FIG. 5(C) is not marked, a return is made to the step S87. On the other hand, if "YES" in the step S127, that is, the check box 84c marked, candidates for the song title are acquired from the music server 120 in a step S129. That is, an IP address of the music server 120 is acquired from the search table (see FIG. 16). Then, as shown in FIG. 34, if the selected character string is "@@", "@@" is searched for in the song title column in the database (see FIG. 20) in the music server 120.

Subsequently, in a step S131, it is determined whether they are acquired. That is, the candidates for the song title are acquired from the database in the music server 120. If "YES" in the step S131, that is, the candidates for the song title are acquired, a shift is made to a step S135. On the other hand, if "NO" in the step S131, that is, the candidates for the song title are not acquired; the candidates for the song title are acquired from a music file in a step S133. That is, the candidates for the song title are acquired from music data that constitutes the music data 402.

Subsequently, in a step S135, it is determined whether there are a plurality of candidates. For example, since different singers may sing the same song, the candidates cannot be narrowed down to one only with the song title in some cases. If "NO" in the step S135, that is, one candidate is found, a shift is made to a step S141. On the other hand, if "YES" in the step S135, that is, a plurality of candidates are found, a list of the candidates is displayed in a step S137, to determine in a step S139 whether one of the listed candidates is selected. Then, if "NO" in the step S139, one candidate is not selected, the processing in the step S139 is repeated. On the other hand, if "YES" in the step S139, that is, one candidate is selected, a list of the related information pieces that can be acquired is displayed in a step S141. For example, if a song title of "@@" is searched for in the song title column in the server 120's database, the singer names, the songwriters/composers, and the lyrics are selectably displayed on a GUI like the pop-up 82 shown in FIG. 6(A). It is to be noted that in the case of tunes such as classic music having no lyrics, lyrics are not displayed as the related information that can be acquired.

Subsequently, in a step S143, it is determined whether the settlement key 82a is operated. For example, it is determined whether the settlement key 82a in the pop-up 82 shown in FIG. 6(A) is operated. If "NO" in the step S143, that is, the settlement key 82a is not operated, the processing in the step S143 is repeated. On the other hand, if "YES" in the step S143, that is, the settlement key 82a is operated, a shift is made to a step S145.

As shown in FIG. 28, in a step S145, it is determined whether only a tune is selected. That is, it is determined whether only a tune, that is, music data is selected as the related information. If "NO" in the step S145, that is, only a tune is not selected, a shift is made to a step S149. On the other hand, if "YES" in the step S145, that is, only a tune is selected, an IP address and a memory address are temporarily stored in a step S147, to make a shift to the step S101. For example, as shown in FIG. 20, if a tune is selected as the related information of "@@", the memory address of "0XA0000001" of the HDD 122 in the music server 120 and the IP address of the music server 120 are stored temporarily. It is to be noted that the processing to temporarily store the IP address and the memory address is not described in detail because it is almost the same as that in the step S119 (see FIG. 26).

In the step S149, it is determined whether only a character string is selected. That is, it is determined whether any one of a singer name, a songwriter/composer, and a lyric is selected as the related information of the song title. If "YES" in the step S149, that is, any one of a singer name, a songwriter/composer, and a lyric is selected, the character string of the related information is stored temporarily in a step S151, to make a shift to the step S101. For example, any one of "KOUDA AA", "NAKAI BB/NAKAI BB", and "xxx . . . " is stored in accordance with a specified memory address in the temporary storage data 348 so as to correspond to the song title "@@" from the database in the music server 120. It is to be noted that the processing to temporarily store a plurality of related information pieces is not described in detail because it is almost the same as that in the step S125.

If "NO" in the step S149, that is, none of a singer name, a songwriter/composer, and a lyric is selected, it is assumed that any one of the singer name, the songwriter/composer, and the lyric as well as the tune are selected, to make a shift to a step S153. In the step S153, the character string of the related information as well as the IP address and the memory address are stored temporarily, to make a shift to the step S101. For example, if a tune and a singer name are selected as the related information, a memory address of "0XA0000001" in which the music data of "@@" is stored and "KOUDA AA" are temporarily stored in accordance with a specified memory address in the temporary storage data 348.

As shown in FIG. 29, in a step S155, the memory address stored in the selection range data buffer is stored temporarily. That is, since the selected data is image data, the memory address of the image data is stored temporarily. Further, the temporary storage processing is not described in detail because it is almost the same as that in the step S83.

Subsequently, in a step S157, a list of the classes is displayed. For example, a GUI is displayed to select either the map image data 400a etc. or the picture image data 400c etc. Subsequently, in a step S159, it is determined whether a map image is selected. That is, it is determined whether the map image data 400a is selected on the displayed GUI etc. If "NO" in the step S159, that is, the map image data 400a is not selected, a shift is made to a step S165. On the other hand, if "YES" in the step S159, that is, the map image data 400a is selected, the map image metadata 400b is read in a step S161. That is, a title of the map image data 400a, that is, a place name is read from the map image metadata 400b. Then, in a step S163, candidates for the place name are acquired from the map server 110, to make a shift to the step S107. That is, if the map image data 400a is selected, the title read from the map image metadata 400b, that is, the place name is utilized to search the database in the map server 110. It is to be noted that the search processing is not described in detail because it is almost the same as that in the step S105.

Figure 35:
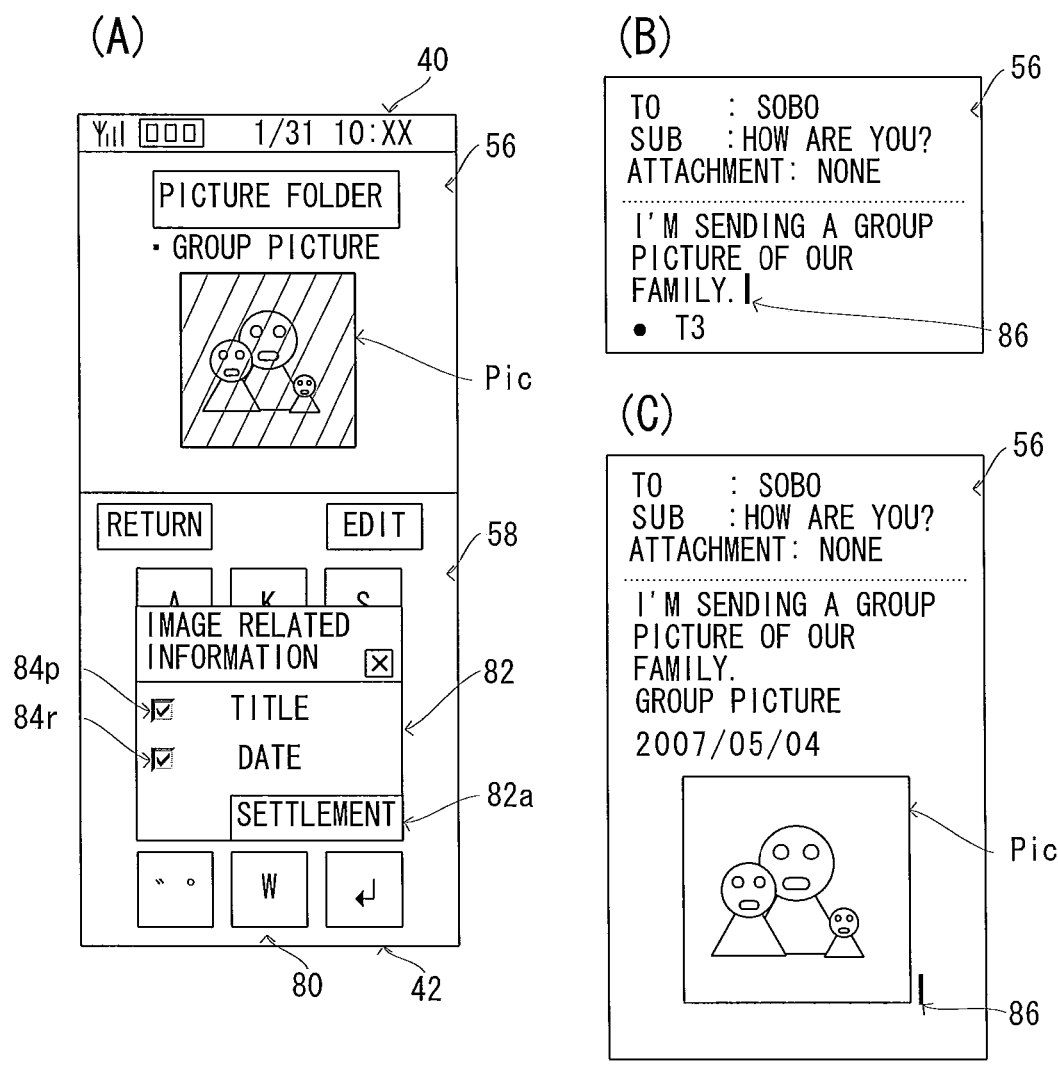
FIGS. 35A and 35C illustrate an example of a picture image's related information temporary storage procedure.

In the step S165, it is determined whether a picture image is selected. That is, it is determined whether the picture image data 400c is selected on the displayed GUI etc. If "NO" in the step S165, that is, the picture image data 400c is not selected, a return is made to the step S159. On the other hand, if "YES" in the step S165, that is, the picture image data 400c is selected, the picture image metadata 400d is read in a step S167, to display a list of related information pieces that can be acquired, in a step S169. For example, as shown in FIG. 35(A), if a picture image Pic is the picture image data 400c, a title of the picture image and its shooting day are acquired as the related information from the picture image metadata 400*d*, to display the pop-up 82 so that the title and the shooting day can be selected.

Subsequently, in a step S171, it is determined whether the settlement key 82*a* is operated. For example, it is determined whether the settlement key 82*a* shown in FIG. 35(A) is touched. If "NO" in the step S171, that is, the settlement key 82*a* is not touched, the processing in the step S171 is repeated. On the other hand, if "YES" in the step S171, that is, the settlement key 82*a* etc. is touched, the related information selected is stored temporarily in a step S173, to make a shift to the step S101. That is, the title or the shooting day of the picture image data 400*c* is temporarily stored as the related information in accordance with a specified memory address in the temporary storage data 348.

FIG. 30 is a flowchart showing transfer mail processing. As shown in FIG. 30, if the "転送" (Japanese Kanji (TENSOU)) key is touched in the received mail processing etc., the CPU 20 performs the transfer mail processing. The CPU 20 quotes a mail received by a transfer source in a step S191. That is, it quotes the body text of the received mail at the transfer source constituting mail data. Specifically, as the subject a character string of "Fw:" is inserted to the beginning of the subject of the received mail, to create a transfer mail in which body text the body text of the received mail is inserted as a quotation.

In a step S193, it is determined whether a touch operation is performed. If "NO" in a step S73, the determination in the step S193 is repeated. On the other hand, if "YES" in the step S193, it is determined in a step S195 whether the touch operation is performed in the display coordinates of a character input key. For example, it is determined whether the touch operation is performed in the display coordinates of the "あ" (Japanese Hiragana (A)) line character input key etc. If "NO" in the step S195, that is, the touch operation is not performed in the display coordinates of the character input key, a shift is made to a step S203. On the other hand, if "YES" in the step S195, that is, the touch operation is performed in the display coordinates of the character input key, it is determined in a step S197 whether a release operation is performed within one second. That is, if the touch flag 350 is turned ON, processing of the touch interval counter 352 is performed to count the elapsed time. Then, in the step S197, it is determined whether a count value by the touch interval counter 352 denotes one second or less. If "NO" in the step S197, that is, one second has elapsed since the touch operation is performed, the readout processing (see FIG. 31) is performed in a step S199, to make a return to the step S193. Further, the readout processing is not described in detail because it is to be described later.

Further, if "YES" in the step S197, that is, the release operation is performed within one second, the character input processing is performed in a step S201, to make a return to the step S193. For example, if the "あ" (Japanese Hiragana (A)) line character input key is touched and then released within one second, operations are performed to enter an "あ" (Japanese Hiragana (A)) line character.

The following processing in steps S203-S207 is not described in detail because it is almost the same as that in the steps S37 to 41. In the step S203, it is determined whether a touch operation is performed in the display coordinates of the operation key. If "NO" in the step S203, a return is made to the step S193. On the other hand, if "YES" in the step S203, it is determined in the step S205 whether an end operation is performed. If "YES" in the step S205, the transfer mail processing is ended. On the other hand, if "NO" in the step S205, operations corresponding to the touch operation are performed in the step S207, to make a return to the step S193.

FIG. 31 is a flowchart showing the readout processing shown in the step S199 (see FIG. 30). As shown in FIG. 31, in a step S221, a position where a touch operation is performed is stored as starting point coordinates in the operation data buffer 330. Subsequently, in a step S223, part of the temporarily stored related information is read. For example, if a touch operation is performed in the display coordinates of the "あ" (Japanese Hiragana (A)) line character input key, a character string temporarily stored in a storage area of a memory address corresponding to the "あ" (Japanese Hiragana (A)) line character input key and one piece of the related information in this character string are read and stored in the operation data buffer 330. That is, if the character string of "佐藤" (Japanese Kanji (SATOU)) and "xx@ecweb.ne.jp" etc., which is the related information of "佐藤" (Japanese Kanji (SATOU)), are stored temporarily, "佐藤" (Japanese Kanji (SATOU)) and "xx@ecweb.ne.jp" are stored in the operation data buffer 330. Subsequently, in a step S225, it is determined whether the touch position is within the function display range 56. That is, it is determined whether the present touch position is in the display coordinates of the function display range 56. If "NO" in the step S225, that is, the present touch position is not in the display coordinates of the function display range 56, the processing in the step S225 is repeated. On the other hand, if "YES" in the step S225, that is, the present touch position is in the display coordinates of the function display range 56, part of the temporarily stored data is displayed at the touch position in a step S227. That is, as shown on the simple pop-up 88 shown in FIG. 9(B), part of "佐藤" (Japanese Kanji (SATOU)) and "**xx@ecweb.ne.jp" is displayed simply. It is to be noted that if the related information is a memory address, an icon that denotes the related information is the memory address is displayed.

Subsequently, it is determined in a step S229 whether a release operation is performed. That is, it is determined whether the touch flag 350 is OFF. If "NO" in the step S229, that is, the touch flag 350 is ON, a return is made to the step S227. That is, the display position of the simple pop-up 88 moves as if it follows the present touch position. Further, if "YES" in the step S229, that is, the touch flag is OFF, the release position is stored as ending point coordinates in the operation data buffer 330 in a step S231. Subsequently, in a step S233, the temporarily stored data is all displayed. For example, if a touch operation is performed in the display coordinates of the "あ" (Japanese Hiragana (A)) line character input key, a character string temporarily stored in a storage area of a memory address corresponding to the "あ" (Japanese Hiragana (A)) line character input key and the related information in this character string are read and displayed on the LCD monitor 32. Specifically, as in the pop-up 82 shown in FIG. 10(A), "佐藤" (Japanese Kanji (SATOU)) and "**xx@ecweb.ne.jp" are displayed.

Subsequently, as shown in FIG. 32, in a step S235, it is determined whether the settlement key 82*a* is operated. For example, it is determined whether the settlement key 82*a* shown in FIG. 10(A) is operated. If "NO" in the step S235, that is, the settlement key 82*a* is not operated, it is determined in a step S237 whether a cancel operation is performed. For example, it is determined whether a touch operation is performed out of the display coordinates of the pop-up 82 or the call end key 23*c* is pressed. If "NO" in the step S237, that is, a cancel operation is not performed, a return is made to the step S235, and on the other hand, if "YES", that is, a cancel operation is performed, a shift is made to a step S245.

Further, if "YES" in the step S235, that is, the settlement key 82*a* is operated, it is determined in a step S239 whether an address is related. That is, it is determined whether an IP address and a memory address are contained in the related information stored in the temporary storage data 348. For example, if the "あ" (Japanese Hiragana (A)) line character input key is touched, it is determined whether a character string beginning with "IP:" or "0X" is contained in the related information temporarily stored in a memory address corresponding to the "あ" (Japanese Hiragana (A)) line character input key, that is, "佐藤" (Japanese Kanji (SATOU)) and "xx@ecweb.ne.jp". If "YES" in the step S239, that is, an IP address or a memory address is contained, a shift is made to a step S247. On the other hand, if "NO" in the step S239, that is, no IP address is contained, a character string is acquired from the temporary storage data 348 in a step S241**.

Subsequently, in a step S243, a character string corresponding to a selected item is inserted. For example, if a check box 84j is marked in the pop-up 82 shown in FIG. 10(A) and the settlement key 82a is touched, a character string of "xx@ecweb.ne.jp" is inserted to a position corresponding to the ending point coordinates as shown in FIG. 10(B). Subsequently, in a step S245, display of the related information is erased to end the readout processing, to make a return to the transfer mail processing. That is, display of the pop-up 82** is erased.

Figure 33:
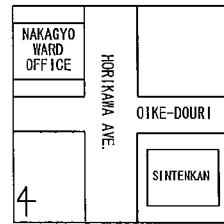
FIGS. 33A and 33B illustrate an example of a related information temporary storage procedure by use of the map server shown in FIG. 1.

In the step S247, data is acquired on the basis of the IP address and the memory address. For example, as shown in FIG. 33(A), if a character string of "Nakagyo-ku, Kyoto City" in which the class is given as a place name is stored temporarily and a map image is selected as related information, "IP:210.146.181.*", "0XD0000001", and "35° 00' 37.XX"N135° 45'05.YY"E" are stored temporarily as the related information. Then, if the ending point coordinates in an addition operation are denoted by coordinates shown at T1, data is communicated with the map server 110 based on the IP address of "IP:210.146.181.*", to download such map image data that "35° 00' 37. XX"N135° 45'05.YY"E" may be the central point in the map data corresponding to the GPS information stored in the memory address of "0XD0000001". Subsequently, in a step S249, the acquired data is inserted, to make a shift to the step S245. For example, as shown in FIG. 33(B), a downloaded map image Map is inserted to the coordinates denoted by T1.

FIGS. 34(A) and (B) are illustrative views describing operations to insert related information by utilizing the author's name server 130. As shown in FIG. 34(A), in a case where a character string of "Nakai BB" in which the class is given as a name is stored temporarily and a URL is selected as related information, if address data of "Nakai BB" is not present in the address book data 342, "Nakai BB" is searched for in the name column in the database (see FIG. 21) in the author's name server 130. Then, a character string of "http://www.BB.nakai..jp/index" is acquired from the author's name server 130's database and temporarily stored. Then, if the ending point coordinates in an addition operation are denoted by T2, "http://www.BB.nakai..jp/index" is added as shown in FIG. 34(B).

Further, for example, FIGS. 35(A) to 35(C) are illustrative views describing operations to store a picture image temporarily and insert it into a mail. As shown in FIG. 35(A), the pop-up 82 appears if a picture image Pic is displayed and undergoes temporary storage operations by use of the folder functions. In this case, because of the picture image, a GUI to confirm the class is omitted, to display a GUI to select related information. Then, if a title and a date are selected as the related information, a title and a shooting day of the picture image Pic are temporarily stored from metadata corresponding to the picture image Pic. It is to be noted that because of the image data, not the image data of the picture image Pic but a memory address of the image data of the picture image Pic is stored temporarily.

Then, as shown in FIG. 35(B), if the ending point coordinates are denoted by T3 in an addition operation in a newly created mail (new mail), the title of the picture image Pic and its shooting day are inserted, so that the picture image is inserted on the basis of a memory address of the image data of the temporarily stored picture image Pic as shown in FIG. 35(C).

FIG. 36 is an illustrative view describing processing for temporarily storing music data during performance of the music player functions. As shown in FIG. 36, in a case where the music player functions are performed, if display of a character string of a song title "" is selected and stored temporarily, a GUI to confirm the class is omitted, to display a GUI to confirm the related information. In this case, first the character string of the song title is stored temporarily, to acquire the related information not from the music server 120 but from the metadata of music data corresponding to the song title's character string. That is, if the music data corresponding to "" is the first music data 402a, the related information is acquired from the first music metadata 402b. Further, if the music data is selected as related information, the memory address of the first music data 402a is stored temporarily.

FIGS. 37(A) and (B) show another embodiment equipped with a dedicated key for temporary storage. Further, the temporary storage operations and the insertion operations by use of the dedicated key are not described in detail because they are almost the same as those by use of the character input keys.

FIG. 37(A) shows a display example of displaying contents of a received mail on the LCD monitor 32, in which a creation key 200 and a deletion key 202 are displayed in the function display range 56. If the creation key 200 is touched in the display coordinates, the temporary storage key 204 is newly displayed as shown in FIG. 37(B). The deletion key 202 is used to delete the created temporary storage key 204. Further, the temporary storage key 204 is correlated with a memory address in the RAM 28. With this, if a touch-and-slide operation is performed on the temporary storage key 204 from the display coordinates of a selected character string to those of the temporary storage key 204, the temporary storage key 204 temporarily stores the selected character string in a storage area denoted by the correlated memory address as in the case of the character input key.

It is to be noted that although the temporary storage key 174 is displayed only at one position, two or any larger number of the keys can be created by further touching the creation key 174. Further, in a case where a plurality of temporary storage keys 174 are created, the positions of the respective temporary storage keys 174 can be changed arbitrarily. For example, in a case where three temporary storage keys 174 are displayed, the temporary storage key 174 positioned on the right end can be moved to the left end by performing a touch-and-slide operation, etc.

As may be seen from the above description, the mobile terminal 10 includes the LCD monitor 32 to display the body text of a received mail and a group of character input keys in the function display range 56 and the key input range 58 respectively, the touch panel input device 24 mounted on the front surface of the LCD monitor 32, and the CPU 20 configured to detect at least either starting point coordinates or ending point coordinates from the touch panel input device 24. Further, in the mobile terminal 10, a character string in the body text of a received mail is selected by performing a touch operation on the touch panel input device 24. If a touch-and-slide operation is performed from the display area of the character string to the display area of the "あ" (Japanese Hiragana (A)) line character input key in a state where the character string is selected, related information of the selected character string is displayed in the pop-up 82. Then, if the related information (first related information) displayed in the pop-up 82 is selected, the related information selected is temporarily stored in accordance with a memory address denoted by the "あ" (Japanese Hiragana (A)) line corresponding address data 370*c*.

If a touch-and-slide operation is performed from the display area of the "あ" (Japanese Hiragana (A)) line character input key to the display area of the body text in a transfer mail in a state where the transfer mail is displayed after the temporary storage operations are performed utilizing the "あ" (Japanese Hiragana (A)) line character input key, the temporarily stored related information (second related information) is displayed in the pop-up 82. Then, if the related information temporarily stored is selected, the related information is inserted on the basis of a position where a release operation is performed.

In such a manner, selection data is determined through operations on the touch panel input device 24 and related information of the selected data is stored temporarily. Then, the temporarily stored related information is inserted to an arbitrary position in the body text of a transfer mail etc. That is, it is possible for the user to easily store the selected data's related information temporarily by utilizing the touch panel input device 24, thereby simply utilizing the related information stored temporarily.

It is to be noted that although the present embodiment has temporarily stored the related information about a character string etc. selected in a received mail, the related information may be stored temporarily from the body text of a new mail, a reply mail, or a transmitted mail. Further, the related information temporarily stored may be inserted into the body texts of a new mail and a reply mail, not limited to a transfer mail only. Furthermore, besides the mail functions, also in any other functions of scheduling functions and new address book registration functions, the related information may be temporarily stored and then inserted.

Further, although the present embodiment has detected starting point coordinates or ending point coordinates by using the display device equipped with the touch panel, the starting point coordinates or the ending point coordinates may be detected by using a "system LCD with embedded optical sensors" equipped with the touch panel functions.

Further, as the communication method, the mobile terminal 10 may employ the PHS system or the like in place of the CDMA system, the W-CDMA system, and the TDMA system. Further, the mobile terminal 10 may be replaced with a mobile information terminal such as a personal digital assistant (PDA).

Although the present invention has been described and illustrated in detail, it is clearly understood that the same is by way of illustration and example only and is not to be taken by way of limitation, the spirit and scope of the present invention being limited only by the terms of the appended claims.

EXPLANATION OF REFERENCE CHARACTERS

10 mobile terminal
20 CPU
24 touch panel input device
32 LCD monitor
28 RAM
100 network
110 map server
120 music server
130 author's name server

The invention claimed is:

1. A mobile terminal having a display device that has a touch panel and displays arbitrarily selectable first data in a first display range and a virtual keyboard comprising a plurality of character input keys in a second display range, and a touch position detection device that detects a touch start position and a touch end position on said touch panel, said mobile terminal comprising at least one central processing unit that executes:

a selection module that selects part or all of said first data based on a first touch start position and a first touch end position detected by said touch position detection device, wherein the first data comprises one or more of a name, a word, and a phrase;

a first display module that retrieves first related information of said selected first data, from one or more of a local memory and a remote network address, when a first touch-and-slide operation is received, wherein the first touch-and-slide operation comprises a second touch start position contained in said first display range and a second touch end position contained on one of the plurality of character input keys of the virtual keyboard, wherein the first related information comprises one or more of a name, a title, an email address, a mail address, a telephone number, a date, a group, a gender, a blood type, and a Uniform Resource Locator (URL);

a candidate display module that, when there are a plurality of candidates for the first related information of said selected first data, displays the plurality of candidates;

a storage module that,
when there is one candidate for the first related information, stores the first related information of the one candidate so as to be correlated with the one character input key, and,
when there are a plurality of candidates for the first related information, displays the plurality of candidates, receives a selection of one or more of the plurality of candidates for the first related information, and stores the selected one or more candidates as the first related information so as to be correlated with said one character input key;

a display state alteration module that, when the first related information is stored so as to be correlated with said one character input key, changes a display state of said one character input key;

a second display module that,
when the one character input key is touched, inserts a character associated with said one character input key into the first display range, and
when a second touch-and-slide operation is performed comprising a third touch start position contained on said one character input key and a third touch end position contained in said first display range,
retrieves one or more candidates for the first related information correlated with said one character input key,
when there is one candidate for the first related information correlated with said one character input key, inserts the one candidate into the first display range, and,
when there are a plurality of candidates for the first related information correlated with said one character input key, displays an indication of each of the plurality of candidates, receives a user selection of one or more of the plurality of candidates, and inserts the selected one or more candidates into the first display range.

2. A mobile terminal according to claim 1, wherein, when there is one candidate for the first related information, said candidate display module further displays the first related information of the one candidate.

3. A mobile terminal according to claim 1, wherein, when there is one candidate for the first related information stored as correlated with said one character input key, said second display module further displays the first related information stored as correlated with said one character input key as the second related information.

4. A mobile terminal according to claim 1, wherein, in response to said second touch-and-slide operation, said second display module displays the first related information stored as correlated with said one character input key as the second related information.

5. A mobile terminal according to claim 1, wherein said first display modules includes a related information acquisition module that retrieves the first related information of said selected first data, and wherein said first display module displays the retrieved first related information.

6. A mobile terminal according to claim 5, further comprising a storage device that stores the first related information of said selected first data, wherein said related information acquisition module acquires the first related information of said selected first data from said storage device.

7. A mobile terminal according to claim 5, further comprising a communication module that performs data communication with a server that stores the first related information of said selected first data, wherein said related information acquisition module acquires the first related information of said selected first data from said server.

8. A mobile terminal according to claim 7, wherein said server stores third data, and, when a memory address of said third data is acquired by said related information acquisition module, said storage unit stores an Internet Protocol (IP) address of said server and the memory address of said third data as the first related information.

9. A mobile terminal according to claim 5, wherein
said first data contains metadata; and
said related information acquisition module acquires the first related information of said selected first data from the metadata contained in said selected first data.

10. A mobile terminal according to claim 9, wherein
said first data contains image data; and
said selection module includes an image data selection module that selects the image data when the arbitrarily selectable data is the image data.

11. A mobile terminal according to claim 10, wherein
said metadata contains a title of said first data; and
said related information acquisition module further acquires the title of said selected first data from the metadata contained in said selected first data, and acquires the first related information of said selected first data based on the acquired title.

12. A mobile terminal according to claim 1, wherein said second display module includes a partial readout module that reads part of the first related information stored by said storage unit, and a display unit that displays the part of the first related information read by said partial readout module as module the second related information.

13. A computer-implemented method comprising, in a mobile terminal having a display device that has a touch panel and displays arbitrarily selectable first data in a first display range and a virtual keyboard comprising a plurality of character input keys in a second display range and a touch position detection device that detects a touch start position and a touch end position on said touch panel, by at least one central processing unit, executing:
a selection module that selects part or all of said first data based on a first touch start position and a first touch end position detected by said touch position detection device, wherein the first data comprises one or more of a name, a word, and a phrase;
a first display module that retrieves first related information of said selected first data, from one or more of a local memory and a remote network address, when a first touch-and-slide operation is received, wherein the first touch-and-slide operation comprises a second touch start position contained in said first display range and a second touch end position contained on one of the plurality of character input keys of the virtual keyboard, wherein the first related information comprises one or more of a name, a title, an email address, a mail address, a telephone number, a date, a group, a gender, a blood type, and a Uniform Resource Locator (URL);
a candidate display module that, when there are a plurality of candidates for the first related information of said selected first data, displays the plurality of candidates;
a storage module that,
when there is one candidate for the first related information, stores the first related information of the one candidate so as to be correlated with the one character input key, and,
when there are a plurality of candidates for the first related information, displays the plurality of candidates, receives a selection of one or more of the plurality of candidates for the first related information, and stores the selected one or more candidates as the first related information so as to be correlated with said one character input key;
a display state alteration module that, when the first related information is stored so as to be correlated with said one character input key, changes a display state of said one character input key;
a second display module that,
when the one character input key is touched, inserts a character associated with said one character input key into the first display range, and,
when a second touch-and-slide operation is performed comprising a third touch start position contained on said one character input key and a third touch end position contained in said first display range,
retrieves one or more candidates for the first related information correlated with said one character input key,
when there is one candidate for the first related information correlated with said one character input key, inserts the one candidate into the first display range, and,
when there are a plurality of candidates for the first related information correlated with said one character input key, displays an indication of each of the plurality of candidates, receives a user selection of one or more of the plurality of candidates, and inserts the selected one or more candidates into the first display range.

14. A data control method in a mobile terminal having a display device that has a touch panel and displays arbitrarily selectable first data in a first display range and a virtual keyboard comprising a plurality of character input keys in a second display range and a touch position detection device that detects a touch start position and a touch end position on said touch panel, the method comprising, by at least one central processing unit, executing:

a selection step of selecting part or all of said first data based on a first touch start position and a first touch end position detected by said touch position detection device, wherein the first data comprises one or more of a name, a word, and a phrase;

a first display step of retrieving first related information of said selected first data, from one or more of a local memory and a remote network address, when a first touch-and-slide operation is received, wherein the first touch-and-slide operation comprises a second touch start position contained in said first display range and a second touch end position contained on one of the plurality of character input keys of the virtual keyboard, wherein the first related information comprises one or more of a name, a title, an email address, a mail address, a telephone number, a date, a group, a gender, a blood type, and a Uniform Resource Locator (URL);

a candidate display step of, when there a plurality of candidates for the first related information of said selected first data, displaying the plurality of candidates;

a storage step of,
      when there is one candidate for the first related information, storing the first related information of the one candidate so as to be correlated with the one character input key, and,
      when there are a plurality of candidates for the first related information, displaying the plurality of candidates, receiving a selection of one or more of the plurality of candidates for the first related information, and storing the selected one or more candidates as the first related information so as to be correlated with said one character input key;

a display state alteration step of, when the first related information is stored so as to be correlated with said one character input key, changing a display state of said one character input key;

a second display step of, when the one character input key is touched, inserting a character associated with said one character input key into the first display range; and a third display step of, when a second touch-and-slide operation is performed comprising a third touch start position contained on said one character input key and a third touch end position contained in said first display range,
      retrieving one or more candidates for the first related information correlated with said one character input key,
      when there is one candidate for the first related information correlated with said one character input key, inserting the one candidate into the first display range, and,
      when there are a plurality of candidates for the first related information correlated with said one character input key, displaying an indication of each of the plurality of candidates, receiving a user selection of one or more of the plurality of candidates, and inserting the selected one or more candidates into the first display range.

15. A method for temporarily storing data using a virtual keyboard, the method comprising, by one or more hardware processors:

receiving a touch-and-slide operation comprising a start point on selected content within a first display region and an end point on one of a plurality of character keys of a virtual keyboard within a second display region, wherein the selected content comprises one or more of a name, a word, and a phrase, and wherein each of the plurality of character keys is associated with a character;

in response to the touch-and-slide operation,
      retrieving one or more candidates for content data related to the selected content from one or more of a local address book and a remote network address, wherein the related content data comprises one or more of a name, a title, an email address, a mail address, a telephone number, a date, a group, a gender, a blood type, and a Uniform Resource Locator (URL),
      if there is one candidate for the related content data, storing the candidate for the related content data in association with the character key,
      if there are a plurality of candidates for the related content data, displaying an indication of each of the plurality of candidates, receiving a user selection of one or more of the plurality of candidates, and storing the selected one or more of the plurality of candidates for the related content data in association with the character key, and
      changing a display state of the character key to indicate that the character key is associated with the stored related content data;

after storing the related content data in association with the character key, receiving an interaction with the character key;

if the interaction is a touch operation, inserting the character associated with the character key into content in the first display region; and, if the interaction is a touch-and-slide operation comprising a start point on the character key and an end point within the first display region,
      retrieving one or more candidates for the related content data stored in association with the character key,
      if there is one candidate for the related content data stored in association with the character key, inserting the candidate into content in the first display region, and,
      if there are a plurality of candidates for the related content data stored in association with the character key, displaying an indication of each of the plurality of candidates, receiving a user selection of one or more of the plurality of candidates, and inserting the selected one or more candidates into content in the first display region.

* * * * *